United States Patent
Grubbs et al.

(10) Patent No.: US 10,153,513 B2
(45) Date of Patent: *Dec. 11, 2018

(54) TRIBLOCK BRUSH BLOCK COPOLYMERS

(71) Applicant: CALIFORNIA INSTITUTE OF TECHNOLOGY, Pasadena, CA (US)

(72) Inventors: Robert H. Grubbs, South Pasadena, CA (US); Christopher M. Bates, Monrovia, CA (US); Alice Chang, Pasadena, CA (US); Brendon McNicholas, Los Angeles, CA (US); Simon C. Jones, Whittier, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,291

(22) Filed: Mar. 9, 2016

(65) Prior Publication Data

US 2016/0289392 A1    Oct. 6, 2016

Related U.S. Application Data

(60) Provisional application No. 62/130,385, filed on Mar. 9, 2015.

(51) Int. Cl.

| | | |
|---|---|---|
| *C08G 81/00* | (2006.01) | |
| *H01M 10/0565* | (2010.01) | |
| *C08G 61/02* | (2006.01) | |
| *H01M 10/0525* | (2010.01) | |
| *H01M 14/00* | (2006.01) | |
| *H01M 8/1018* | (2016.01) | |

(52) U.S. Cl.
CPC ........ *H01M 10/0565* (2013.01); *C08G 61/02* (2013.01); *C08G 81/00* (2013.01); *H01M 10/0525* (2013.01); *H01M 14/005* (2013.01); *C08G 2261/126* (2013.01); *C08G 2261/143* (2013.01); *C08G 2261/148* (2013.01); *C08G 2261/149* (2013.01); *C08G 2261/1426* (2013.01); *C08G 2261/3325* (2013.01); *C08G 2261/418* (2013.01); *C08G 2261/516* (2013.01); *C08G 2261/792* (2013.01); *H01M 2008/1095* (2013.01); *H01M 2300/0082* (2013.01)

(58) Field of Classification Search
CPC .............. C08G 81/00; C08G 2261/792; C08G 2261/516; C08G 2261/418; C08G 2261/3325; C08G 2261/149; C08G 2261/148; C08G 2261/143; C08G 2261/1426; C08G 2261/126

See application file for complete search history.

(56) References Cited

U.S. PATENT DOCUMENTS

| | | |
|---|---|---|
| 4,052,539 A | 10/1977 | Shropshire et al. |
| 5,462,990 A | 10/1995 | Hubbell et al. |
| 6,007,845 A | 12/1999 | Domb et al. |
| 6,306,540 B1 | 10/2001 | Hiroi et al. |
| 6,383,500 B1 | 5/2002 | Wooley et al. |
| 6,407,187 B1 | 6/2002 | Matyjaszewski et al. |
| 6,433,931 B1 | 8/2002 | Fink et al. |
| 6,489,055 B1 | 12/2002 | Ichihashi et al. |
| 6,627,314 B2 | 9/2003 | Matyjaszewski et al. |
| 6,671,097 B2 | 12/2003 | Fink et al. |
| 6,692,914 B1 | 2/2004 | Klaerner et al. |
| 7,101,937 B1 | 9/2006 | Frechet et al. |
| 7,795,355 B2 | 9/2010 | Matyjaszewski et al. |
| 7,960,479 B2 | 6/2011 | Cheng et al. |
| 8,415,436 B2 | 4/2013 | Han et al. |
| 8,419,792 B2 | 4/2013 | Vanderbilt et al. |
| 8,454,689 B2 | 6/2013 | Vanderbilt et al. |
| 9,045,579 B2 | 6/2015 | Xia et al. |
| 9,142,835 B2 | 9/2015 | Vicari et al. |
| 9,382,387 B2 | 7/2016 | Xia et al. |
| 9,453,943 B2 | 9/2016 | Miyake et al. |
| 2002/0135880 A1 | 9/2002 | Fink et al. |
| 2005/0192409 A1 | 9/2005 | Rhodes et al. |
| 2007/0099791 A1 | 5/2007 | Wan et al. |
| 2010/0305368 A1 | 12/2010 | Grubbs et al. |

(Continued)

FOREIGN PATENT DOCUMENTS

| | | |
|---|---|---|
| JP | 2006-052326 | 2/2006 |
| WO | WO 2013/138494 | 9/2013 |

OTHER PUBLICATIONS

Agarwal et al. (Feb. 23, 2012) "Mechanisms for CO Production from CO2 Using Reduced Rhenium Tricarbonyl Catalysts," J. Am. Chem. Soc. 134:5180-5186.

Agarwal et al. (May 13, 2015) "Design of a Catalytic Active Site for Electrochemical CO2 Reduction with Mn(I)-Tricarbonyl Species," Inorg. Chem. 54:5285-5294.

Aguirre et al. (2010) "Tunable Colors in Opals and Inverse Opal Photonic Crystals," Adv. Funct. Mater. 20:2565-2578.

Aharoni (1979), "Rigid Backbone Polymers. 2. Polyisocyanates and Their Liquid-Crystal Behavior," Macromolecules, 12, 94-103.

(Continued)

*Primary Examiner* — Jeffrey C Mullis
(74) *Attorney, Agent, or Firm* — Leydig, Voit & Mayer, Ltd.

(57) ABSTRACT

Provided herein is a class of copolymers, including triblock brush copolymers having specific block configurations, for example, ABC triblock brush copolymers and ABA triblock brush copolymers. In an embodiment, for example, copolymers of the invention incorporate various polymer side chain groups which contribute beneficial physical, chemical, or electronic properties such as increased mechanical or elastic strength, improved ionic or electric conductivity. In some embodiments, the provided copolymers exhibit advantageous steric properties allowing for rapid self-assembly into a variety of morphologies that are substantially different than non-brush, block copolymers.

21 Claims, 23 Drawing Sheets

(56) References Cited

U.S. PATENT DOCUMENTS

| | | | |
|---|---|---|---|
| 2013/0324666 A1* | 12/2013 | Xia | C08G 83/008 |
| | | | 525/182 |
| 2014/0011958 A1 | 1/2014 | Miyake et al. | |
| 2016/0024244 A1 | 1/2016 | Xia et al. | |
| 2016/0024250 A1* | 1/2016 | Yang | C08L 71/02 |
| | | | 525/396 |
| 2016/0289392 A1 | 10/2016 | Grubbs et al. | |
| 2016/0356923 A1 | 12/2016 | Miyake et al. | |
| 2017/0057908 A1 | 3/2017 | Jones et al. | |
| 2017/0062874 A1 | 3/2017 | Jones et al. | |

OTHER PUBLICATIONS

Akbari et al. (2001) "Cool Surfaces and Shade Trees to Reduce Energy Use and Improve Air Quality in Urban Areas", Solar Energy, vol. 70 No. 3, pp. 295-310.
Alberico et al. (Feb. 16, 2015) "Towards a Methanol Economy Based on Homogeneous Catalysis: Methanol to H2 and CO2 to Methanol," Chem. Commun. 51:6714-6725.
Albert et al. (2010) "Self-Assembly of Block Copolymer Thin Films," Materials Today. 13(6):24-33.
Alvarez-Guerra et al. (Jun. 16, 2015) "Ionic Liquids in the Electrochemical Valorisation of CO2," Energy Environ. Sci. 8:2574-2599.
Appel et al. (Jun. 14, 2013) "Frontiers, Opportunities, and Challenges in Biochemical and Chemical Catalysis of CO2 Fixation," Chem. Rev. 113:6621-6658.
Armand et al. (2009) "Ionic-Liquid Materials for the Electrochemical Challenges of the Future," Nat. Mater. 8:621-629.
Atwater et al. (2010) "Plasmonics for Improved Photovoltaic Devices", Nature Material 9:205-214.
Azzaroni et al. (2012), "Polymer Brushes Here, There, and Everywhere: Recent Advances in Their Practical Applications and Emerging Opportunities in Multiple Research Fields," Journal of Polymer Science Part A: Polymer Chemistry. 50:3225-3258.
Babarao et al. (2011) "Understanding the High Solubility of CO2 in an Ionic Liquid with the Tetracyanoborate Anion," J. Phys. Chem. B. 115:9789-9794.
Bae et al. (2005), "Organization of Rigid Wedge-Flexible Coil Block Copolymers into Liquid Crystalline Assembly", Macromolecules 38(10):4226-4230.
Bajpai et al. (2008), "Responsive Polymers in Controlled Drug Delivery", Progress in Polymer Science 33:1088-1118.
Bang et al. (2009) "Block Copolymer Nanolithography: Translation of Molecular Level Control to Nanoscale Patterns," Adv. Mater. 21:4769-4792.
Bang et al. (2009) "Dual Templating Synthesis of Mesoporous Titanium Nitride Microspheres," Adv. Mater. 21:3186-3190.
Barosse-Antle et al. (2010) "Voltammetry in Room Temperature Ionic Liquids: Comparisons and Contrasts with Conventional Electrochemical Solvents," Chem. Asian J. 5:202-230.
Bates et al. (1990) "Block Copolymer Thermodynamics: Theory and Experiment," Ann. Rev. Phys. Chem. 41:525-557.
Bates et al. (1999) "Block Co-polymers-Designer Soft Materials," Physics Today 52:32-38.
Bates et al. (Apr. 27, 2012) "Multiblock Polymers: Panacea or Pandora's Box?" Science 336:434-440.
Bates et al. (Jul. 7, 2015) "ABA Triblock Brush Polymers: Synthesis, Self-Assembly, Conductivity, and Rheological Properties," Macromolecules 48:4967-4973.
Bates et al. (Oct. 7, 2015) "Brush Polymer Ion Gels," J. Polym. Sci. B Polym. Phys. 54:292-300.
Bennett et al. (1982) "Modelling of the Urban Heat Island and of its Interaction with Pollutant Dispersal," Atmospheric Environment 16:1797-1822.
Benson et al. (2009) "Electrocatalytic and homogeneous approaches to conversion of CO2 to liquid fuels," Chem. Soc. Rev. 38:89-99.
Benson et al. (Jun. 20, 2012) "Structural Investigations into the Deactivation Pathway of the CO2 Reduction Electrocatalyst Re(bpy)(CO)3CI," Chem. Commun. 48:7374-7376.
Bertone et al. (1999) "Thickness Dependence of the Optical Properties of Ordered Silica-Air and Air-Polymer Photonic Crystals," Phys. Rev. Lett. 83:300-303.
Bielawski et al. (2007) "Living Ring-Opening Metathesis Polymerization," Prog. Polym. Sci. 32:1-29.
Bielawski et al. (2009) "Living Ring-Opening Metathesis Polymerization," In; Ch. 6 Controlled and Living Polymerizations. Eds.: Müller, A. H. E.; Matyjaszewski, K. Wiley-VCH. Weinheim, Germany. pp. 297-342.
Black (2005) "Self-Aligned Self Assembly of Multi-Nanowire Silicon Field Effect Transistors," Appl. Phys. Lett. 87:163116-163118.
Black et al. (2001) "Integration of Self-Assembled Diblock Copolymers for Semiconductor Capacitor Fabrication," Appl. Phys. Lett. 79:409-411.
Blakemore et al. (Nov. 18, 2013) "Noncovalent Immobilization of Electrocatalysts on Carbon Electrodes for Fuel Production," J. Am. Chem. Soc. 135:18288-18291.
Bockstaller et al. (2005) "Block Copolymer Nanocomposites: Perspectives for Tailored Functional Materials," Adv. Mater. 17:1331-1349.
Bolton et al. (Apr. 15, 2014) "Synthesis and Melt Self-Assembly of PS-PMMA-PLA Triblock Bottlebrush Copolymers," Macromolecules 47:2864-2874.
Bouchet et al. (Apr. 10, 2014) "Charge Transport in Nanostructured PS-PEO-PS Triblock Copolymer Electrolytes," Macromolecules 47:2659-2665.
Bourrez et al. (2011) "[Mn(bipyridyl)(CO)3Br]: an Abundant Metal Carbonyl Complex as Efficient Electrocatalyst for CO2 Reduction," Angew. Chem. Int. Ed. 50:9903-9906.
Braun et al. (1999) "Microporous materials: Electrochemically grown photonic crystals," Nature 402:603-604.
Cabral et al. (Oct. 20, 2015) "Electrochemistry of tris(2,2'-bipyridyl) cobalt(II) in Ionic Liquids and Aprotic Molecular Solvents on Glassy Carbon and Platinum," Electrochim. Acta. 180:419-426.
Campbell et al. (2000) "Fabrication of Photonic Crystals for the Visible Spectrum by Holographic Lithography," Nature. 404:53-56.
Carmesin et al. (1990) "Static and Dynamic Properties of Two-Dimensional Polymer Melts," J. Phys. (Paris). 51:915-932.
Carney et al. (2008), "Intramolecular Hydroamination of Aminoalkynes with Silver-Phenanthroline Catalysts," Org. Lett. 2008 10(17):3903-3906.
Chan et al. (Mar. 10, 2015) "A Robust and Efficient Cobalt Molecular Catalyst for CO2 Reduction," Chem. Commun. 51:7799-7801.
Chen et al. (Aug. 12, 2015) "Molecular Catalysis of the Electrochemical and Photochemical Reduction of CO2 with Earth-Abundant Metal Complexes. Selective Production of CO vs HCOOH by Switching of the Metal Center," J. Am. Chem. Soc. 137:10918-10921.
Chen et al. (Jun. 8, 2012) "Splitting CO2 into CO and O2 by a Single Catalyst," Proc. Natl. Acad. Sci. USA 109:15606-15611.
Cheng et al. (2001) "Formation of a Cobalt Magnetic Dot Array via Block Copolymer Lithography," Adv. Mater. 13:1174-1178.
Cheng et al. (2006) "Templated Self-Assembly of Block Copolymers: Top-Down Helps Bottom-Up," Adv. Mater. 18:2505-2521.
Cheng et al. (2007) "Synthesis of Core-Crosslinked Nanoparticles with Controlled Cylindrical Shape and Narrowly-Dispersed Size via Core-Shell Brush Block Copolymer Templates," Adv. Mater. 19:2830-2835.
Chintapalli et al. (Jul. 23, 2014) "Effect of Grain Size on the Ionic Conductivity of a Block Copolymer Electrolyte," Macromolecules 47(15):5424-5431.
Cho et al. (2008) "Printable Ion-Gel Gate Dielectrics for Low-Voltage Polymer Thin-Film Transistors on Plastic," Nat. Mater. 7:900-906.
Connelly et al. (1996) "Chemical Redox Agents for Organometallic Chemistry," Chem. Rev. 96:877-910.
Costentin et al. (Apr. 21, 2015) "Benchmarking of Homogeneous Electrocatalysts: Overpotential, Turnover Frequency, Limiting Turnover Number," J. Am. Chem. Soc. 137:5461-5467.
Costentin et al. (Dec. 11, 2012) "Catalysis of the Electrochemical Reduction of Carbon Dioxide," Chem. Soc. Rev. 42:2423-2436.

(56) References Cited

OTHER PUBLICATIONS

Costentin et al. (Oct. 5, 2012) "A Local Proton Source Enhances CO2 Electroreduction to CO by a Molecular Fe Catalyst," Science 338:90-94.
Cowie et al. (1990) "Effect of Side Chain Length and Crosslinking on the AC Conductivity of Oligo (Ethyleneoxide) Comb-Branch Polymer-Salt Mixtures," Solid State Ionics 42:243-249.
Crutzen (2004) "New Directions: The Growing Urban Heat and Pollution "Island" Effect—Impact on Chemistry and Climate," Atmospheric Environment 38:3539-3540.
Cushen et al. (2012) "Oligosaccharide/Silicon-Containing Block Copolymers with 5 nm Features for Lithographic Applications," ACS Nano. 6:3424-3433.
Daeffler (2013), "Ring-Opening Metathesis of Bulky Norbornene Monomers and Radical-Mediated Hydrophosphonation of Olefins" Ph.D. Thesis, California Institute of Technology, Pasadena, California.
Daigle et al. (Mar. 6, 2015) "Lithium battery with solid polymer electrolyte based on comb-like copolymers," Journal of Power Sources. 279:372-383.
Dalsin et al. (Apr. 15, 2014) "Molecular Weight Dependence of Zero-Shear Viscosity in Atactic Polypropylene Bottlebrush Polymers," ACS Macro Letters. 3(5):423-427.
Dalsin et al. (Jun. 30, 2015) "Linear Rheology of Polyolefin-Based Bottlebrush Polymers," Macromolecules. 48:4680-4691.
del Valle et al. (Mar. 10, 2015) "Empirical Parameters for Solvent Acidity, Basicity, Dipolarity, and Polarizability of the Ionic Liquids [BMIM][BF4] and [BMIM][PF6]," J. Phys. Chem. B. 119:4683-4692.
Deshmukh et al. (May 1, 2014) "Molecular Design of Liquid Crystalline Brush-Like Block Copolymers for Magnetic Field Directed Self-Assembly: A Platform for Functional Materials," ACS Macro Letters. 3(5):462-466.
Deutsch et al. (1991) "Interdiffusion and Self-Diffusion in Polymer Mixtures: A Monte Carlo Study," J. Chem. Phys. 94:2294-2304.
Eberhardt et al. (2005) "Synthesis of Active Ester Polymers and Block Copolymers via Controlled Radical Polymerization," Polymer Preprints 41(1):100-101.
Eddaoudi et al. (2015) "CO2 Separation, Capture and Reuse: A Web Themed Issue," Chem. Commun. 51:5554-5555.
Edrington et al. (2001) "Polymer-Based Photonic Crystals," Adv. Mater. 13:421-425.
Evans et al. (2005) "A Comparative Electrochemical Study of Diffusion in Room Temperature Ionic Liquid Solvents versus Acetonitrile," ChemPhysChem 6:526-533.
Fabry et al. (Mar. 27, 2015) "Immobilization and Continuous Recycling of Photoredox Catalysts in Ionic Liquids for Applications in Batch Reactions and Flow Systems: Catalytic Alkene Isomerization by Using Visible Light," Chem. Eur. J. 21:5350-5354.
Fenyves et al. (May 12, 2014) "Aqueous Self-Assembly of Giant Bottlebrush Block Copolymer Surfactants as Shape-Tunable Building Blocks," J. Am. Chem. Soc. 136(21):7762-7770.
Ferry et al. (2010), "Design Considerations for Plasmonic Photovoltaics," Adv. Mater 22:4794-4808.
Fetters et al. (1994) "Connection between Polymer Molecular Weight, Density, Chain Dimensions, and Melt Viscoelastic Properties," Macromolecules. 27(17):4639-4647.
Fink et al. (1999) "Block Copolymers as Photonic Bandgap Materials," Journal of Lightwave Technology 17(11):1963-1969.
Finn et al. (Nov. 24, 2011) "Molecular Approaches to the Electrochemical Reduction of Carbon Dioxide," Chem. Commun. 48:1392-1399.
Fiset et al. (2009) "Synthesis, Characterization and Modification of Azide-Containing Dendronized Diblock Copolymers," Polymer 50:1369-1377.
Franco et al. (Oct. 7, 2014) "A local proton source in a [Mn(bpy-R)(CO)3Br]-type redox catalyst enables CO2 reduction even in the absence of Brønsted acids," Chem. Commun. 50:14670-14673.
Fredrickson et al. (1996) "Dynamics of Block Copolymers: Theory and Experiment," Annu. Rev. Mater. Sci. 26: 501-550.
Fu et al. (2011) "Volatilisation of Ferrocene from Ionic Liquids: Kinetics and Mechanism," Chem. Commun. 47:7083-7085.
Fuller et al. (1997) "Ionic Liquid-Polymer Gel Electrolytes," J. Electrochem. Soc. 144:L67-L70.
Fullerton-Shirey et al. (2009) "Effect of LiClO4 on the Structure and Mobility of PEO-Based Solid Polymer Electrolytes," Macromolecules 42:2142-2156.
Galiński et al. (2006) "Ionic Liquids as Electrolytes," Electrochim. Acta. 51:5567-5580.
Galisteo-Lopez et al. (2011) "Self-Assembled Photonic Structures," Adv. Mater 23:30-69.
Ganesan et al. (Mar. 30, 2012) "Mechanisms Underlying Ion Transport in Lamellar Block Copolymer Membranes," ACS Macro Letters 1(4):513-518.
Gao et al. (2007) "Synthesis of Molecular Brushes by "Grafting Onto" Method: Combination of ATRP and Click Reactions," J. Am. Chem. Soc. 129:6633-6639.
Gavelin et al. (2001) "Amphiphilic Polymer Gel Electrolytes. I. Preparation of Gels Based on Poly(Ethylene Oxide) Graft Copolymers Containing Different Ionophobic Groups," Journal of Polymer Science Part A: Polymer Chemistry 39(13):2223-2232.
Ge et al. (Jan. 20, 2011) "Responsive Photonic Crystals," Angew. Chem. Int. Ed. 50:1492-1522.
Gomez et al. (2009) "Effect of Ion Distribution on Conductivity of Block Copolymer Electrolytes," Nano Letters 9(3):1212-1216.
Grason (2006) "The Packing of Soft Materials: Molecular Asymmetry, Geometric Frustration and Optimal Lattices in Block Copolymer Melts," Phys. Rep. 433:1-64.
Green et al. (1989) "Macromolecular Stereochemistry: the Out-of-Proportion Influence of Optically Active Comonomers on the Conformational Characteristics of Polyisocyanates. The Sergeants and Soldiers Experiment," J. Am. Chem. Soc. 111:6452-6454.
Green et al. (1999) "The Macromolecular Route to Chiral Amplification," Angew. Chem. Int. Ed. 38:3138-3154.
Grice et al. (2014) "Recent Studies of Rhenium and Manganese Bipyridine Carbonyl Catalysts for the Electrochemical Reduction of CO2," Ch. 5 In; Advances in Inorganic Chemistry 66:163-188, Elsevier.
Grills et al. (2010) "New Directions for the Photocatalytic Reduction of CO2: Supramolecular, scCO2 or Biphasic Ionic Liquid-scCO2 Systems," J. Phys. Chem. Lett. 1:2709-2718.
Grills et al. (Mar. 28, 2014) "Mechanism of the Formation of a Mn-Based CO2 Reduction Catalyst Revealed by Pulse Radiolysis with Time-Resolved Infrared Detection," J. Am. Chem. Soc. 136:5563-5566.
Grills et al. (May 15, 2014) "Electrocatalytic CO2 Reduction with a Homogeneous Catalyst in Ionic Liquid: High Catalytic Activity at Low Overpotential," J. Phys. Chem. Lett. 5:2033-2038.
Grimm et al. (2008) "Global Change and the Ecology of Cities," Science 319:756-760.
Gu et al. (Dec. 15, 2012) "ABA-Triblock Copolymer Ion Gels for CO2 Separation Applications," J. Membr. Sci. 423-424:20-26.
Gu et al. (Jun. 18, 2013) "High Toughness, High Conductivity Ion Gels by Sequential Triblock Copolymer Self-Assembly and Chemical Cross-Linking," J. Am. Chem. Soc. 135(26):9652-9655.
Gu et al. (Published online Jan. 31, 2013) "Self-Assembly of Symmetric Brush Diblock Copolymers," ACS Nano 7:2551-2558.
Hadjichristidis et al. (2001) "Polymers with Complex Architecture by Living Anionic Polymerization," Chem. Rev. 101:3747-3792.
Hadjichristidis et al. (2003) "The Strength of the Macromonomer Strategy for Complex Macromolecular Architecture: Molecular Characterization, Properties and Applications of Polymacromonomers," Macromol. Rapid Commun. 24:979-1013.
Hallinan et al. (Jul. 2013) "Polymer Electrolytes," Annual Review of Materials Research 43(1):503-525.
Hamley (2003) "Nanostructure Fabrication Using Block Copolymers," Nanotechnology 14:R39.
Hammouda (Fall 2016) "Structure Factors for Particulate Systems," Ch. 32 In; NIST Distance Learning. Accessible on the Internet at URL: http://www.ncnr.nist.gov/staff/hammouda/distance_learning/chapter_32.pdf.
Hapiot et al. (2008) "Electrochemical Reactivity in Room-Temperature Ionic Liquids," Chem. Rev. 108:2238-2264.

(56) References Cited

OTHER PUBLICATIONS

Hashimoto et al. (1993) "Ordered structure in blends of block copolymers. 1. Miscibility criterion for lamellar block copolymers," Macromolecules. 26:2895-2904.
Hashimoto et al. (Mar. 13, 2015) "Gelation Mechanism of Tetra-armed Poly(ethylene glycol) in Aprotic Ionic Liquid Containing Nonvolatile Proton Source, Protic Ionic Liquid," J. Phys. Chem. B. 119:4795-4801.
Hatakeyama et al. (2007) "Coarse-grained simulations of ABA amphiphilic triblock copolymer solutions in thin films," Phys. Chem. Chem. Phys. 9:4662-4672.
Hawecker et al. (1984) "Electrocatalytic reduction of carbon dioxide mediated by Re(bipy)(CO)3Cl(bipy=2,2'-bipyridine)," J. Chem. Soc. Chem. Commun. 6:328-330.
Hawecker et al. (1986) "Photochemical and Electrochemical Reduction of Carbon Dioxide to Carbon Monoxide Mediated by (2,2'-Bipyridine)tricarbonylchlororhenium(I) and Related Complexes as Homogeneous Catalysts," Helvetica Chimica Acta. 69:1990-2012.
Hawker et al. (2005) "Block Copolymer Lithography: Merging 'Bottom-Up' with 'Top-Down' Processes," MRS Bull. 30:952-966.
Hayashi et al. (2003) "Involvement of a Binuclear Species with the Re—C(O)O—Re Moiety in CO2 Reduction Catalyzed by Tricarbonyl Rhenium(I) Complexes with Diimine Ligands: Strikingly Slow Formation of the Re—Re and Re—C(O)O—Re Species from Re(dmb)(CO)3S (dmb=4,4'-Dimethyl-2,2'-bipyridine, S=Solvent)," J. Am. Chem. Soc. 125:11976-11987.
Hayes et al. (Jun. 1, 2015) "Structure and Nanostructure in Ionic Liquids," Chemical Reviews. 115(13):6357-6426.
He et al. (2007) "Ion Gels by Self-Assembly of a Triblock Copolymer in an Ionic Liquid," J. Phys. Chem. B. 111:4645-4652.
Hepp et al. (Feb. 4-5, 1997) "A Chemical Approach to Carbon Dioxide Utilization on Mars," In; The Proceedings of the In Situ Resource Utilization (ISRU) Technical Interchange Meeting 1997. p. 27.
Heroguez et al. (1996) "Synthesis of α-Norbornenylpoly(ethylene oxide) Macromonomers and Their Ring-Opening Metathesis Polymerization," Macromolecules. 29:4459-4464.
Hogan et al. (2004) "Facile Analysis of EC Cyclic Voltammograms," Anal. Chem. 76:2256-2260.
Hong et al. (2010) "Large deformation and electrochemistry of polyelectrolyte gels," J. Mechan. Phys. Solids. 58:558-577.
Hong et al. (Dec. 20, 2012) "Photocatalytic reduction of CO2: a brief review on product analysis and systematic methods," Anal. Methods. 5:1086-1097.
Hong et al. (Oct. 24, 2013) "On the Self-Assembly of Brush Block Copolymers in Thin Films," ACS Nano. 7(11):9684-9692.
Hou et al. (2003) "The effect of different lithium salts on conductivity of comb-like polymer electrolyte with chelating functional group," Electrochimica Acta. 48(6):679-690.
Hsu et al. (May 24, 2013) "Highly conductive, crosslinked ionomers based on poly(styrene-co-maleic anhydride) for water electrolysis," Journal of Materials Chemistry A. 1:8093-8096.
Hu et al. (Apr. 27, 2015) "Transformation of atmospheric CO2 catalyzed by protic ionic liquids: efficient synthesis of 2-oxazolidinones," Angew. Chem., Int. Ed. 54:5399-5403.
Hu et al. (Aug. 4, 2011) "Linear Rheological Response of a Series of Densely Branched Brush Polymers," Macromolecules. 44:6935-6943.
Hultgren et al. (2002) "Reference potential calibration and voltammetry at macrodisk electrodes of metallocene derivatives in the ionic liquid [bmim][PF6]," Anal. Chem. 74:3151-3156.
Hustad et al. (2009) "Photonic Polyethylene from Self-Assembled Mesophases of Polydisperse Olefin Block Copolymers," Macromolecules. 42:3788-3794.
Imaizumi et al. (Apr. 10, 2012) "Driving Mechanisms of Ionic Polymer Actuators Having Electric Double Layer Capacitor Structures," The Journal of Physical Chemistry B. 116:5080-5089.
Inglis et al. (Nov. 2012) "Electrocatalytic pathways towards sustainable fuel production from water and CO2," Coord. Chem. Rev. 256:2571-2600.
Izgorodina et al. (Aug. 12, 2015) "Physical Absorption of CO2 in Protic and Aprotic Ionic Liquids: An Interaction Perspective," J. Phys. Chem. B. 119:11748-11759.
Izuhara et al. (2009) "Electroactive Block Copolymer Brushes on MWCNTs," Macromolecules. 42:5416-5418.
Jeon et al. (1999) "Patterned Polymer Growth on Silicon Surfaces Using Microcontact Printing and Surface-Initiated Polymerization," Applied Physics Letters 75(26):4201-4203.
Jeon et al. (2004) "Fabricating Complex Three-Dimensional Nanostructures with High-Resolution Conformable Phase Masks," Proc. Natl. Acad. Sci. USA 101:12428-12433.
Johnson et al. (1996) "Electrocatalytic Reduction of CO2 Using the Complexes [Re(bpy)(CO)3L]n (n=+1, L=P(OEt)3, CH3CN; n=0, L=Cl−, Otf−; bpy=2,2'-Bipyridine; Otf−=CF3SO3) as Catalyst Precursors: Infrared Spectroelectrochemical Investigation," Organometallics. 15:3374-3387.
Johnson et al. (2010) "Drug-loaded, bivalent-bottle-brush polymers by graft-through ROMP," Macromolecules. 43:10326-10335.
Johnson et al. (Dec. 13, 2011) "Core-Clickable PEG-Branch-Azide Bivalent-Bottle-Brush Polymers by ROMP: Grafting-Through and Clicking-To," J. Am. Chem. Soc. 133:559-566.
Jordan et al. (Aug. 4, 2015) "Biodegradation of ionic liquids—a critical review," Chem. Soc. Rev. 44:8200-8237.
Juris et al. (1988) "Synthesis and photophysical and electrochemical properties of new halotricarbonyl(polypyridine)rhenium(I) complexes," Inorg. Chem. 27:4007-4011.
Kalnay et al. (2003) "Impact of Urban and Land-Use Change on Climate," Nature, vol. 423, 523-531.
Kane et al. (1996) "Phase Behavior and Morphological Characteristics of Compositionally Symmetric Diblock Copolymer Blends," Macromolecules. 29:8862-8870.
Kang et al. (2007) "Broad-Wavelength-Range Chemically Tunable Block-Copolymer Photonic Gels," Nat. Mater. 6:957-960.
Kang et al. (2009) "Full Color Stop Bands in Hybrid Organic/Inorganic Block Copolymer Photonic Gels by Swelling-Freezing," J. Am. Chem. Soc. 131:7538-7539.
Kang et al. (2011) "Ultrafast Cyclopolymerization for Polyene Synthesis: Living Polymerization to Dendronized Polymers," J. Am. Chem. Soc. 133:11904-11907.
Karl et al. (2003) "Modern Global Climate Change," Science. 302:1719-1723.
Keith et al. (Sep. 20, 2013) "Elucidation of the Selectivity of Proton-Dependent Electrocatalytic CO2 Reduction by fac-Re(bpy)(CO)3Cl," J. Am. Chem. Soc. 135:15823-15829.
Kikuchi et al. (2008) "Conformational Properties of Cylindrical Rod Brushes Consisting of a Polystyrene Main Chain and Poly(n-hexyl isocyanate) Side Chains," Macromolecules. 41:6564-6572.
Kim et al. (2001) "A Route to Nanoscopic SiO2 Posts via Block Copolymer Templates," Adv. Mater. 13:795-797.
Kim et al. (Jan. 15, 2015) "Artificial Photosynthesis for Sustainable Fuel and Chemical Production," Angew. Chem., Int. Ed. 54:3259-3266.
Kim et al. (Jul. 20, 2015) "From Self-Assembled Monolayers to Coatings: Advances in the Synthesis and Nanobio Applications of Polymer Brushes," Polymers. 7:1346-1378.
Kinning et al. (1984) "Hard-sphere interactions between spherical domains in diblock copolymers," Macromolecules. 17(9):1712-1718.
Klähn et al. (Jul. 13, 2015) "What Determines CO2 Solubility in Ionic Liquids? A Molecular Simulation Study," J. Phys. Chem. B. 119:10066-10078.
Kobayashi et al. (1985) "Ionically high conductive solid electrolytes composed of graft copolymer-lithium salt hybrids," The Journal of Physical Chemistry. 89:987-991.
Kortlever et al. (Sep. 24, 2015) "Catalysts and Reaction Pathways for the Electrochemical Reduction of Carbon Dioxide," J. Phys. Chem. Lett. 6:4073-4082.
Krause et al. (2003), "Simple Synthesis of Poly(acetylene) Latex Particles in Aqueous Media," Angew. Chem. Int. Ed. 2003, 42, 5965-5969.
Kuan et al. (Jan. 23, 2015) "Controlled ionic conductivity via tapered block polymer electrolytes," RSC Advances 5(17):12597-12604.

(56) References Cited

OTHER PUBLICATIONS

Kumar et al. (2009), "Factors Relevant for the Regioselective Cyclopolymerization of 1,6-Heptadiynes, N,N-Dipropargylamines, N,N-Dipropargylammonium Salts, and Dipropargyl Ethers by RuIV-Alkylidene-Based Metathesis Initiators", J. Am. Chem. Soc., 131, 387-395.

Lam et al. (2015) "A Mn Bipyrimidine Catalyst Predicted to Reduce CO2 at Lower Overpotential," ACS Catal. 5:2521-2528.

Lanson et al. (2007) "Poly(styrene)comb-b-Poly(ethylene oxide)comb Copolymers: Synthesis and AFM Investigation of Intra- and Supramolecular Organization as Thin Deposits," Macromolecules. 40:9503-9509.

Lanson et al. (2007) "Synthesis of (Poly(chloroethyl vinyl ether)-g-polystyrene)comb-b-(poly(chloropyran ethoxy vinyl ether)-g-polyisoprene)comb Copolymers and Study of Hyper-Branched Micelle Formation in Dilute Solutions," Macromolecules. 40:5559-5565.

Lascaud et al. (1994) "Phase Diagrams and Conductivity Behavior of Poly(ethylene oxide)-Molten Salt Rubbery Electrolytes," Macromolecules. 27(25):7469-7477.

Lee et al. (2007) "Ion Gel Gated Polymer Thin-Film Transistors," J. Am. Chem. Soc. 129(15):4532-4533.

Lee et al. (2008) "Hetero-Grafted Block Brushes with PCL and PBA Side Chains," Macromolecules. 41:6073-6080.

Lee et al. (2010) "Quasi-Amorphous Colloidal Structures for Electrically Tunable Full-Color Photonic Pixels with Angle-Independency," Adv. Mater. 22:4973-4977.

Lee et al. (2011) "Electrical Impedance of Spin-Coatable Ion Gel Films," J. Phys. Chem. B. 115:3315-3321.

Lei et al. (Nov. 6, 2013) "Gas Solubility in Ionic Liquids," Chem. Rev. 114:1289-1326.

Leibler (1980) "Theory of Microphase Separation in Block Copolymers," Macromolecules. 13:1602-1617.

Leitgeb et al. (2010) "The ROMP toolbox upgraded," Polymer. 51:2927-2946.

Li et al. (2000) "Dense Arrays of Ordered GaAs Nanostructures by Selective Area Growth on Substrates Patterned by Block Copolymer Lithography," Appl. Phys. Lett. 76:1689-1691.

Li et al. (2001) "The Internal Pressure and New Solubility Parameter of Polymeric Liquids," J. Chem. Eng. Chin. Univ. 3:206-212.— English Abstract Only.

Li et al. (2011) "Dynamic Cylindrical Assembly of Triblock Copolymers by a Hierarchical Process of Covalent and Supramolecular Interactions," J. Am. Chem. Soc. 133(5):1228-1231.

Lim et al. (Sep. 15, 2014) "A review on the electrochemical reduction of CO2 in fuel cells, metal electrodes and molecular catalysts," Catal. Today. 233:169-180.

Lin et al. (1998) "A three-dimensional photonic crystal operating at infrared wavelengths," Nature. 394:251-253.

Lin et al. (Jan. 11, 2013) "Ionic Liquid Co-catalyzed Artificial Photosynthesis of CO," Sci. Rep. 3:1056. pp. 1-5.

Linquist et al. (2008) "Plasmonic Nanocavity Arrays for Enhanced Efficiency in Organic Photovoltaic Cells," Applied Physics Letters. 93:123308.

Lodge (2008) "A Unique Platform for Materials Design," Science. 321(5885):50-51.

Lopes et al. (2001) "Hierarchical Self-Assembly of Metal Nanostructures on Diblock Copolymer Scaffolds," Nature. 414:735-738.

Love et al. (2002) "A Practical and Highly Active Ruthenium-Based Catalyst that Effects the Cross Metathesis of Acrylonitrile," Angew. Chem. Int. Ed. 41:4035-4037.

Lu et al. (2006) "Synthesis and characterization of a novel ABA triblock copolymer via 4,4'-bis(trifluorovinyloxy)biphenyl and methyl methacrylate," Journal of Polymer Science Part A: Polymer Chemistry. 44:5438-5444.

Lu et al. (2009) "Advanced applications of ionic liquids in polymer science," Prog. Polym. Sci. 34(5):431-448.

Luca et al. (Apr. 14, 2015) "The Selective Electrochemical Conversion of Preactivated CO2 to Methane," J. Electrochem. Soc. 162:H473-H476.

Luttge (2009) "Massively Parallel Fabrication of Repetitive Nanostructures: Nanolithography for Nanoarrays," J. Phys. D: Appl. Phys. 42:123001.

MacFarlan et al. (Aug. 15, 2013) "Energy applications of ionic liquids," Energy & Environmental Science. 7(1):232-250.

Machan et al. (Aug. 19, 2015) "Electrocatalytic Reduction of Carbon Dioxide by Mn(CN)(2,2'-bipyridine)(CO)3: CN Coordination Alters Mechanism," J. Inorg. Chem. 54:8849-8856.

Machan et al. (Sep. 16, 2014) "Supramolecular Assembly Promotes the Electrocatalytic Reduction of Carbon Dioxide by Re(I) Bipyridine Catalysts at a Lower Overpotential," J. Am. Chem. Soc. 136:14598-14607.

Maede et al. (2012), "Helical polymer brushes with a preferred-handed helix-sense triggered by a terminal optically active group in the pendant," Chem. Commun, 48, 3342-3344.

Mahurin et al. (Oct. 2, 2012) "High CO2 solubility, permeability and selectivity in ionic liquids with the tetracyanoborate anion," RSC Adv. 2:11813-11819.

Manbeck et al. (Feb. 19, 2015) "Push or Pull? Proton Responsive Ligand Effects in Rhenium Tricarbonyl CO2 Reduction Catalysts," J. Phys. Chem. B. 119:7457-7466.

Marencic et al. (2010) "Controlling Order in Block Copolymer Thin Films for Nanopatterning Applications," Annu. Rev. Chem. Bimol. Eng. 1:277-297.

Masuda et al. (1999) "Photonic Crystal Using Anodic Porous Alumina," Jpn. J. Appl. Phys. 38:L1403-L1405.

Matsen et al. (1997) "Conformationally asymmetric block copolymers," J. Poly. Sci. Part B: Polym. Phys. 35:945-952.

Matson et al. (2008) "Synthesis of Fluorine-18 Functionalized Nanoparticles for use as in vivo Molecular Imaging Agents," J. Am. Chem. Soc. 130:6731-6733.

Matsubara et al. (Nov. 6, 2013) "Reactivity of a fac-ReCl(α-diimine)(CO)3 complex with an NAD+ model ligand toward CO2 reduction," Chem. Commun. 50:728-730.

Matsubara et al. (Sep. 17, 2015) "Thermodynamic Aspects of Electrocatalytic CO2 Reduction in Acetonitrile and with an Ionic Liquid as Solvent or Electrolyte," ACS Catal. 5:6440-6452.

Maxein et al. (1998), "Opalescent Cholesteric Networks from Chiral Polyisocyanates in Polystyrene," Adv. Mater., 10, 341-345.

Maxein et al. (1999) "Structure-Property Relations in Cholesteric Networks from Chiral Polyisocyanates," Macromolecules. 32:5747-5754.

Mayer et al. (2001) "Chiral polyisocyanates, a special class of helical polymers," Prog. Polym. Sci. 26:1973-2013.

Mayershofer et al. (2006), Bi- and Trinuclear Ruthenium Alkylidene Triggered Cyclopolymerization of 1,6-Heptadiynes: Access to An-X-An Block and (An)3X Tristar Copolymers, Macromolecules, 39, 3484-3493.

McIntosh et al. (Feb. 27, 2015) "Evolution of Morphology, Modulus, and Conductivity in Polymer Electrolytes Prepared via Polymerization-Induced Phase Separation," Macromolecules. 48(5):1418-1428.

Meyer (1998) "Polymer Electrolytes for Lithium-Ion Batteries," Advanced Materials. 10(6):439-448.

Milner et al. (1988), "Theory of the Grafted Polymer Brush," Mecromolecules, 21(8):2610-2619.

Miranda et al. (Nov. 26, 2013) "Cross-Linked Block Copolymer/Ionic Liquid Self-Assembled Blends for Polymer Gel Electrolytes with High Ionic Conductivity and Mechanical Strength," Macromolecules. 46(23):9313-9323.

Miyake et al. (2010) "Stereospecific Polymerization of Chiral Oxazolidinone-Functionalized Alkenes," Macromolecules. 43:7504-7514.

Miyake et al. (Published online Aug. 14, 2012) "Synthesis of Isocyanate-Based Brush Block Copolymers and Their Rapid Self Assembly to Infrared Reflecting Photonic Crystals," J. Am. Chem. Soc. 134:14249-14254.

Miyake et al. (Published online Sep. 13, 2012) "Precisely Tunable Photonic Crystals From Rapidly Self-Assembling Brush Block Copolymer Blends," Angew. Chem. Int. Ed. 51:11246-11248.

Moon et al. (2010) "Chemical Aspects of Three-Dimensional Photonic Crystals," Chem. Rev. 110:547-574.

(56) References Cited

OTHER PUBLICATIONS

Moon et al. (Feb. 11, 2014) "Solution-Processable Electrochemiluminescent Ion Gels for Flexible, Low-Voltage, Emissive Displays on Plastic," J. Am. Chem. Soc. 136(9):3705-3712.
Mortensen et al. (1993) "Structural study on the micelle formation of poly(ethylene oxide)-poly(propylene oxide)-poly(ethylene oxide) triblock copolymer in aqueous solution," Macromolecules. 26(4):805-812.
Muftuoglu et al. (2004) "Photoinitiated Crosslinking and Grafting of Methylmethacrylate Using N,N-Dimethyl Amino Functional Polystyrene Block Copolymers," Turk. J. Chem. 28:469-476.
Neiser et al. (2003) "Polymerization of Macromonomers to Cylindrical Brushes Initiated by Organolanthanides," Macromolecules. 36:5437-5439.
Neugebauer et al. (2004) "How Dense are Cylindrical Brushes Grafted from a Multifunctional Macroinitiator?" Polymer. 45:8173-8179.
Nguyen et al. (May 28, 2015) "Nanocomposite hydrogels based on liquid crystalline brush-like block copolymer-Au nanorods and their application in H2O2 detection," Chem. Commun. 51:12174-12177.
Nguyen et al. (Sep. 29, 2014) "Nanostructured ion gels from liquid crystalline block copolymers and gold nanoparticles in ionic liquids: manifestation of mechanical and electrochemical properties," Journal of Materials Chemistry C. 3:399-408.
Nicholson et al. (1964) "Theory of Stationary Electrode Polarography. Single Scan and Cyclic Methods Applied to Reversible, Irreversible, and Kinetic Systems," Anal. Chem. 36:706-723.
Niitani et al. (2005) "Characteristics of new-type solid polymer electrolyte controlling nano-structure," Journal of Power Sources. 146(1-2):386-390.
Niitani et al. (2005) "Synthesis of Li+ Ion Conductive PEO-PSt Block Copolymer Electrolyte with Microphase Separation Structure," Electrochem. Solid-State Lett. 8:A385-A388.
Niitani et al. (2009) "Star-Shaped Polymer Electrolyte with Microphase Separation Structure for All-Solid-State Lithium Batteries," Journal of the Electrochemical Society. 156(7) :A577-A583.
O'Toole et al. (1985) "Electrocatalytic reduction of CO2 at a chemically modified electrode," J. Chem. Soc. Chem. Commun. 20:1416-1417.
Oh et al. (Jul. 21, 2015) "Ionic liquids enhance the electrochemical CO2 reduction catalyzed by MoO2," Chem. Commun. 51:13698-13701.
Ong et al. (2011) "Electrochemical Windows of Room-Temperature Ionic Liquids from Molecular Dynamics and Density Functional Theory Calculations," Chem. Mater. 23:2979-2986.
Oono et al. (1988) "$\frac{2}{3}$-Power Law for Copolymer Lamellar Thickness Implies a $\frac{1}{3}$-Power Law for Spinodal Decomposition," Phys. Rev. Lett. 61:1109-1111.
Orfanidis (Retrieved May 2012) Electromagnetic Waves and Antennas. Online book. Accessible on the Internet at URL: http:// http:// www.ece.rutgers.edu/~orfanidi/ewa.
Pakula et al. (2006) "Molecular brushes as super-soft elastomers," Polymer. 47(20):7198-7206.
Panday et al. (2009) "Effect of Molecular Weight and Salt Concentration on Conductivity of Block Copolymer Electrolytes," Macromolecules. 42(13):4632-4637.
Pangborn et al. (1996) "Safe and Convenient Procedure for Solvent Purification," Organometallics. 15:1518-1520.
Paquet et al. (2008) "Nanostructured polymers for photonics," Materials Today. 2008, 11, 48-56.
Park et al. (1997) "Block Copolymer Lithography: Periodic Arrays of ~1011 Holes in 1 Square Centimeter," Science. 276:1401-1404.
Park et al. (2003) "Enabling Nanotechnology with Self Assembled Block Copolymer Patterns," Polymer. 44:6725-6760.
Park et al. (2009) "Macroscopic 10-Terabit-per-Square-Inch Arrays from Block Copolymers with Lateral Order," Science. 323:1030-1033.
Parnell et al. (Feb. 4, 2011) "Continuously Tuneable Optical Filters from Self-Assembled Block Copolymer Blends," Soft Matter. 7:3721-3725.
Patten et al. (1991) "'Living' titanium(IV) catalyzed coordination polymerizations of isocyanates," J. Am. Chem. Soc. 113:5065-5066.
Patten et al. (1996) "Living Organotitanium(IV)-Catalyzed Polymerizations of Isocyanates," J. Am. Chem. Soc. 118:1906-1916.
Patz et al. (2005) "Impact of regional climate change on human health," Nature. 438:310-317.
Pedersen (1994) "Determination of size distribution from small-angle scattering data for systems with effective hard-sphere interactions," Journal of Applied Crystallography. 27(4):595-608.
Pelletier et al. (2006) "Aluminum nanowire polarizing grids: Fabrication and analysis," Appl. Phys. Lett. 88:211114.
Peng et al. (2011) "Surface Urban Heat Island Across 419 Global Big Cities," Environ. Sci. Technol. 2012, 46, 696-703.
Ping et al. (Nov. 24, 2015) "Microphase Separation and High Ionic Conductivity at High Temperatures of Lithium Salt-Doped Amphiphilic Alternating Copolymer Brush with Rigid Side Chains," Macromolecules. 48(23):8557-8564.
Poelma et al. (2012) "Cyclic Block Copolymers for Controlling Feature Sizes in Block Copolymer Lithography," ACS Nano. 6:10845-10854.
Pusey et al. (1986) "Phase behaviour of concentrated suspensions of nearly hard colloidal spheres," Nature. 320(6060):340-342.
Qiao et al. (Nov. 1, 2013) "A review of catalysts for the electroreduction of carbon dioxide to produce low-carbon fuels," J. Chem. Soc. Rev. 43:631-675.
Quartarone et al. (2011) "Electrolytes for solid-state lithium rechargeable batteries: recent advances and perspectives," Chem. Soc. Rev. 40:2525-2540.
Quezada et al. (May 20, 2014) "Electrocatalytic reduction of carbon dioxide on a cobalt tetrakis(4-aminophenyl)porphyrin modified electrode in BMImBF4," New J. Chem. 38:3606-3612.
Quinn et al. (2002) "Novel Electrochemical Studies of Ionic Liquids," Langmuir. 18:1734-1742.
Rey et al. (Jul. 14, 2015) "Structural Transition in an Ionic Liquid Controls CO2 Electrochemical Reduction," J. Phys. Chem. C. 119:20892-20899.
Rizwan et al. (2008) "A review on the generation, determination and mitigation of Urban Heat Island," Journal of Environmental Sciences. 20:120-128.
Rogers et al. (2008) "Voltammetric Characterization of the Ferrocene|Ferrocenium and Cobaltocenium|Cobaltocene Redox Couples in RTILs," J. Phys. Chem. C. 112:2729-2735.
Runge et al. (2007) "Synthesis of High Molecular Weight Comb Block Copolymers and Their Assembly into Ordered Morphologies in the Solid State," J. Am. Chem. Soc. 129:10551-10560.
Runge et al. (2008) "Investigation of the Assembly of Comb Block Copolymers in the Solid State," Macromolecules. 41:7687-7694.
Rutenburg (2004) "Synthesis of Polymer Dielectric Layers for Organic Thin Film Transistors via Surface-Initiated Ring-Opening Metathesis Polymerization," J. Am. Chem. Soc. 2004, 126,4062-4063.
Rzayev (2009) "Synthesis of Polystyrene-Polylactide Bottlebrush Block Copolymers and Their Melt Self-Assembly into Large Domain Nanostructures," Macromolecules. 42:2135-2141.
Rzayev (Sep. 10, 2012) "Molecular Bottlebrushes: New Opportunities in Nanomaterials Fabrication," J. ACS Macro. Lett. 1:1146-1149.
Sahara et al. (Jan. 28, 2015) "Efficient Photocatalysts for CO2 Reduction," Inorg. Chem. 54:5096-5104.
Sampson et al. (Mar. 18, 2014) "Manganese Catalysts with Bulky Bipyridine Ligands for the Electrocatalytic Reduction of Carbon Dioxide: Eliminating Dimerization and Altering Catalysis," J. Am. Chem. Soc. 136:5460-5471.
Sampson et al. (Oct. 22, 2013) "Direct observation of the reduction of carbon dioxide by rhenium bipyridine catalysts," Energy Environ. Sci. 6:3748-3755.
Savéant (2008) "Molecular Catalysis of Electrochemical Reactions. Mechanistic Aspects," Chem. Rev. 108:2348-2378.
Schappacher et al. (2005) "From Combs to Comb-g-Comb Centipedes," Macromolecules. 38:7209-7213.

(56) References Cited

OTHER PUBLICATIONS

Schulze et al. (Dec. 13, 2013) "High-Modulus, High-Conductivity Nanostructured Polymer Electrolyte Membranes via Polymerization-Induced Phase Separation," Nano Lett. 14(1):122-126.
Seel et al. (2000) "Electrochemical Intercalation of PF 6 into Graphite," J. Electrochem. Soc. 147(3):892-898.
Segalman (2005) "Patterning with Block Copolymer Thin Films," Materials Science and Engineering. R48:191-226.
Seitz et al. (2007) "Self-Assembly and Stress Relaxation in Acrylic Triblock Copolymer Gels," Macromolecules. 40(4):1218-1226.
Seki et al. (2005) "Distinct Difference in Ionic Transport Behavior in Polymer Electrolytes Depending on the Matrix Polymers and Incorporated Salts," The Journal of Physical Chemistry B. 109(9):3886-3892.
Seo et al. (Aug. 12, 2015) "Effect of Cation on Physical Properties and CO2 Solubility for Phosphonium-Based Ionic Liquids with 2-Cyanopyrrolide Anions," J. Phys. Chem. B. 119:11807-11814.
Shah et al. (2011), "Chiroptical Properties of Graft Copolymers Containing Chiral Poly(n-hexyl isocyanate) as a Side Chain," Macromolecules. 44:7917-7925.
Sheiko et al. (2001) "Visualization of Macromolecules—A First Step to Manipulation and Controlled Response," Chem. Rev. 101:4099-4123.
Singh et al. (2007) "Effect of Molecular Weight on the Mechanical and Electrical Properties of Block Copolymer Electrolytes," Macromolecules. 40(13):4578-4585.
Slugovc (2004) "The Ring Opening Metathesis Polymerisation Toolbox," Macromol. Rapid Commun. 25:1283-1297.
Smieja et al. (2010) "Re(bipy-tBu)(CO)3Cl—improved Catalytic Activity for Reduction of Carbon Dioxide: IR-Spectroelectrochemical and Mechanistic Studies," Inorg. Chem. 49:9283-9289.
Smieja et al. (Feb. 18, 2013) "Manganese as a Substitute for Rhenium in CO2 Reduction Catalysts: The Importance of Acids," J. Am. Chem. Soc. 52:2484-2491.
Song et al. (1999) "Review of gel-type polymer electrolytes for lithium-ion batteries," J. Power Sources 77:183-197.
Soo et al. (2004) "Preparation of Block Copolymer in Solution," J. Polym. Sci. Part B.: Polym. Phy. 42(6):923-938.
South et al. (2007), "Modular and Dynamic Functionalization of Polymeric Scaffolds," Accounts of Chemical Research. 40(1):63-74.
Stephan et al. (2006) "Review on composite polymer electrolytes for lithium batteries," Polymer. 47(16):5952-5964.
Stoykovich et al. (2006) "Block Copolymers and Conventional Lithography," Materials Today. 9:20.
Sullivan et al. (1985) "One- and two-electron pathways in the electrocatalytic reduction of CO2 by fac-Re(bpy)(CO)3Cl (bpy=2,2'-bipyridine)," J. Chem. Soc. Chem. Commun. 20:1414-1416.
Sumerlin et al. (2007) "Initiation Efficiency in the Synthesis of Molecular Brushes by Grafting from via Atom Transfer Radical Polymerization," Macromolecules. 38:702-708.
Sun et al. (Jun. 8, 2012) "Structure-Conductivity Relationship for Peptoid-Based PEO-Mimetic Polymer Electrolytes," Macromolecules. 45(12):5151-5156.
Sun et al. (May 13, 2014) "Switching the Reaction Course of Electrochemical CO2 Reduction with Ionic Liquids," Langmuir. 30:6302-6308.
Susan et al. (2005) "Ion Gels Prepared by in Situ Radical Polymerization of Vinyl Monomers in an Ionic Liquid and Their Characterization as Polymer Electrolytes," J. Am. Chem. Soc. 127(13):4976-4983.
Sveinbjörnsson et al. (Jul. 30, 2012) "Rapid Self-Assembly of Brush Block Copolymers to Photonic Crystals," Proc. Natl. Acad. Sci. USA. 109(36):14332-14336.
Taheri et al. (Oct. 27, 2015) "An Iron Electrocatalyst for Selective Reduction of CO2 to Formate in Water: Including Thermochemical Insights," ACS Catal. 5:7140-7151.
Tan et al. (2009) "Gels of ionic liquid [C4mim]PF6 formed by self-assembly of gelators and their electrochemical properties," Electrochem. Commun. 11:933-936.
Tang et al. (2007) "Synthesis and Morphology of Molecular Brushes with Polyacrylonitrile Block Copolymer Side Chains and Their Conversion into Nanostructured Carbons," Macromolecules 40:6199-6205.
Tang et al. (Jul. 7, 2015) "Synergistic Increase in Ionic Conductivity and Modulus of Triblock Copolymer Ion Gels," Macromolecules. 48(14):4942-4950.
Teran et al. (Jan. 25, 2012) "Discontinuous Changes in Ionic Conductivity of a Block Copolymer Electrolyte through an Order-Disorder Transition," ACS Macro Letters. 1(2):305-309.
Teran et al. (Jan. 9, 2014) "Thermodynamics of Block Copolymers with and without Salt," The Journal of Physical Chemistry B. 118(1):4-17.
Thompson et al. (2005) "Solvent Accelerated Polymer Diffusion in Thin Films," Macromolecules. 38:4339-4344.
Thurn-Albrecht et al. (2000) "High-Density Nanowire Arrays Grown in Self-Assembled Diblock Copolymer Templates," Science. 290:2126-2129.
Trapa et al. (2005) "Rubbery Graft Copolymer Electrolytes for Solid-State, Thin-Film Lithium Batteries," Journal of the Electrochemical Society. 152(1):A1-A5.
Trapa et al. (2005) "Synthesis and Characterization of Single-Ion Graft Copolymer Electrolytes," Journal of the Electrochemical Society. 152(12):A2281-A2284.
Troparevsky et al. (2010) "Transfer-matrix formalism for the calculation of optical response in multilayer systems: from coherent to incoherent interference," Optics Express. 18:24715-24721.
Tseng et al. (2010) "Block Copolymer Nanostructures for Technology," Polymers. 2:470-489.
Tsurumaki et al. (2011) "Properties of polymer electrolytes composed of poly(ethylene oxide) and ionic liquids according to hard and soft acids and bases theory," Polym. Adv. Technol. 22:1223-1228.
Ueki et al. (2008) "Macromolecules in Ionic Liquids: Progress, Challenges, and Opportunities," Macromolecules. 41(11):3739-3749.
Ueki et al. (Jan. 22, 2015) "Photoreversible Gelation of a Triblock Copolymer in an Ionic Liquid," Angew. Chem., Int. Ed. 54:3018-3022.
Underwood (1940) "Industrial Synthesis of Hydrocarbons from Hydrogen and Carbon Monoxide," Ind. Eng. Chem. 32:449-454.
Urbas et al. (1999) "One-Dimensionally Periodic Dielectric Reflectors from Self-Assembled Block Copolymers—Homopolymer Blends," Macromolecules. 32:4748-4750.
Urbas et al. (2000) "Tunable Block Copolymer/Homopolymer Photonic Crystals," Adv. Mater. 12:812-814.
Valkama et al. (2004) "Self-Assembled Polymeric Solid Films with Temperature-Induced Large and Reversible Photonic-Bandgap Switching," Nature Mater. 3:872-876.
van Gurp et al. (1998) "Time-Temperature Superposition for Polymer Blends," Rheol. Bull. 67:5-8.
Vayer et al. (2010) "Perpendicular Orientation of Cylindrical Domains Upon Solvent Annealing Thin Films of Polystyrene-B-Polylactide," Thin Solid Films. 518:3710-3715.
Verduzco et al. (Feb. 17, 2015) "Structure, function, self-assembly, and applications of bottlebrush copolymers," Chem. Soc. Rev. 44:2405-2420.
Vougioukalakis et al. (2010) "Ruthenium-Based Heterocyclic Carbene-Coordinated Olefin Metathesis Catalysts," Chem. Rev. 110:1746-1787.
Vygodskii et al. (2008) "Cyclopolymerization of N,N-Dipropargylamines and N,N-Dipropargyl Ammonium Salts," Macromolecules 2008, 41, 1919-1928.
Walsh et al. (Sep. 3, 2014) "Electrocatalytic CO2 reduction with a membrane supported manganese catalyst in aqueous solution," Chem. Commun. 50:12698-12701.
Wanakule et al. (2010) "Thermodynamic Properties of Block Copolymer Electrolytes Containing Imidazolium and Lithium Salts," Macromolecules. 43:8282-8289.
Wang et al. (2003) "All Solid-State Lithium-Polymer Battery Using a Self-Cross-Linking Polymer Electrolyte," Journal of the Electrochemical Society. 150(9):A1166-A1170.

(56) References Cited

OTHER PUBLICATIONS

Wang et al. (Mar. 14, 2011) "Bioinspired Colloidal Photonic Crystals with Controllable Wettability," Acc. Chem. Res. 44:405-415.
Watanabe et al. (1999) "High ionic conductivity and electrode interface properties of polymer electrolytes based on high molecular weight branched polyether," J. Power Sources. 81-82:786-789.
Welton (1999) "Room-Temperature Ionic Liquids. Solvents for Synthesis and Catalysis," Chem. Rev. 99:2071-2084.
Welton (2004) "Ionic liquids in catalysis," Coord. Chem. Rev. 248:2459-2477.
Westphalen et al. (1999) "Metal Cluster Enhanced Organic Solar Cells," Solar Energy Materials & Solar Cells. 61:97-105.
Xia et al. (1984) "Conductivities of solid polymer electrolyte complexes of alkali salts with polymers of methoxypolyethyleneglycol methacrylates," Solid State Ionics. 14:221-224.
Xia et al. (2009) "Efficient synthesis of narrowly dispersed brush copolymers and study of their assemblies: the importance of side chain arrangement," J. Am. Chem. Soc. 131:18525-18532.
Xia et al. (2009) "Efficient Synthesis of Narrowly Dispersed Brush Polymers via Living Ring-Opening Metathesis Polymerization of Macromonomers," Macromolecules. 42:3761-3766.
Xiong et al. (Apr. 29, 2015) "Reversible Hydrophobic-Hydrophilic Transition of Ionic Liquids Driven by Carbon Dioxide," Angew. Chem., Int. Ed. 54:7265-7269.
Xu et al. (Apr. 10, 2015) "ABC Triblock Copolymer Particles with Tunable Shape and Internal Structure through 3D Confined Assembly," Macromolecules. 48:2628-2636.
Xu et al. (Nov. 24, 2011) "Fabrication of Silicon Oxide Nanodots with an Areal Density Beyond 1 Teradots Inch-2," Adv. Mater. 22:5755.
Yamaguchi et al. (2001) "A Phase Diagram for the Binary Blends of Nearly Symmetric Diblock Copolymers. 1. Parameter Space of Molecular Weight Ratio and Blend Composition," Macromolecules. 34:6495-6505.
Yang et al. (2010), "Supramolecular ABC Triblock Copolymers via One-Pot, Orthogonal Self-Assembly," J. Am. Chem Soc.. 132:1637-1645.
Yashima et al. (2009) "Helical Polymers: Synthesis, Structures, and Functions," Chem. Rev. 109:6102-6211.
Ye et al. (Nov. 13, 2012) "Ionic liquid polymer electrolytes," J. Mater. Chem. A. 1:2719-2743.
Yoon et al. (2005) "Self-Assembly of Block Copolymers for Photonic-Bandgap Materials," MRS Bull. 2005, 30, 721-726.
Yoon et al. (2006) "Optically Transparent and High Molecular Weight Polyolefin Block Copolymers toward Self-Assembled Photonic Band Gap Materials," Macromolecules. 39:1913-1919.
Yoon et al. (2008) "Thermochromic Block Copolymer Photonic Gel," Macromolecules. 41:4582-4584.
Young et al. (2011) "Mixed-Salt Effects on the Ionic Conductivity of Lithium-Doped PEO-Containing Block Copolymers," Macromolecules. 44(20):8116-8123.
Young et al. (Nov. 4, 2013) "Block copolymer electrolytes for rechargeable lithium batteries," Journal of Polymer Science Part B: Polymer Physics. 52(1):1-16.
Young et al. (Sep. 2014) "Investigating polypropylene-poly(ethylene oxide)-polypropylene triblock copolymers as solid polymer electrolytes for lithium batteries," Solid State Ionics 263:87-94.
Yuan et al. (2013) "Ionic Conductivity of Low Molecular Weight Block Copolymer Electrolytes," Macromolecules. 46(3):914-921.
Zalusky et al. (2002) "Ordered Nanoporous Polymers from Polystyrene-Polylactide Block Copolymers," J. Am. Chem. Soc. 124:12761-12773.
Zhang (2012) "Block Copolymer-Based Ion Gels as Solid Polymer Electrolytes," Dissertation (Ph.D.). University of Minnesota.
Zhang et al. (2004) "Super soft elastomers as ionic conductors," Polymer. 45(18):6333-6339.
Zhang et al. (2005) "Cylindrical Polymer Brushes," J. Polym. Sci. Part A: Polym. Chem. 43:3461-3481.
Zhang et al. (2006) "Physical Properties of Ionic Liquids: Database and Evaluation," J. Phys. Chem. Ref. Data. 35:1475-1517.
Zhang et al. (2007) "Electrochemical behaviors and spectral studies of ionic liquid (1-butyl-3-methylimidazolium tetrafluoroborate) based sol-gel electrode," J. Electroanal. Chem. 603:243-248.
Zhang et al. (2011) "Ionic Conductivity, Capacitance, and Viscoelastic Properties of Block Copolymer-Based Ion Gels," Macromolecules. 44(4):940-949.
Zhang et al. (2011) "Viscoelastic Properties, Ionic Conductivity, and Materials Design Considerations for Poly(styrene-b-ethylene oxide-b-styrene)-Based Ion Gel Electrolytes," Macromolecules. 44(22):8981-8989.
Zhao et al. (2002) "Ionic liquids: applications in catalysis," Catal. Today. 74:157-189.
Zhao et al. (2008) "Crystallization and thermal properties of PLLA comb polymer," Journal of Polymer Science Part B: Polymer Physics. 46(6):589-598.
Zhao et al. (2008) "Electrochemistry of Room Temperature Protic Ionic Liquids," J. Phys. Chem. B. 112:6923-6936.
Zheng et al. (1995) "Morphology of ABC triblock copolymers," Macromolecules. 28:7215-7223.
Zhulina (2008) "Polymer brushes: Simple Views on Polymers at Surfaces and Interfaces: Simposium Honoring P.-G. de Gennes", APS meeting, Mar. 13, 2008, New Orleans USA, Institute of Macromolecular Compounds, Russian Academy of Sciences, St. Petersburg, Russia.
Zhulina (Jul. 30-Aug. 1, 2012) "Polymer brushes: Polymers in Soft and Biological Matter" Jul. 30-Aug. 1, 2012, Boulder CO, USA, Institute of Macromolecular Compounds, Russian Academy of Sciences, St. Petersburg, Russia.
Zigon et al: Eds. (Apr. 3-5, 2013) The Proceedings of the Austrian-Slovenian Polymer Meeting 2013. Centre of Excellence PoliMaT. Bled, Slovenia. pp. 1-303.
International Search Report and Written Opinion dated Jul. 18, 2013, corresponding to International Application No. PCT/US2013/030978.

\* cited by examiner

TRIBLOCK BRUSH BLOCK COPOLYMERS

CROSS-REFERENCE TO RELATED APPLICATIONS

This application claims the benefit of and priority to U.S. Provisional Patent Application No. 62/130,385, filed Mar. 9, 2015, which is hereby incorporated by reference in its entirety to the extent not inconsistent with the disclosure herein.

STATEMENT REGARDING FEDERALLY SPONSORED RESEARCH OR DEVELOPMENT

This invention was made with government support under Grant No. CHE1212767 awarded by the National Science Foundation. The government has certain rights in the invention. The government has certain rights in the invention.

BACKGROUND

Well-defined, periodic nanostructures have received considerable attention since they can serve as useful templates and scaffolds for nanodots, nanowires, magnetic storage media, semiconductors, optical devices, polarizers, and photonic materials. For this purpose, bottom-up approaches have extensively been studied because they can offer an efficient, cost-effective strategy to overcome the technological and economic limits associated with large-scale top-down approaches. The self-assembly of block copolymers (BCPs), one of the most promising candidates for this purpose, has widely been studied as the sizes, spacings, and morphologies of the nanostructures from the self-assembled BCPs can be effectively tuned by varying molecular weight and composition ratio of BCPs. As importantly, the versatilities in the properties of the blocks can be easily introduced by many well-known chemical techniques.

Block copolymers consist of chemically distinct polymer blocks which are covalently bound together along a polymer backbone. The block molecular connectivity of certain classes of block copolymers allows them to undergo efficient self-assembly to form periodic nanostructures having consistent domain spacing. Further, the composition and size of polymer blocks can be selected to control the physical dimensions, arrangement and chemical properties of nanostructure domains. Block copolymers may incorporate a range of block configurations, including AB diblock, ABC triblock, ABA triblock or larger combinations such as ABCBA pentablock, providing further versatility in achieving useful self-assembled structures.

For some practical applications in optical and electronic materials, for example, the alternating domain spacing of the self-assembled BCPs beneficially extends up to a few hundred nanometers. Thomas and coworkers utilized the partially cross-linked, conventional BCPs to prepare photonic band gap materials for visible wavelengths, but this normally requires the molecular weight (MW) of BCPs to be extremely large for the applications mentioned above. It is noted that, according to the model system for polymers with the MW over the critical entanglement MW, the viscosity of polymers gets higher abruptly as the MW gets larger due to polymer chain-entanglement, which yields a significant kinetic barrier for the effective self-assembly of conventional BCPs with high MW. For this reason, the defects might not be able to be effectively annihilated even upon longer annealing time due to the entanglement, and there could be degradation of polymer chains upon thermal treatment due to significantly increased annealing temperature and time to overcome the kinetic barrier.

Brush polymers (also called comb or graft polymers) are defined as grafted polymers with both relatively high MW and significantly dense and regularly spaced side brush chains attached to the backbone. Due to the significant steric hindrance between densely grafted side brush chains, brush polymers can have an extended backbone and exhibit a reduced degree of chain-entanglement compared to conventional polymers. Therefore, it is often favorable for brush polymers to self-assemble into well aligned and ordered nanostructures even though the MW of brush polymers is relatively high. There are three general methods to make brush polymers. In the "grafting from" approach, a macro-initiator backbone is first synthesized but there are limitations in the efficiency of its initiation and conversion of monomers. The "grafting onto" method, where the side chains and the backbone are separately synthesized and then coupled together, have difficulties in obtaining complete grafting due to increasing steric hindrance and the subsequent purification of unreacted brush side chains can be problematic. In the "grafting through" method, which is also called the "macromonomer (MM) approach" the side chains are synthesized with a polymerizable end group which is subsequently polymerized. This approach has many advantages over those 'graft from' or 'graft onto' approaches, but still contains drawbacks like not being able to obtain high MW and/or narrow polydispersity index (PDI). Recently, Grubbs and coworkers successfully reported a novel ring-opening metathesis polymerization (ROMP) exploiting the high ring strain of norbornene monomer and the high activity of Ru-based olefin metathesis catalyst to synthesize brush polymers with ultra-high MW, narrow PDI, and well-defined, structural architectures. [see, Y. Xia, B. D. Olsen, J. A. Kornfield, R. H. Grubbs, J. Am. Chem. Soc. 2009, 131, 18525].

It will be apparent from the foregoing description that block copolymer materials exhibiting useful physical, chemical and optical properties are useful for a range of applications including photonics, optoelectronics, and molecular templates and scaffolding. Specifically versatile block copolymer materials are needed that are capable of efficient self-assembly to generate structures supporting a range of target applications.

SUMMARY OF THE INVENTION

Provided herein is a class of copolymers, including triblock brush copolymers having specific block configurations, for example, ABC triblock brush copolymers and ABA triblock brush copolymers. In an embodiment, for example, copolymers of the invention incorporate various polymer side chain groups which contribute beneficial physical, chemical, or electronic properties. For example, block copolymers of certain embodiments undergo efficient self-assembly to form networks characterized by useful mechanical and/or elastic strengths and ionic or electronic conductivities. In some embodiments, the provided copolymers exhibit advantageous steric properties resulting in extended polymer backbones and allowing for faster kinetic self-assembly than linear analogues into a variety of morphologies.

In an aspect, provided is a brush block copolymer comprising: (i) a first polymer block and a third polymer block each independently comprising at least 3 first repeating units, wherein each of the first repeating units of the first and third polymer blocks comprises a first polymer backbone group directly or indirectly covalently linked to an ionophobic polymer side chain group; and (ii) a second polymer block comprising at least 3 second repeating units; wherein each of the second repeating units of the second polymer block comprises a second polymer backbone group directly or indirectly covalently linked to an ionophilic polymer side chain group; wherein the second polymer block is directly or indirectly covalently linked to both first the polymer block and the third polymer block along a backbone and the second polymer block is positioned between the first polymer block and the third polymer block. In an embodiment, for example, the brush block copolymer is a triblock brush copolymer.

In embodiments, the triblock brush copolymer is defined by the formula A'-B-A", wherein A' is the first polymer block, B is the second polymer block, and A" is the third polymer block. In an embodiment, the brush block polymer has a molecular weight selected from the range of 500 Daltons to 2,000,000 Daltons, selected from the range of 1,000 Daltons to 1,000,000 Daltons, or optionally, selected from the range of 1,000 Daltons to 5,000,000 Daltons. In embodiments, the brush block copolymer comprises 3 to 1000 of the first repeating units in the first polymer block, in some embodiments 10 to 5000 of the first repeating units in the first polymer block or, for example, 10 to 500 of the first repeating units in the first polymer block. In some embodiments, the brush block copolymer comprises 3 to 1000 of the second repeating units in the second polymer block, in some embodiments 10 to 5000 of the second repeating units in the second polymer block or, for example, 10 to 500 of the second repeating units in the second polymer block. In some embodiments, the brush block copolymer comprises 3 to 1000 of the first repeating units in the third polymer block, in some embodiments 10 to 5000 of the first repeating units in the third polymer block or, for example, 10 to 500 of the first repeating units in the third polymer block. In embodiments, each of the ionophobic polymer side chains independently has 3 to 100 repeating units, in some embodiments 3 to 50 repeating units, and optionally in some embodiments 10 to 1000 repeating units and/or, for example, each of the ionophilic polymer side chains independently has 3 to 100 repeating units, in some embodiments 3 to 50 repeating units, and optionally in some embodiments 10 to 1000 repeating units.

In an embodiment, the brush block copolymer is defined by the formula (FX1a), (FX1 b), (FX1c), (FX1d), (FX1e), (FX1f), (FX1g) or (FX1 h):

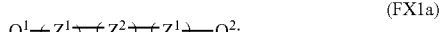
(FX1a)

(FX1b)

(FX1c)

(FX1d)

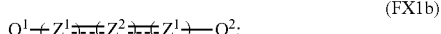
(FX1e)

(FX1f)

(FX1g)

(FX1h)

wherein each $Z^1$ is independently a first polymer backbone group and each $Z^2$ is independently a second polymer backbone group; wherein $Q^1$ is a first backbone terminating group and $Q^2$ is a second backbone terminating group; wherein each $L^1$ is independently a first linking group, each $L^2$ is independently a second linking group, each $L^3$ is independently a third linking group, and each $L^4$ is independently a fourth linking group; wherein each $P^1$ is independently the ionophobic polymer side chain group and each $P^2$ is independently the ionophilic polymer side chain group; and wherein m, n and p are each independently an integer selected from the range of 3 to 1000.

In an embodiment, for example, each $Z^1$ connected to $L^1$, $L^3$, $P^1$ or a combination thereof is independently defined by the formula (FX2a), (FX2b), (FX2c), (FX2d), (FX2e) or (FX2f):

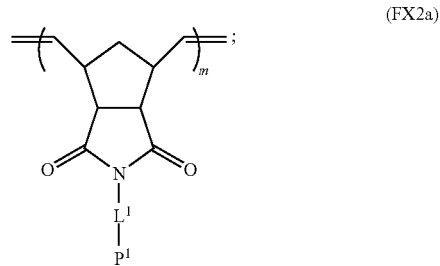
(FX2a)

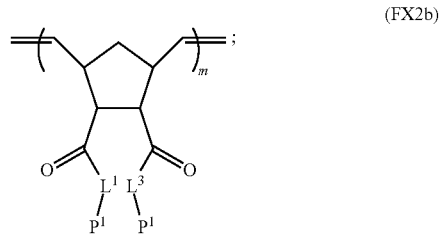
(FX2b)

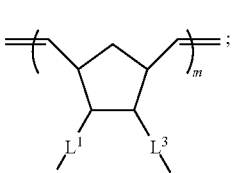 (FX2c)

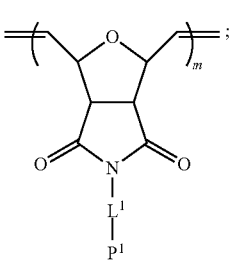 (FX2d)

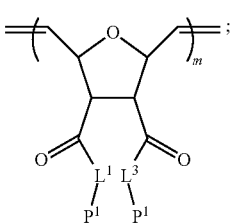 (FX2e)

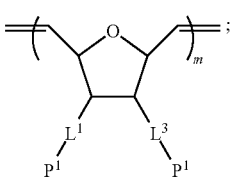 (FX2f)

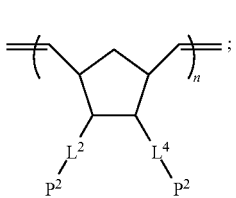 (FX3c)

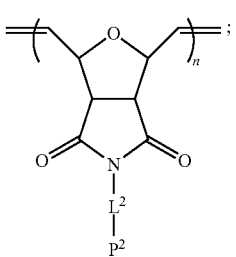 (FX3d)

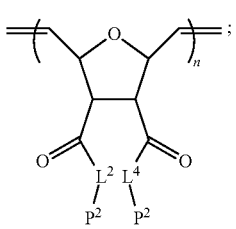 (FX3e)

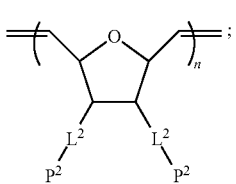 (FX3f)

wherein each $L^1$ is independently a first linking group and each $L^3$ is independently a third linking group; wherein each $P^1$ is independently the ionophobic polymer side chain; and m is an integer selected from the range of 3 to 1000.

In an embodiment, each $Z^2$ connected to $L^1$, $L^3$, $P^1$ or a combination thereof is independently defined by the formula (FX3a), (FX3b), (FX3c), (FX3d), (FX3e) or (FX3f):

wherein each $L^2$ is independently a second linking group and each $L^4$ is independently a fourth linking group; wherein each $P^2$ is independently an ionophilic polymer side chain; and n is an integer selected from the range of 3 to 1000.

In embodiments, for example, each $L^1$, $L^2$, $L^3$ and $L^4$, and optionally, each $L^5$ and $L^6$ is independently defined by the formula (FX5a), (FX5b) or (FX5c):

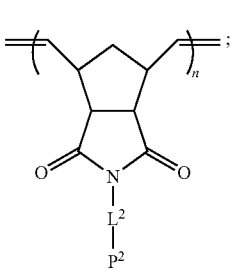 (FX3a)

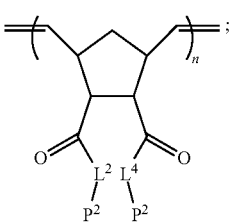 (FX3b)

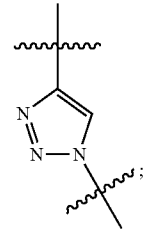 (FX5a)

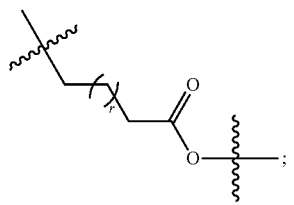 (FX5b)

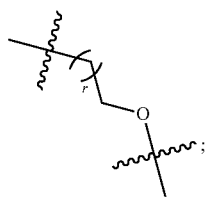

wherein r is an integer selected from the range of 1 to 5.

In embodiments, each ionophobic polymer side chain is independently defined by the formula (FX5a) or (FX5b):

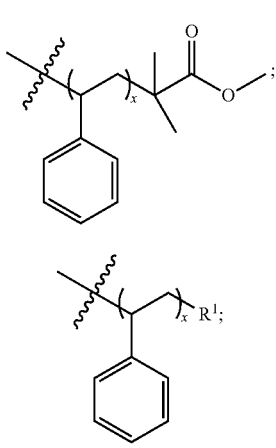

and/or, for example, each ionophilic polymer side chain is independently defined by the formula (FX6a), (FX6b), (FX6c) or (FX6d):

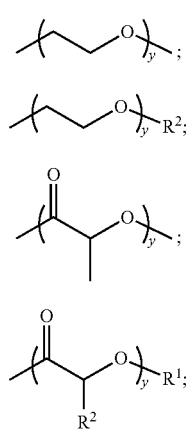

wherein x is an integer selected from the range of 3 to 100; wherein y is an integer selected from the range of 3 to 100; and wherein each $R^1$ and $R^2$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In embodiments, the first backbone terminating group and the second backbone terminating group are each independently selected from the group consisting of: a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^6$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In an embodiment, the brush block copolymer is defined by the formula (FX7):

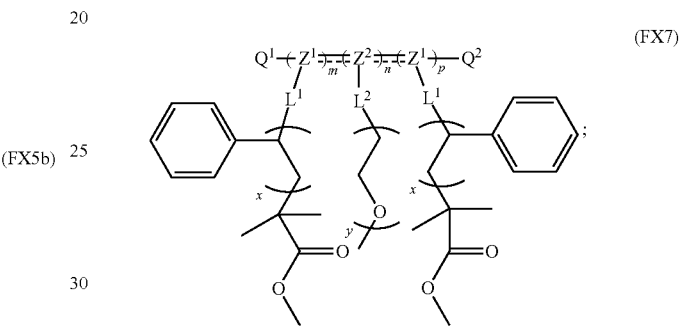

wherein each $Z^1$ is independently a first polymer backbone group and each $Z^2$ is independently a second polymer backbone group; wherein each $Q^1$ is independently a first backbone terminating group and each $Q^2$ is independently a second backbone terminating group; wherein each $L^1$ is independently a first linking group and each $L^2$ is independently a second linking group; wherein m, n and p are each independently an integer selected from the range of 3 to 1000; and wherein x is an integer selected from the range of 3 to 100 and y is an integer selected from the range of 3 to 100.

In an embodiment, the brush block copolymer is defined by the formula (FX8):

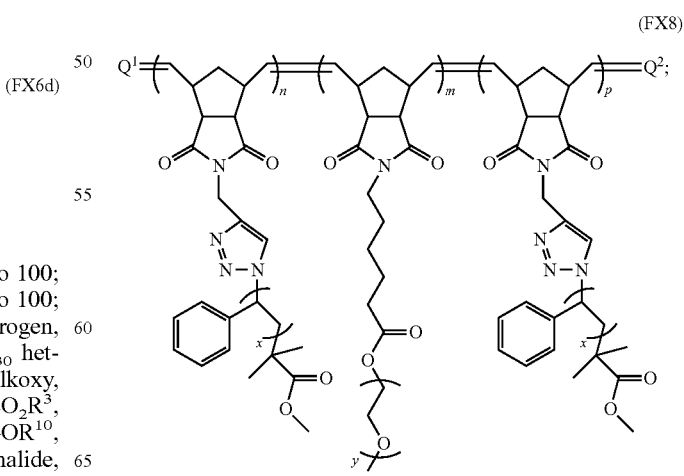

wherein each $Q^1$ is independently a first backbone terminating group and $Q^2$ is a second backbone terminating group; wherein m, n and p are each independently an integer selected from the range of 3 to 1000; and wherein x is an integer selected from the range of 3 to 100 and y is an integer selected from the range of 3 to 100.

In an embodiment, the brush block copolymer is synthesized via a grafting through approach, for example, ring opening metathesis polymerization. In an embodiment, a plurality of the brush block copolymers undergo self-assembly to form a physically assembled network, for example a supramolecular structure.

In embodiments, for example, the ionophilic polymer side chain group is polyethylene oxide, poly(lactide), poly(N-isopropylacrylamide) or poly(pyrrolidinone). In embodiments, the ionophobic polymer side chain group is polystyrene, poly(methyl methacrylate), poly(ethylene), poly(propylene), poly(butadiene) or poly(isoprene).

The brush block copolymers provided herein can assemble into a wide range of beneficial and useful morphologies. For example, provided brush block copolymers have more potential morphologies and have faster kinetic self-assembly than linear copolymer analogues. Advantageously, the provided brush block copolymers have high side chain grafting density and low side chain polydispersity. In some embodiments, ABC brush block copolymers have compatible A and C blocks which reduce the penalty for mixing between A and C blocks and provide beneficial morphologies not attainable with linear copolymers.

In an aspect, the invention provides a brush block copolymer comprising: (i) a first polymer block comprising at least 3 first repeating units, wherein each of the first repeating units of the first polymer block comprises a first polymer backbone group directly or indirectly covalently linked to a first polymer side chain group; (ii) a second polymer block comprising at least 3 second repeating units; wherein each of the second repeating units of the second polymer block comprises a second polymer backbone group directly or indirectly covalently linked to a second polymer side chain group; and (iii) a third polymer block comprising at least 3 third repeating units; wherein each of the third repeating units of the third polymer block comprises a third polymer backbone group directly or indirectly covalently linked to a third polymer side chain group; wherein the second polymer block is directly or indirectly covalently linked to both the first polymer block and the third polymer block along a backbone and the second polymer block is positioned between the first polymer block and the third polymer block; and wherein the first polymer block, the second polymer block and the third polymer block are characterized by a chain grafting density equal to 100%, and optionally for some embodiments a chain grafting density greater than 90%, and optionally for some embodiments a chain grafting greater than to 95%, In an aspect, the invention provides a brush block copolymer comprising: (i) a first polymer block comprising at least 3 first repeating units, wherein each of the first repeating units of the first polymer block comprises a first polymer backbone group directly or indirectly covalently linked to a first polymer side chain group; (ii) a second polymer block comprising at least 3 second repeating units; wherein each of the second repeating units of the second polymer block comprises a second polymer backbone group directly or indirectly covalently linked to a second polymer side chain group; and (iii) a third polymer block comprising at least 3 third repeating units; wherein each of the third repeating units of the third polymer block comprises a third polymer backbone group directly or indirectly covalently linked to a third polymer side chain group; wherein the second polymer block is directly or indirectly covalently linked to both the first polymer block and the third polymer block along a backbone and the second polymer block is positioned between the first polymer block and the third polymer block; wherein the polymer side chain groups of at least one of the first polymer block, the second polymer block and the third polymer block are characterized by a polydispersity index of less than or equal to 1.2, optionally for some embodiments a polydispersity index of less than or equal to 1.1, optionally for some embodiments a polydispersity index of less than or equal to 1.05.

In an aspect, the invention provides a brush block copolymer comprising: (i) a first polymer block comprising at least 3 first repeating units, wherein each of the first repeating units of the first polymer block comprises a first polymer backbone group directly or indirectly covalently linked to a first polymer side chain group; (ii) a second polymer block comprising at least 3 second repeating units; wherein each of the second repeating units of the second polymer block comprises a second polymer backbone group directly or indirectly covalently linked to a second polymer side chain group; and (iii) a third polymer block comprising at least 3 third repeating units; wherein each of the third repeating units of the third polymer block comprises a third polymer backbone group directly or indirectly covalently linked to a third polymer side chain group; wherein the second polymer block is directly or indirectly covalently linked to both the first polymer block and the third polymer block along a backbone and the second polymer block is positioned between the first polymer block and the third polymer block; wherein the brush block copolymer is synthesized via a grafting through brush polymer synthesis method, optionally a ring opening metathesis polymerization.

In an embodiment, for example, the brush block copolymer is a triblock brush copolymer. In an embodiment, the triblock brush copolymer is defined by the formula A-B-C, wherein A is the first polymer block, B is the second polymer block, and C is the third polymer block. In an embodiment, the brush block copolymer has a molecular weight selected from the range of 500 Daltons to 2,000,000 Daltons, selected from the range of 1,000 Daltons to 1,000,000 Daltons, or optionally, selected from the range of 1,000 Daltons to 5,000,000 Daltons.

In an embodiment, the brush block copolymer is defined by the formula (FX9a), (FX9b), (FX9c), (FX9d), (FX9e), (FX9f), (FX9g) or (FX9h):

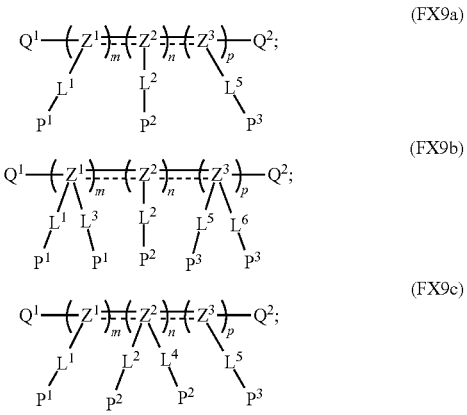

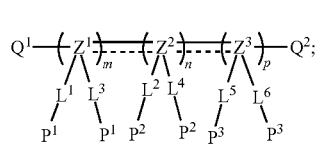
(FX9d)

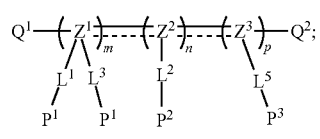
(FX9e)

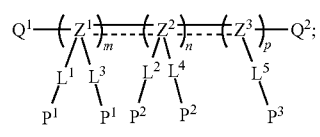
(FX9f)

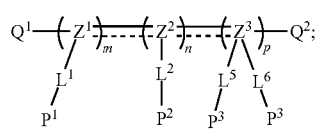
(FX9g)

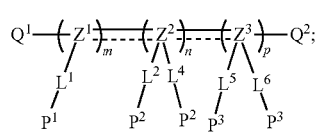
(FX9h)

wherein each $Z^1$ is independently the first polymer backbone group, each $Z^2$ is independently a second polymer backbone group and each $Z^3$ is independently a third polymer backbone group; wherein $Q^1$ is a first backbone terminating group and $Q^2$ is a second backbone terminating group; wherein each $L^1$ is independently a first linking group, each $L^2$ is independently a second linking group, each $L^3$ is independently a third linking group, each $L^4$ is independently a fourth linking group, each $L^5$ is independently a fifth linking group and each $L^6$ is independently a sixth linking group; wherein each $P^1$ is independently a first polymer side chain group, each $P^2$ is independently a second polymer side chain group, each $P^3$ is independently a third side chain group; and wherein m, n and p are each independently an integer selected from the range of 3 to 1000.

In an embodiment, for example, each $Z^1$ connected to $L^1$, $L^3$, $P^1$ or a combination thereof is independently defined by the formula (FX2a), (FX2b), (FX2c), (FX2d), (FX2e) or (FX2f):

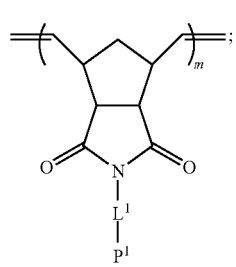
(FX2a)

(FX2b)

(FX2c)

(FX2d)

(FX2e)

(FX2f)

wherein each $L^1$ is independently a first linking group and each $L^3$ is independently a third linking group; wherein each $P^1$ is independently the ionophobic polymer side chain; and m is an integer selected from the range of 3 to 1000.

In an embodiment, each $Z^2$ connected to $L^1$, $L^3$, $P^1$ or a combination thereof is independently defined by the formula (FX3a), (FX3b), (FX3c), (FX3d), (FX3e) or (FX3f):

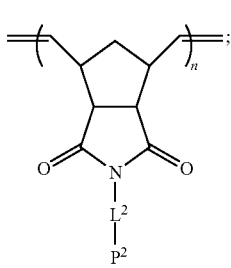
(FX3a)

13
-continued (FX3b)
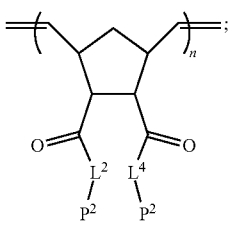

(FX3c)
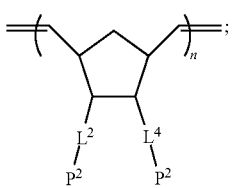

(FX3d)
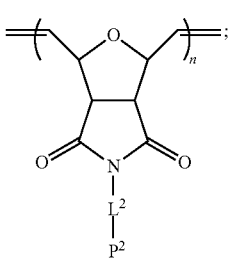

(FX3e)
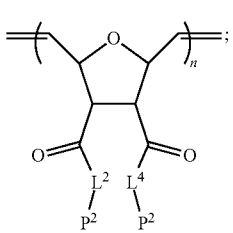

(FX3f)
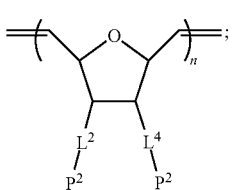

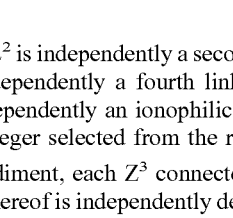

wherein each $L^2$ is independently a second linking group and each $L^4$ is independently a fourth linking group; wherein each $P^2$ is independently an ionophilic polymer side chain; and n is an integer selected from the range of 3 to 1000.

In an embodiment, each $Z^3$ connected to $L^5$, $L^6$, $P^3$ or a combination thereof is independently defined by the formula (FX12a), (FX12b), (FX12c), (FX12d), (FX12e) or (FX12f):

(FX12a)
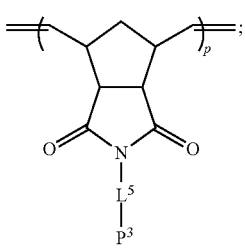

14
-continued (FX12b)
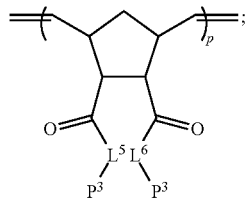

(FX12c)
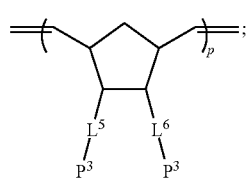

(FX12d)
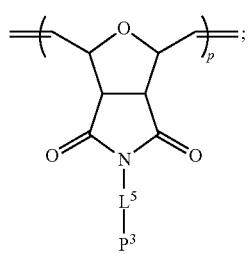

(FX12e)
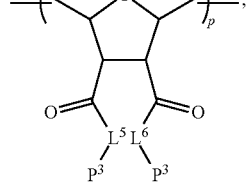

(FX12f)
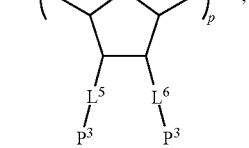

wherein each $L^2$ is independently a second linking group and each $L^4$ is independently a fourth linking group; wherein each $P^2$ is independently an ionophilic polymer side chain; and n is an integer selected from the range of 3 to 1000.

In an embodiment, the brush block copolymer is defined by the formula (FX10):

(FX10)
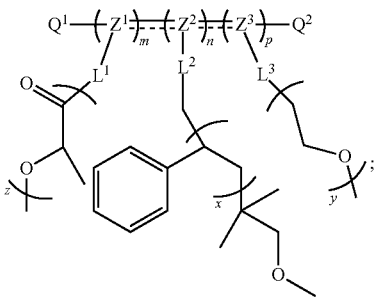

wherein each $Z^1$ is independently a first polymer backbone group, each $Z^2$ independently is a second polymer backbone group and each $Z^3$ is independently a third polymer backbone group; wherein each $Q^1$ is independently a first backbone terminating group and each $Q^2$ is independently a second backbone terminating group; wherein each $L^1$ is independently a first linking group, each $L^2$ is independently a second linking group, and each $L^3$ is independently a third linking group; wherein m, n and p are each independently an integer selected from the range of 3 to 1000; wherein x, y, and z are each independently an integer selected from the range of 3 to 100.

In an embodiment, the brush block copolymer is defined by the formula (FX11):

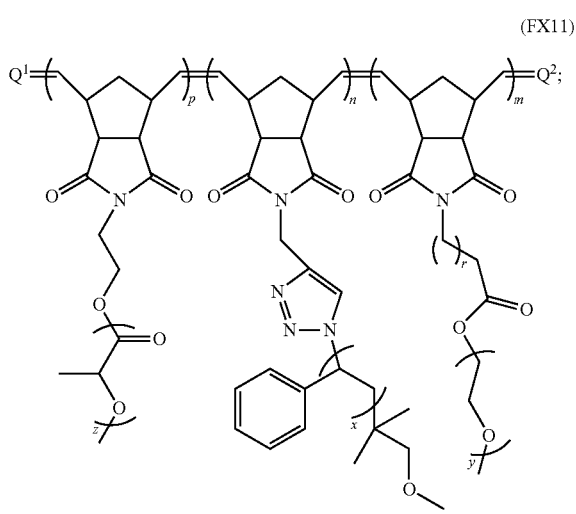

(FX11)

wherein $Q^1$ is the first backbone terminating group and $Q^2$ is the second backbone terminating group; r is an integer selected from the range of 1 to 5; wherein m, n and p are each independently an integer selected from the range of 3 to 1000; wherein x, y and z are each independently an integer selected from the range of 3 to 100.

In an embodiment, a plurality of the described brush block copolymers undergo self-assembly to form a physically cross-linked network, in some embodiments, a supramolecular structure.

In an embodiment, the provided brush block copolymers further comprise a fourth polymer block comprising at least 3 second repeating units, wherein each of the second repeating units of the fourth polymer block independently comprises a fourth polymer backbone group directly or indirectly covalently linked to a ionophilic polymer side chain group, wherein the fourth polymer block is directly or indirectly covalently linked along a backbone and the fourth polymer block is not adjacent to the second polymer block. In an embodiment, for example, the third polymer side chain group is the ionophobic polymer side chain group and the brush block copolymer is defined by the formula A'-B'-A'-B'', wherein A' is the first polymer block, B' is the second polymer block, A'' is the third polymer block and B'' is the fourth polymer block.

In an embodiment, the provided brush block copolymer further comprises a fourth polymer block comprising at least 3 fourth repeating units, wherein each of the fourth repeating units of the fourth polymer block independently comprises a fourth polymer backbone group directly or indirectly covalently linked to a fourth polymer side chain group, wherein the fourth polymer block is directly or indirectly covalently linked along the backbone and the fourth polymer block is not adjacent to the second polymer block; and a fifth polymer block comprising at least 3 fifth repeating units, wherein each of the fifth repeating units of the fifth polymer block independently comprises a fifth polymer backbone group directly or indirectly covalently linked to a fifth polymer side chain group, wherein the fifth polymer block is directly or indirectly covalently linked along the backbone and the fifth polymer block is not adjacent to the first polymer block, wherein the fourth polymer side chain groups are independently the second polymer side chain groups and the fifth polymer side chain groups are the first polymer side chain groups. In an embodiment, for example, the third polymer side chain group is the ionophobic polymer side chain group and the brush block copolymer is defined by the formula A'-B'-A''-B''-A''', wherein A' is the first polymer block, B' is the second polymer block, A'' is the third polymer block, B'' is the fourth polymer block, and A''' is the fifth polymer block.

In an embodiment, the provided brush block copolymer further comprises a fourth polymer block comprising at least 3 fourth repeating units, wherein each of the fourth repeating units of the fourth polymer block independently comprises a fourth polymer backbone group directly or indirectly covalently linked to a fourth polymer side chain group, wherein the fourth polymer block is directly or indirectly covalently linked along a backbone and the fourth polymer block is not adjacent to the second polymer block; and a fifth polymer block comprising at least 3 fifth repeating units, wherein each of the fifth repeating units of the fifth polymer block independently comprises a fifth polymer backbone group directly or indirectly covalently linked to a fifth polymer side chain group, wherein the fifth polymer block is directly or indirectly covalently linked along a backbone and the fifth polymer block is not adjacent to the first polymer block, wherein the fourth polymer side chain group is the same as the second polymer side chain group and the fifth polymer side chain group is the same as the first polymer side chain group. In embodiments, the brush block copolymer is defined by the formula A'-B'-C-B''-A'', wherein A' is the first polymer block, B' is the second polymer block, C is the third polymer block, B'' is the fourth polymer block, and A'' is the fifth polymer block.

In an embodiment, for example, a plurality of the provided brush block copolymers undergo self-assembly to form a physically assembled network.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1:
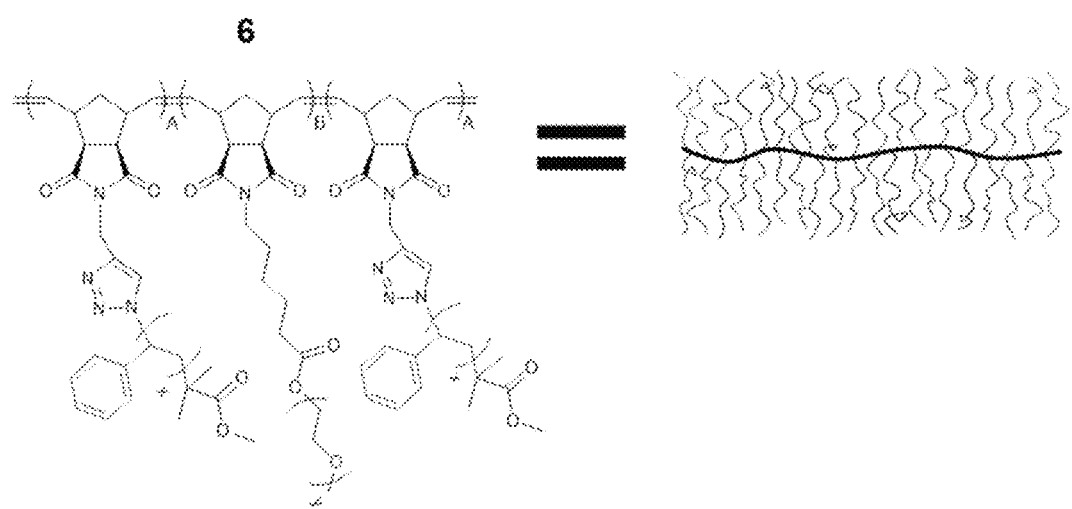
FIG. 1: Chemical structure and illustration of gPS-gPEO-gPS brush triblock copolymer, 6.

In an embodiment, a composition or compound of the invention is isolated or purified. In an embodiment, an isolated or purified compound is at least partially isolated or purified as would be understood in the art. In an embodiment, the composition or compound of the invention has a chemical purity of at least 95%, optionally for some applications at least 99%, optionally for some applications at least 99.9%, optionally for some applications at least 99.99%, and optionally for some applications at least 99.999% pure.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Cross linked polymers having linked monomer chains are useful for some applications.

An "oligomer" refers to a molecule composed of repeating structural units connected by covalent chemical bonds often characterized by a number of repeating units less than that of a polymer (e.g., equal to or less than 3 repeating units) and a lower molecular weights (e.g. less than or equal to 1,000 Da) than polymers. Oligomers may be the polymerization product of one or more monomer precursors.

"Block copolymers" are a type of copolymer comprising blocks or spatially segregated domains, wherein different domains comprise different polymerized monomers, for example, including at least two chemically distinguishable blocks. Block copolymers may further comprise one or more other structural domains, such as hydrophobic groups, hydrophilic groups, etc. In a block copolymer, adjacent blocks are constitutionally different, i.e. adjacent blocks comprise constitutional units derived from different species of monomer or from the same species of monomer but with a different composition or sequence distribution of constitutional units. Different blocks (or domains) of a block copolymer may reside on different ends or the interior of a polymer (e.g. [A][B]), or may be provided in a selected sequence ([A][B][A][B]).

"Diblock copolymer" refers to block copolymer having two different polymer blocks. "Triblock copolymer" refers to a block copolymer having three different polymer blocks, including compositions in which two non-adjacent blocks are the same or similar. "Pentablock" copolymer refers to a copolymer having five different polymer including compositions in which two or more non-adjacent blocks are the same or similar.

"Ionophobic" refers to a property of a functional group, or more generally a component of a compound, such as one or more polymer side chain groups of a brush block copolymer, which are immiscible with polar compounds, including, but not limited to, at least one of the following: water, ionic liquid, lithium salts, methanol, ethanol, and isopropanol. In a specific embodiment, for example, "ionophobic" refers to a property of a functional group, or more generally a component of a compound, such as one or more polymer side chain groups of a brush block copolymer, which are immiscible with at least one of the following water, methanol, ethanol, and isopropanol. In some embodiments, ionophobic is used to describe one or more side chains characterizing a polymer block of a copolymer that does not contribute substantially to the ionic conductivity of a copolymer or physical network thereof, but instead contributes to one or more other chemical, physical or electronic properties, such as the mechanical strength of a brush block copolymer physical network. In an embodiment, for example, polystyrene, poly(methyl methacrylate), poly(ethylene), poly(propylene), poly(butadiene), and poly(isoprene) are examples of ionophobic polymer side chains. In an embodiment, an ionophobic polymer side chain of a brush block copolymer is a hydrophobic polymer side chain.

"Ionophilic" refers to a property of a functional group, or more generally a component, of a compound, such as one or more polymer side chain groups of a brush block copolymer, which exhibit miscibility at certain relative concentrations with polar compounds including, but not limited to, at least one of the following: water, ionic liquid, lithium salts, methanol, ethanol, and isopropanol. In a specific embodiment, for example, "ionophilic" refers to a property of a functional group, or more generally a component, of a compound, such as one or more polymer side chain groups of a brush block copolymer, which exhibit miscibility with at least one of the following water, methanol, ethanol, and isopropanol. In some embodiments, "ionophilic" is used to describe one or more a side chains characterizing a polymer block of a copolymer that contributes substantially to the net ionic conductivity of a copolymer or physical network thereof. In an embodiment, for example, poly(ethylene oxide), poly(lactide), poly(N-isopropylacrylamide), and poly(pyrrolidinone) are examples of ionophilic polymer side chains. In an embodiment, an ionophilic polymer side chain of a brush block copolymer is a hydrophilic polymer side chain.

"Polymer backbone group" refers to groups that are covalently linked to make up a backbone of a polymer, such as a block copolymer. Polymer backbone groups may be linked to side chain groups, such as polymer side chain groups. Some polymer backbone groups useful in the present compositions are derived from polymerization of a monomer selected from the group consisting of a substituted or unsubstituted norbornene, olefin, cyclic olefin, norbornene anhydride, cyclooctene, cyclopentadiene, styrene and acrylate. Some polymer backbone groups useful in the present compositions are obtained from a ring opening metathesis polymerization (ROMP) reaction. Polymer backbones may terminate in a range of backbone terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $-CO_2R^{30}$, $-CONR^{31}R^{32}$, $-COR^{33}$, $-SOR^{34}$, $-OSR^{35}$, $-SO_2R^{36}$, $-OR^{37}$, $-SR^{38}$, $-NR^{39}R^{40}$, $-NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl.

"Polymer side chain group" refers to a group covalently linked to a polymer backbone group that comprises a polymer side chain, optionally imparting steric properties to the polymer. In an embodiment, for example, a polymer side chain group is characterized by a plurality of repeating units having the same, or similar, chemical composition. A polymer side chain group may be directly or indirectly linked to the polymer back bone groups. In some embodiments, polymer side chain groups provide steric bulk and/or interactions that result in an extended polymer backbone and/or a rigid polymer backbone. Some polymer side chain groups useful in the present compositions include unsubstituted or substituted polyisocyanate group, polymethacrylate group, polyacrylate group, polymethacrylamide group, polyacrylamide group, polyquinoxaline group, polyguanidine group, polysilane group, polyacetylene group, polyamino acid group, polypeptide group, polychloral group, polylactide group, polystyrene group, polyacrylate group, poly tert-butyl acrylate group, polymethyl methacrylate group, polysiloxane group, polydimethylsiloxane group, poly n-butyl acrylate group, polyethylene glycol group, polyethylene oxide group, polyethylene group, polypropylene group, polytetrafluoroethylene group, and polyvinyl chloride group. Some polymer side chain groups useful in the present compositions comprise repeating units obtained via anionic polymerization, cationic polymerization, free radical polymerization, group transfer polymerization, or ring-opening polymerization. A polymer side chain may terminate in a wide range of polymer side chain terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $-CO_2R^{30}$, $-CONR^{31}R^{32}$, $-COR^{33}$, $-SOR^{34}$, $-OSR^{35}$, $-SO_2R^{36}$, $-OR^{37}$, $-SR^{38}$, $-NR^{39}R^{40}$, $-NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl.

As used herein, the term "brush block copolymer" refers to a block copolymer in containing at least one polymer backbone group covalently linked to at least one polymer side chain group.

"Polymer blend" refers to a mixture comprising at least one polymer, such as a block copolymer, e.g., brush block copolymer, and at least one additional component, and optionally more than one additional component. In some embodiments, for example, a polymer blend of the invention comprises a first brush block copolymer and one or more electrochemical additives. In some embodiments, for example, a polymer blend of the invention further comprises one or more additional brush block copolymers, homopolymers, copolymers, block copolymers, brush block copolymers, oligomers, electrochemical additives, solvents, metals, metal oxides, ceramics, liquids, small molecules (e.g., molecular weight less than 500 Da, optionally less than 100 Da), or any combination of these. Polymer blends useful for some applications comprise a first block copolymer, such as a brush block copolymer or a wedge-type block copolymer, and one or more additional components comprising block copolymers, brush block copolymers, wedge-type block copolymers, linear block copolymers, random copolymers, homopolymers, or any combinations of these. Polymer blends of the invention include mixture of two, three, four, five and more components.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

Unless otherwise specified, the term "average molecular weight," refers to number average molecular weight. Number average molecular weight is the defined as the total weight of a sample volume divided by the number of molecules within the sample. As is customary and well known in the art, peak average molecular weight and weight average molecular weight may also be used to characterize the molecular weight of the distribution of polymers within a sample.

As is customary and well known in the art, hydrogen atoms in formulas (FX1a)-(FX12f) are not always explicitly shown, for example, hydrogen atoms bonded to the carbon atoms of aromatic, heteroaromatic, and alicyclic rings are not always explicitly shown in formulas (FX1a)-(FX12f). The structures provided herein, for example in the context of the description of formulas (FX1a)-(FX12f) and schematics and structures in the drawings, are intended to convey to one of reasonable skill in the art the chemical composition of compounds of the methods and compositions of the invention, and as will be understood by one of skill in the art, the structures provided do not indicate the specific positions and/or orientations of atoms and the corresponding bond angles between atoms of these compounds.

As used herein, the terms "alkylene" and "alkylene group" are used synonymously and refer to a divalent group derived from an alkyl group as defined herein. The invention includes compounds having one or more alkylene groups. Alkylene groups in some compounds function as linking and/or spacer groups. Compounds of the invention may have substituted and/or unsubstituted $C_1$-$C_{20}$ alkylene, $C_1$-$C_{10}$ alkylene and $C_1$-$C_5$ alkylene groups, for example, as one or more linking groups (e.g. $L^1$-$L^6$).

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as linking and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups, for example, as one or more linking groups (e.g. $L^1$-$L^6$).

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as linking and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups, for example, as one or more linking groups (e.g. $L^1$-$L^6$).

As used herein, the terms "heteroarylene" and "heteroarylene group" are used synonymously and refer to a divalent group derived from a heteroaryl group as defined herein. The invention includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as linking and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups, for example, as one or more linking groups (e.g. $L^1$-$L^6$).

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as linking and/or spacer groups. Compounds of the invention include substituted and/or unsubstituted $C_2$-$C_{20}$ alkenylene, $C_2$-$C_{10}$ alkenylene and $C_2$-$C_5$ alkenylene groups, for example, as one or more linking groups (e.g. $L^1$-$L^6$).

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as linking and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups, for example, as one or more linking groups (e.g. $L^1$-$L^6$).

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as linking and/or spacer groups. Compounds of the invention include substituted and/or unsubstituted $C_2$-$C_{20}$ alkynylene, $C_2$-$C_{10}$ alkynylene and $C_2$-$C_5$ alkynylene groups, for example, as one or more linking groups (e.g. $L^1$-$L^6$).

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, rhreonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids. Peptides are comprised of two or more amino-acid connected via peptide bonds.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, or 7-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—. Compositions of some embodiments of the invention comprise alkyl groups as terminating groups, such as polymer backbone terminating groups and/or polymer side chain terminating groups.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms. Compositions of some embodiments of the invention comprise alkenyl groups as terminating groups, such as polymer backbone terminating groups and/or polymer side chain terminating groups.

Aryl groups include groups having one or more 5-, 6- or 7-member aromatic rings, including heterocyclic aromatic rings. The term heteroaryl specifically refers to aryl groups having at least one 5-, 6- or 7-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those which are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-membered ring and one or more additional five- or six-membered aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents. Compositions of some embodiments of the invention comprise aryl groups as terminating groups, such as polymer backbone terminating groups and/or polymer side chain terminating groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms. Compositions of some embodiments of the invention comprise arylalkyl groups as terminating groups, such as polymer backbone terminating groups and/or polymer side chain terminating groups.

As to any of the groups described herein which contain one or more substituents, it is understood that such groups do not contain any substitution or substitution patterns which are sterically impractical and/or synthetically non-feasible. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;
pseudohalides, including —CN;
—COOR where R is a hydrogen or an alkyl group or an aryl group and more specifically where R is a methyl, ethyl, propyl, butyl, or phenyl group all of which groups are optionally substituted;
—COR where R is a hydrogen or an alkyl group or an aryl group and more specifically where R is a methyl, ethyl, propyl, butyl, or phenyl group all of which groups are optionally substituted;
—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR where R is an alkyl group or an aryl group and more specifically where R is a methyl, ethyl, propyl, butyl, or phenyl group, all of which are optionally substituted;
—OCOOR where R is an alkyl group or an aryl group;
—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms;
—OR where R is H, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible.

DETAILED DESCRIPTION OF THE INVENTION

In general, the terms and phrases used herein have their art-recognized meaning, which can be found by reference to standard texts, journal references and contexts known to those skilled in the art.

The invention is further detailed in the following examples, which are offered by way of illustration and are not intended to limit the scope of the invention in any manner.

Example 1: Brush Block Copolymers

Overview
The present Example provides description and experimental results supporting the following aspects of the present invention:
   Synthesis of fully grafted ABA brush triblock copolymers.
   Brush architectures conferring important advantages and opening opportunities for the design of polymer electrolyte membranes with high conductivity.
Background
The provided BBCPs have polynorbornene backbones fully grafted with PS and PEO side chains (FIG. 1). Different architectures have been synthesized, including AB brush diblock copolymers and ABA brush triblock copolymers (gPS-gPEO-gPS, 6). A denotes PS side chains and B denotes PEO side chains.

Unlike graft polymers previously reported in the polymer literature, the BBCPs
   a. are grafted in all blocks, not only the PEO block;
   b. guarantee 100% side chain grafting density;
   c. feature narrow dispersity in the side chains (Đ<1.2); and
   d. do not require post-polymerization modifications.

Figure 2:
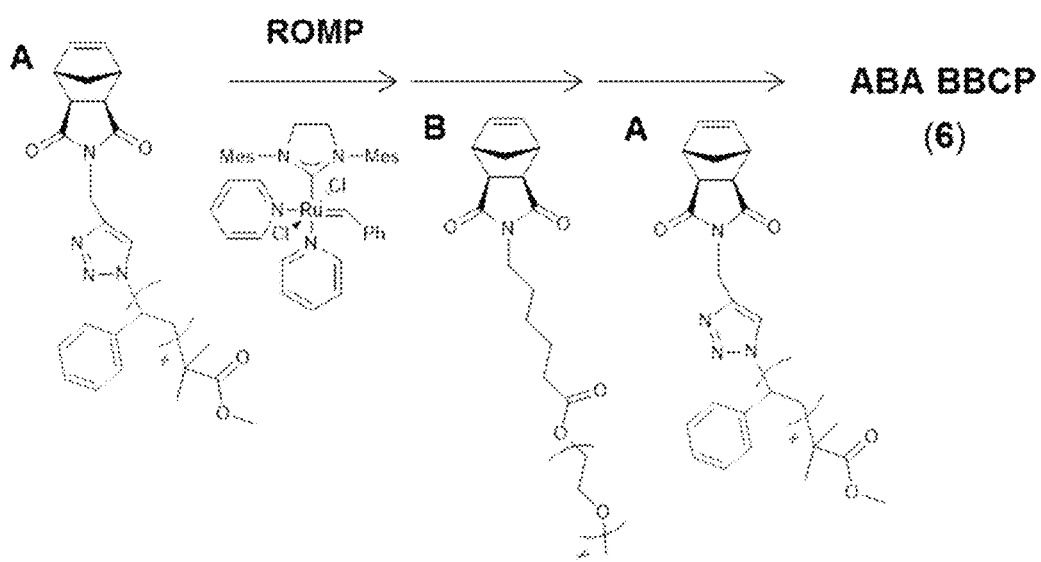
FIG. 2: Synthesis of ABA brush triblock copolymers.
Figure 3:
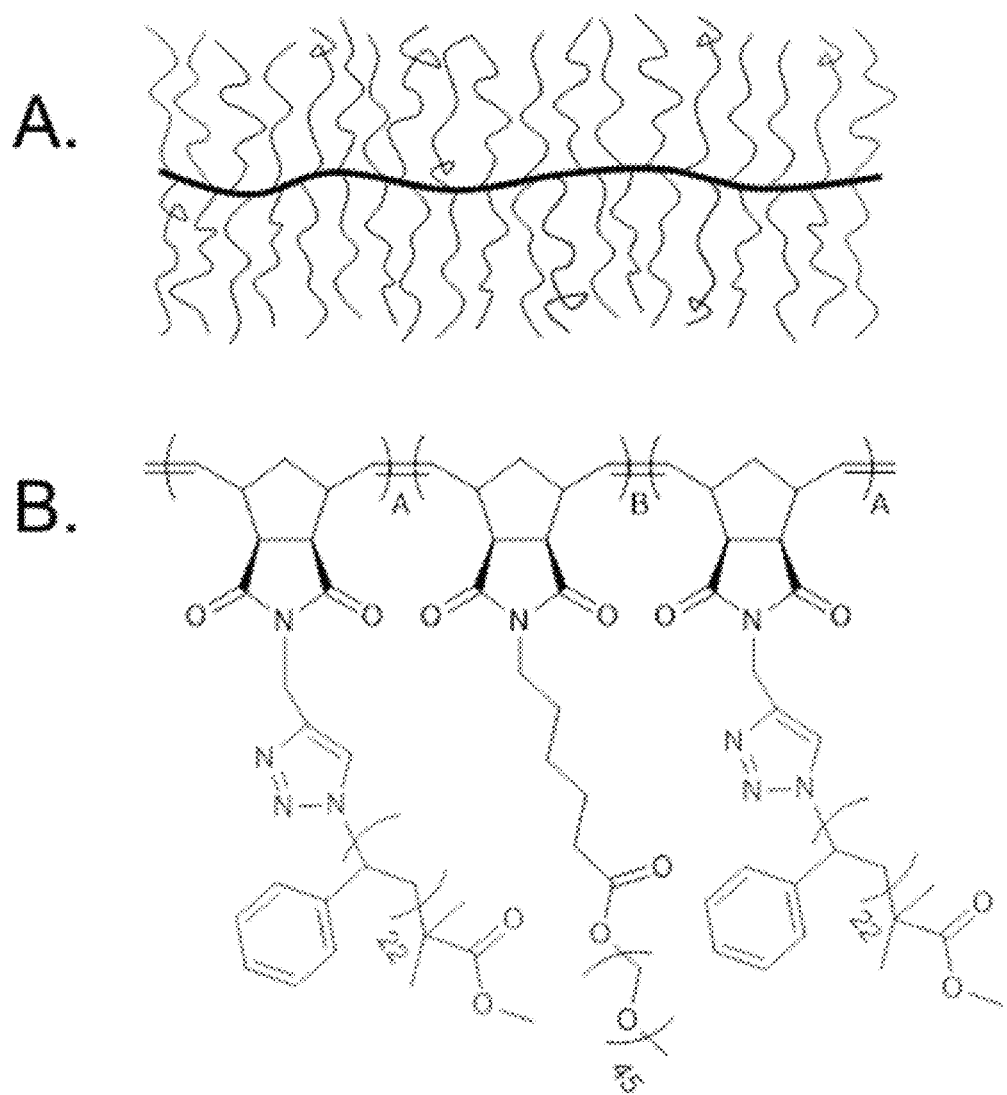
FIG. 3: A) Illustration of the ABA triblock brush polymers reported herein. Black=polynorbornene, red=polystyrene, blue=poly(ethylene oxide). B) Chemical structure of gPS-gPEO-gPS.

The precision in the BBCP structure is enabled by the synthetic strategy. The BBCPs are synthesized by grafting-through ring-opening metathesis polymerization (ROMP) (FIG. 2). ROMP affords excellent control over molecular weight (MW) and extremely low MW-dispersity.

Figure 4:
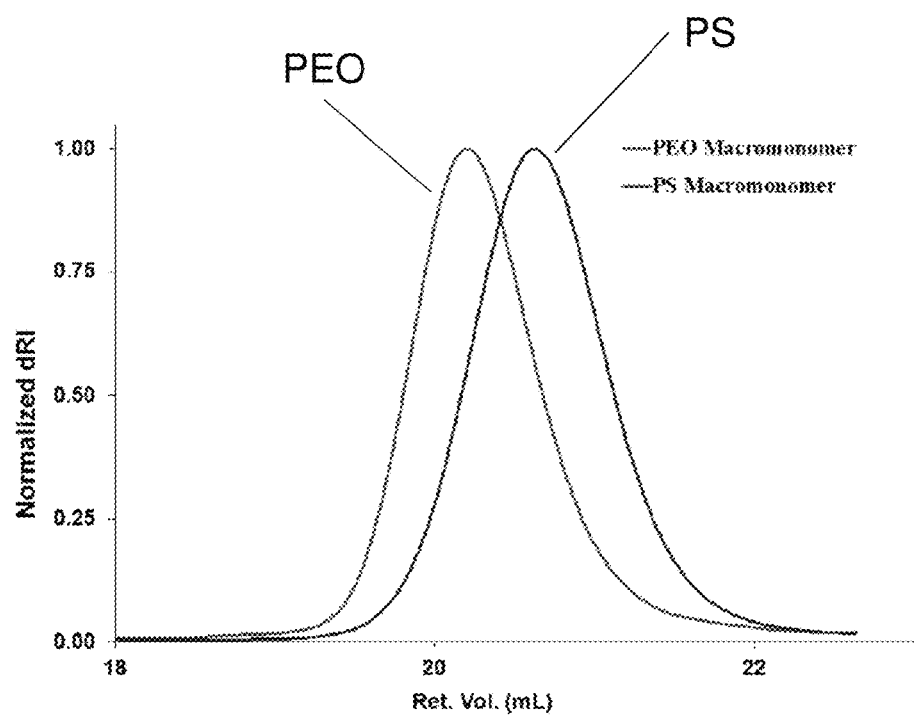
FIG. 4: Size exclusion chromatograms of polystyrene and poly(ethylene oxide) macromonomers. Mobile phase: THF with 1 vol % triethylamine.
Figure 5:
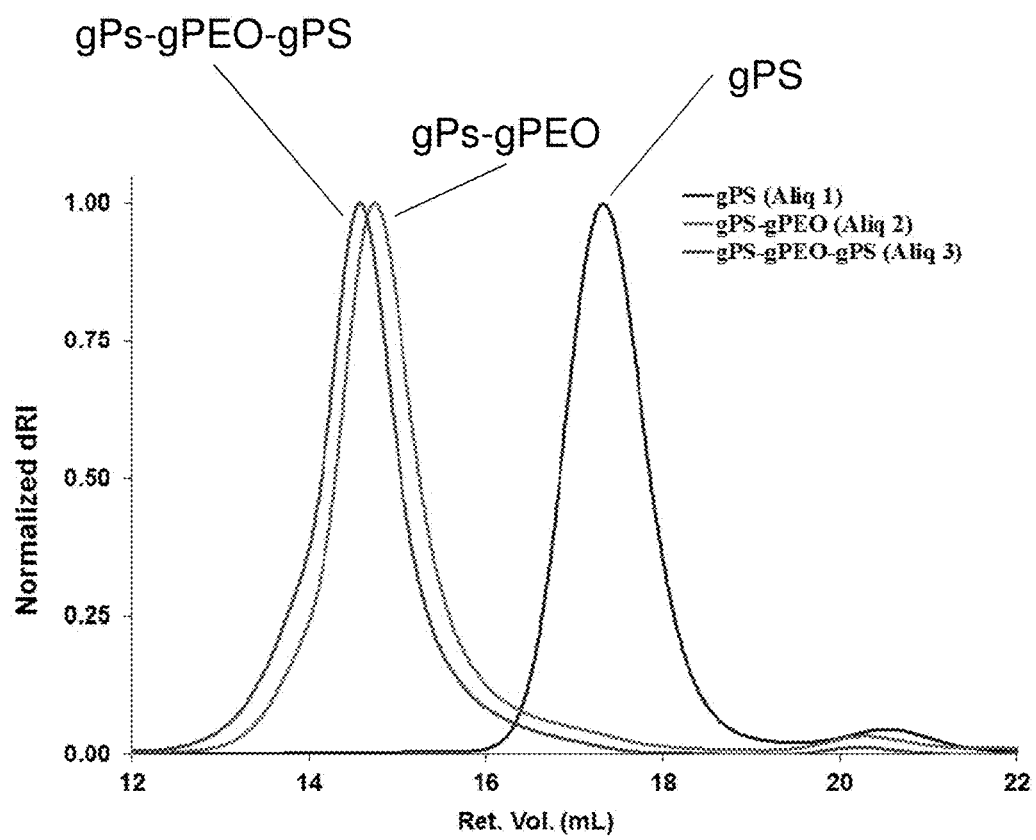
FIG. 5: Size exclusion chromatograms of gPS$_{11}$-gPEO$_{78}$-gPS$_{11}$ triblock brush polymer. Mobile phase: THF with 1 vol % triethylamine.
Figure 6:
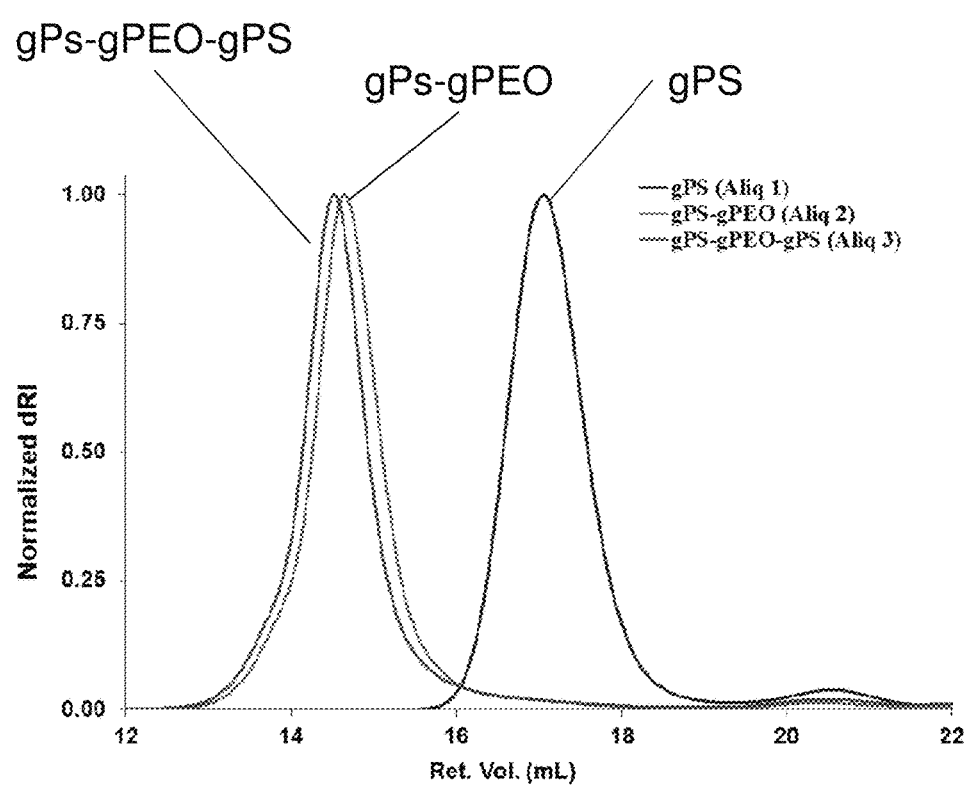
FIG. 6: Size exclusion chromatograms of gPS$_{15}$-gPEO$_{119}$-gPS$_{15}$ triblock brush polymer. Mobile phase: THF with 1 vol % triethylamine.
Figure 7:
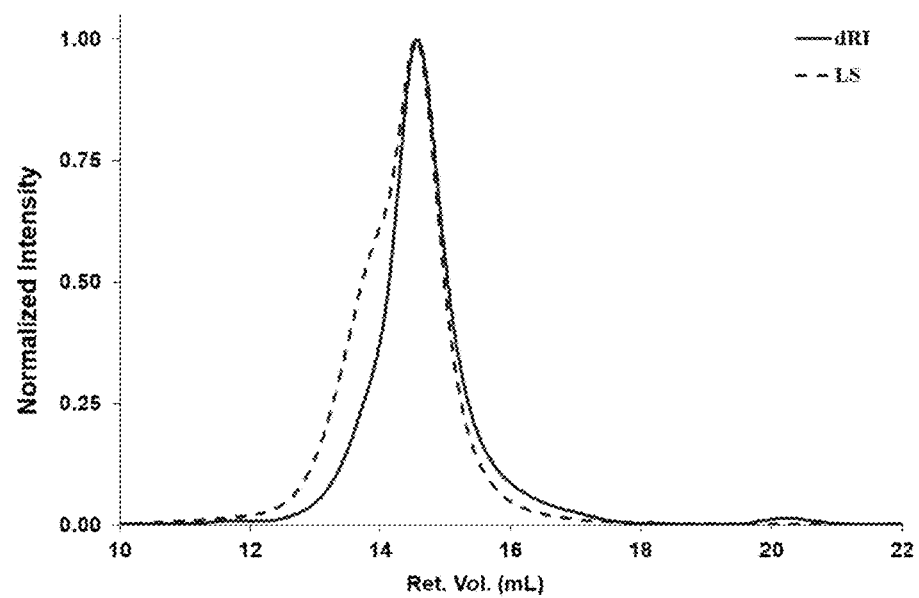
FIG. 7: Comparison of gPS$_{11}$-gPEO$_{78}$-gPS$_{11}$ differential refractive index (dRI) and light scattering (LS) SEC traces.
Figure 8:
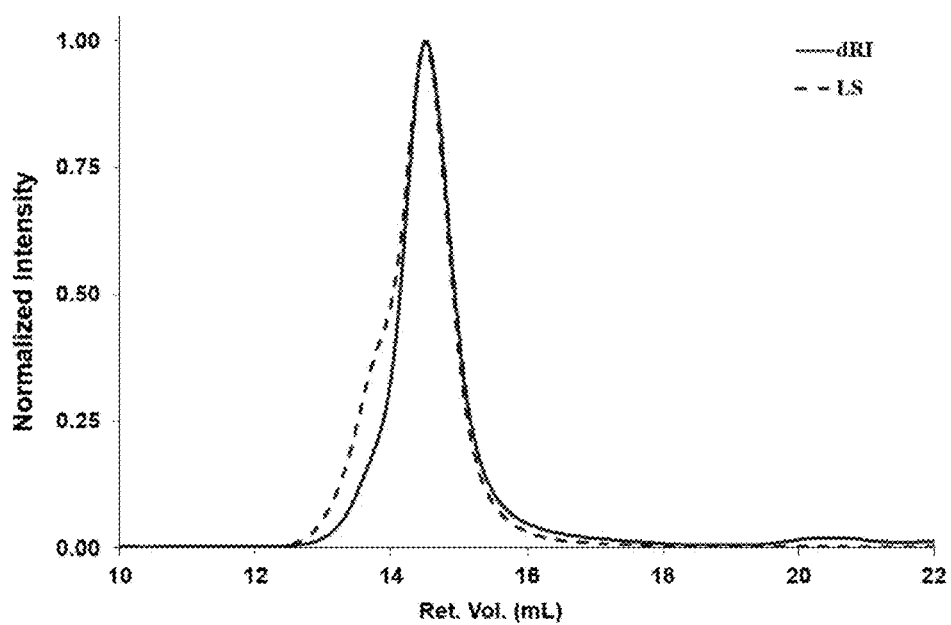
FIG. 8: Comparison of gPS15-gPEO119-gPS15 differential refractive index (dRI) and light scattering (LS) SEC traces.

Example 2: ABA Triblock Brush Polymers: Synthesis, Self-Assembly, Conductivity, and Rheological Properties Abstract
The synthesis, self-assembly, conductivity, and rheological properties of ABA triblock brush polymers (BBCPs) with grafted polystyrene (A block, $N_{PS}$=21) and poly(ethylene oxide) (B block, $N_{PEO}$=45) side-chains is described.
Results and Discussion
All BBCPs reported herein feature 1) 100% grafting density for all blocks, 2) controlled polynorbornene backbone and PS/PEO side-chain molecular weights, and 3) low molecular weight dispersities (Đ) for all components. Full BBCP synthetic details are provided in the Supporting Information. Briefly, polystyrene macromonomer ($M_n$≈2500 g/mol, $N_{PS}$=21) was synthesized using atom transfer radical polymerization with subsequent end-group functionalization to install a single norbornene moiety (Schemes S1-S5).[17] Commercially-available mono-methoxy PEO ($M_n$≈2000 g/mol, $N_{PEO}$=45) was end-functionalized with norbornene via EDC coupling (Schemes S6-S7). Macromonomer size exclusion chromatograms are provided in FIG. 4 and characterization data are summarized in Table S1. Sequential ROMP (Scheme S8) produced two ABA BBCPs with measured norbornene backbone degrees of polymerization $N_A$:$N_B$:$N_A$=11:78:11 ($gPS_{11}$-$gPEO_{78}$-$gPS_{11}$) and $N_A$:$N_B$:$N_A$=15:119:15 ($gPS_{15}$-$gPEO_{119}$-$gPS_{15}$). BBCP molecular weight data are summarized in FIGS. 5-9 and Tables S2-S4. The volume fractions $\varphi_{PEO}$ of $gPS_{11}$-$gPEO_{78}$-$gPS_{11}$ and $gPS_{15}$-$gPEO_{119}$-$gPS_{15}$ are approximately 0.75 and 0.77, respectively, using literature-reported densities for PS and PEO.[18] Additionally, gPEO brush homopolymers were synthesized (FIG. 10, Table S5) to directly compare with the two BBCPs.

Figure 10:
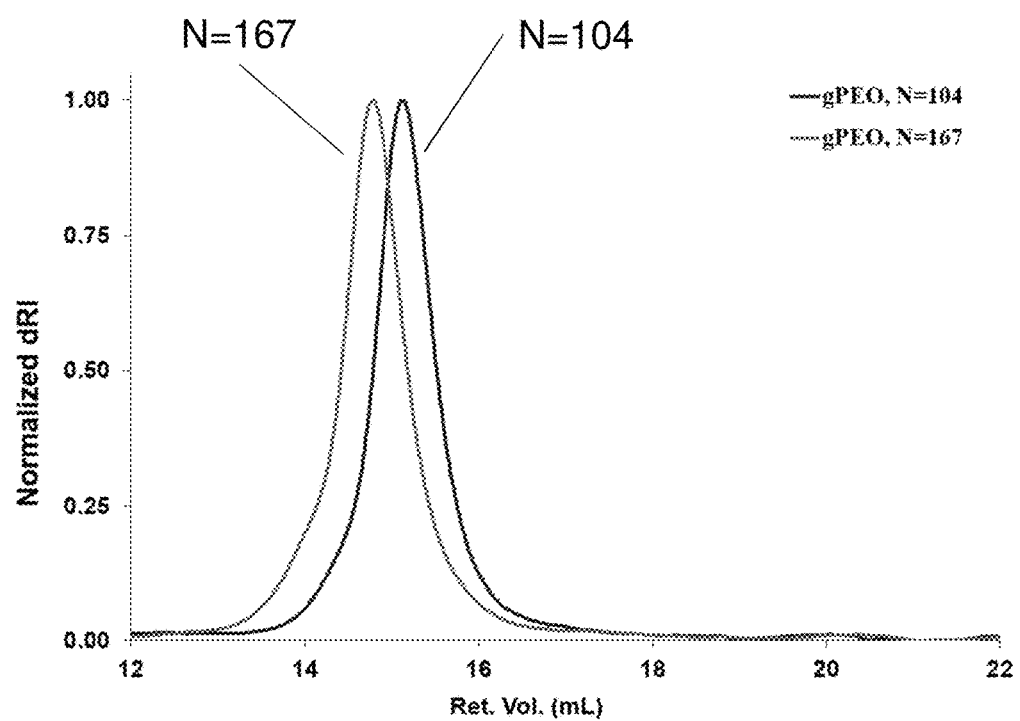
FIG. 10: gPEO brush homopolymer (N=104 and 167) SEC traces.
Figure 11:
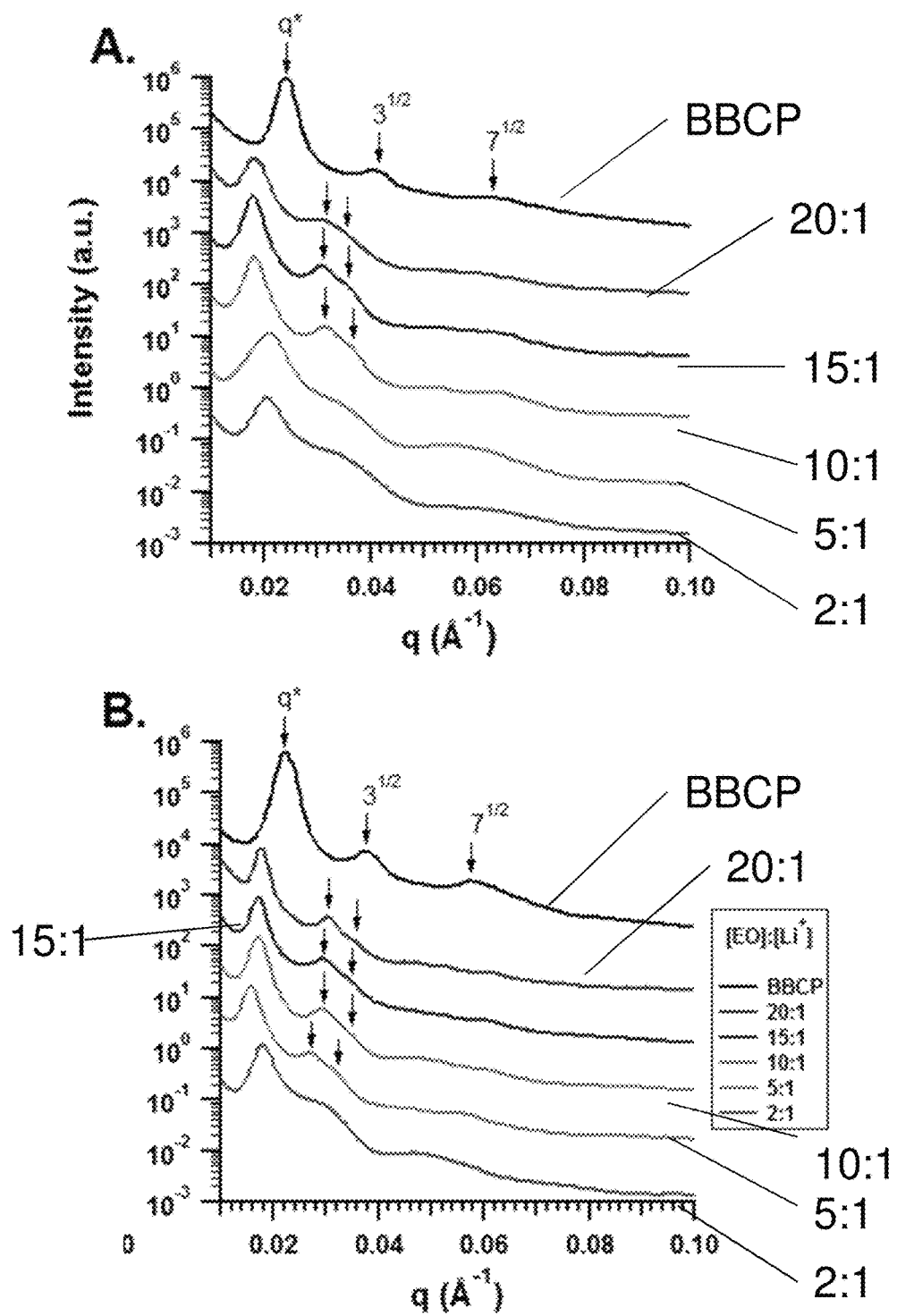
FIG. 11: Synchrotron SAXS data of A) gPS$_{11}$-gPEO$_{78}$-gPS$_{11}$ and B) gPS$_{15}$-gPEO$_{119}$-gPS$_{15}$. The unmarked arrows correspond to $3^{1/2}q^*$ (left) and $2q^*$ (right) peak positions. Samples were prepared in a dry room and sealed hermetically. Curves are shifted vertically for clarity.
Figure 12:
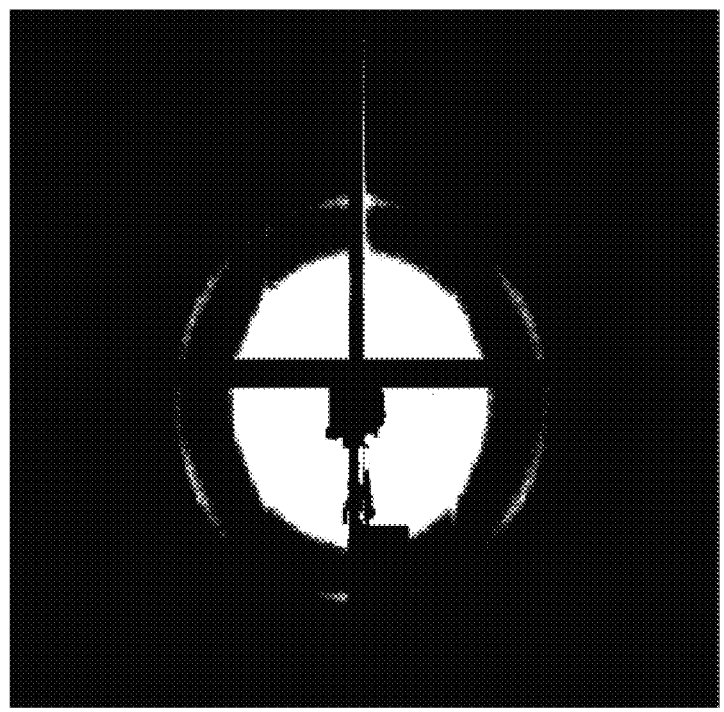
FIG. 12: 2-dimensional SAXS pattern of gPS$_{15}$-gPEO$_{119}$-gPS$_{15}$ annealed under compression at 120° C. for 2 hours between Kapton.
Figure 15:
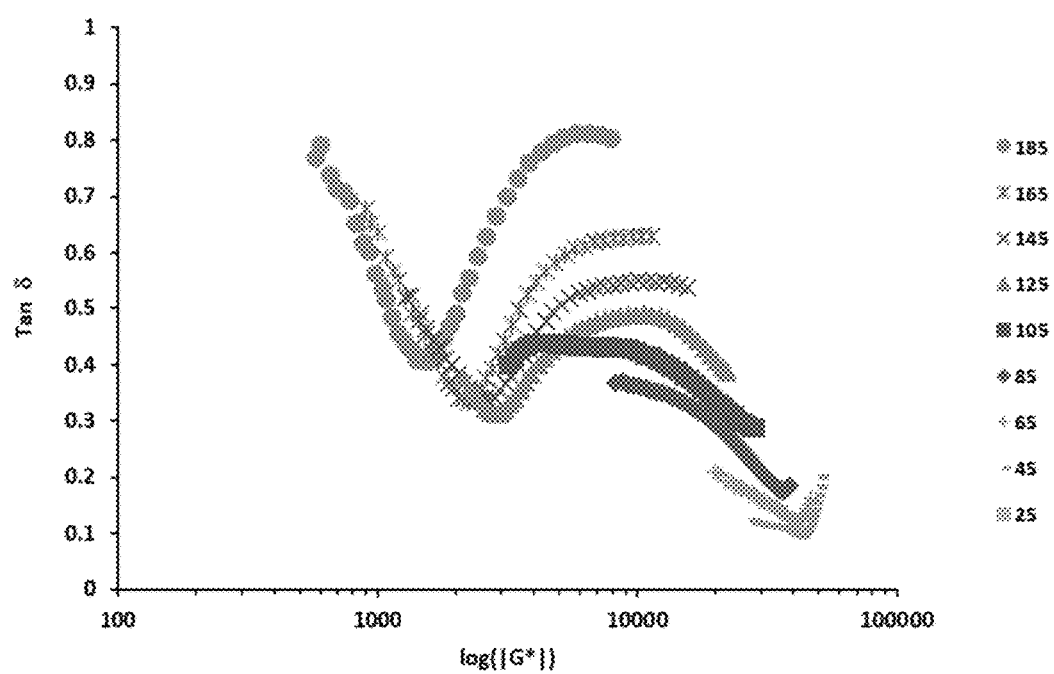
FIG. 15: van Gurp-Palmen plot of tan δ versus the magnitude of the complex modulus $|G^*|=[(G')^2+(G'')^2]^{1/2}$ for gPS$_{11}$-gPEO$_{78}$-gPS$_{11}$.

Azimuthally integrated one-dimensional synchrotron small angle X-ray scattering (SAXS) data of $gPS_{11}$-$gPEO_{78}$-$gPS_{11}$ and $gPS_{15}$-$gPEO_{119}$-$gPS_{15}$ annealed at 120° C. are presented in FIG. 11 and summarized in Tables S6-S7. Both neat BBCPs exhibit Bragg reflections at approximate peak positions q*, $3^{1/2}$q*, and $7^{1/2}$q*, consistent with hexagonal cylinders (HEX) of the minority gPS block. Additionally, the two-dimensional pattern for $gPS_{15}$-$gPEO_{119}$-$gPS_{15}$ clearly shows six-fold symmetry FIG. 12, thus reinforcing the HEX assignment. Lithium blends between 10:1-20:1 [EO]:[Li$^+$] ($gPS_{11}$-$gPEO_{78}$-$gPS_{11}$) and 5:1-20:1 [EO]:[Li$^+$] ($gPS_{15}$-$gPEO_{119}$-$gPS_{15}$) are also consistent with the HEX morphology, where the unlabeled arrows in FIG. 11 mark Bragg reflections $3^{1/2}$q* and 2q*. The domain spacing increases in samples doped with LiTFSI, presumably due to an increase in segregation strength derived from an increase in the block-block interaction parameter χ. This effect appears to saturate at high ionic contents for $gPS_{11}$-$gPEO_{78}$-$gPS_{11}$ (c.f. FIG. 11(A), 15:1 and 10:1 blends). The interplay between ionic content, segregation strength, χ, and domain spacing remains poorly understood, even for linear symmetric diblocks.[25] The absence of well-defined higher-order reflections for the remaining blends with high Li$^+$ content precludes definitive morphological assignment based on scattering alone. These blends exhibit some order as evidenced by a relatively sharp primary peak. Possible form factor scattering at high q is suggestive of a morphological change into disordered spheres, which may account for the relative increase in q* (c.f. FIG. 11(A), 10:1 vs. 5:1 and FIG. 11(B), 5:1 vs. 2:1).

Figure 13:
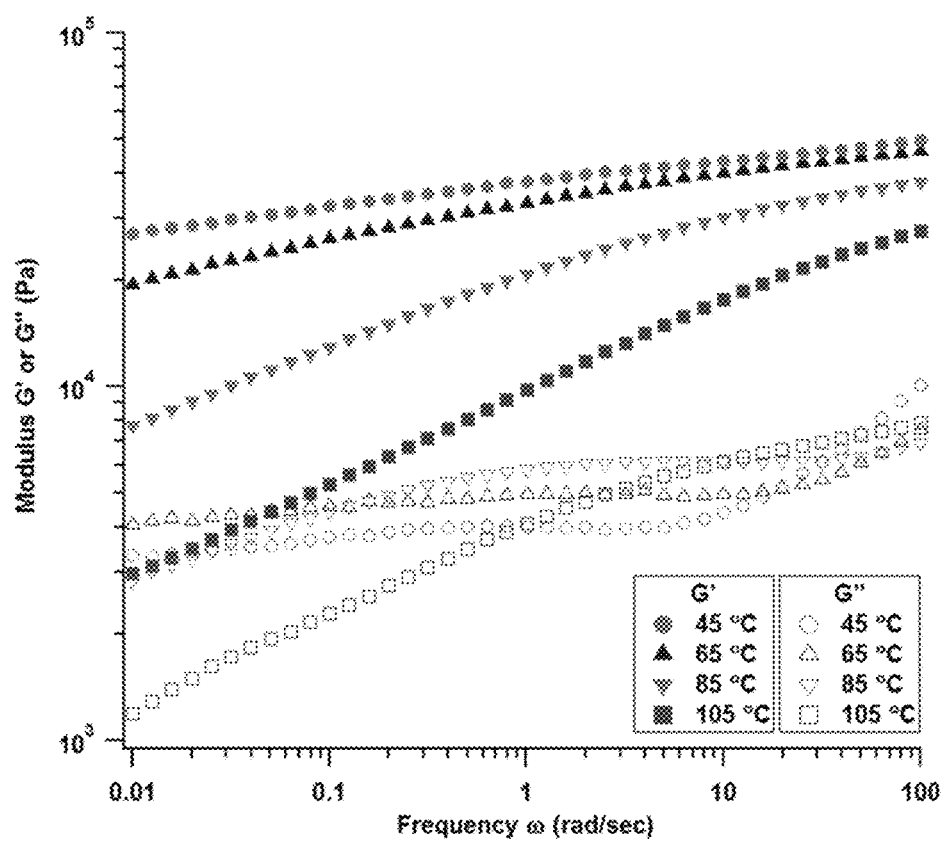
FIG. 13: Storage (G') and loss (G") moduli of gPS$_{11}$-gPEO$_{78}$-gPS$_{11}$ as a function of temperature and frequency.
Figure 14:
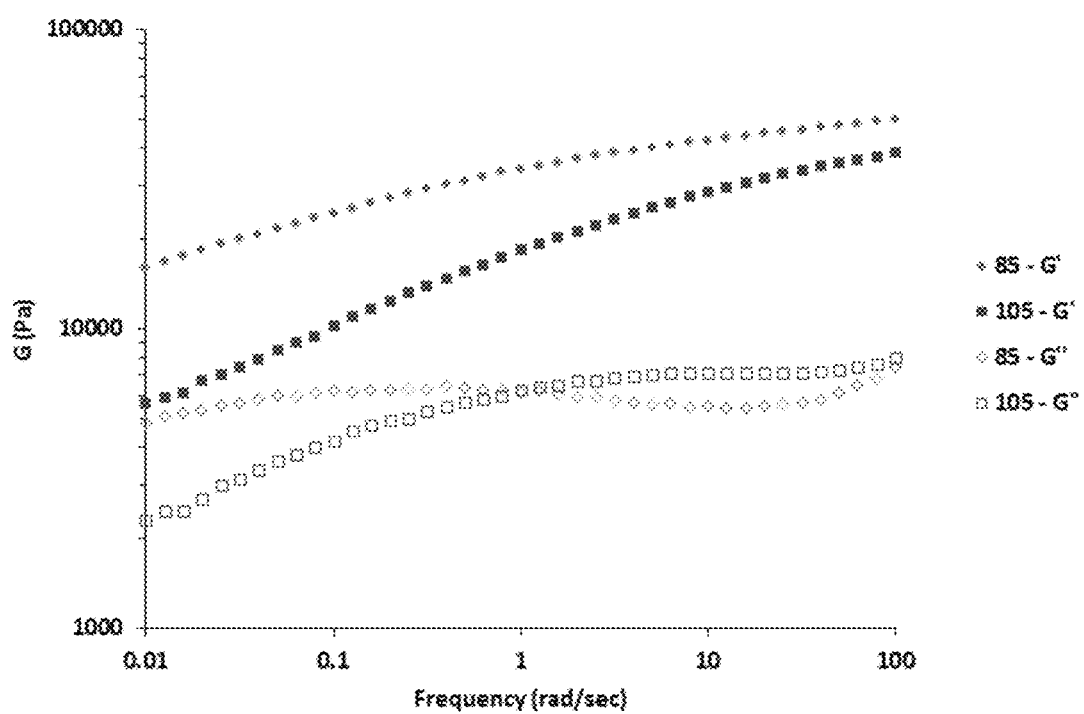
FIG. 14: Storage and loss moduli of gPS$_{15}$-gPEO$_{119}$-gPS$_{15}$ as a function of temperature and frequency.

Frequency-dependent melt rheology data are reported in FIG. 13 for $gPS_{11}$-$gPEO_{78}$-$gPS_{11}$ and FIG. 14 for $gPS_{15}$-$gPEO_{119}$-$gPS_{15}$. The storage modulus (G') is on the order of $10^4$ Pa between 0.01 and 100 rad/sec at temperatures 45-105° C. and is always larger than the loss modulus (G") (tan δ<1). Both BBCPs are thus viscoelastic solids, albeit considerably softer than linear PS-PEO with 38 vol % PEO (G'=$10^7$ Pa at 90° C.).[5] A van Gurp-Palmen plot[36] of the loss tangent versus the magnitude of the complex modulus reveals time-temperature superposition fails with these materials in the temperature range of interest (FIG. 15) and the data reported in FIG. 13 are therefore un-shifted. We anticipate based on linear PS-PEO literature[5] that Li$^+$ doped samples will be marginally more elastic, perhaps an order of magnitude, but the relative softness is likely an intrinsic limitation of the brush architecture.[21, 37] Combining the BBCP architecture with techniques such as polymerization-induced phase separation[2-3] may provide a route towards stiffer materials with similar conductivity profiles.
Conclusions
The synthesis, self-assembly, conductivity, and mechanical properties of densely-grafted ABA triblock brush polymers containing grafted polystyrene (A block, $N_{PS}$=21) and poly(ethylene oxide) (B block, $N_{PEO}$=45) side chains are reported.

REFERENCES

1. Hallinan, D. T.; Balsara, N. P., Polymer Electrolytes. *Annual Review of Materials Research* 2013, 43 (1), 503-525.
2. Schulze, M. W.; McIntosh, L. D.; Hillmyer, M. A.; Lodge, T. P., High-Modulus, High-Conductivity Nanostructured Polymer Electrolyte Membranes via Polymerization-Induced Phase Separation. *Nano Lett.* 2013, 14 (1), 122-126.
3. McIntosh, L. D.; Schulze, M. W.; Irwin, M. T.; Hillmyer, M. A.; Lodge, T. P., Evolution of Morphology, Modulus, and Conductivity in Polymer Electrolytes Prepared via Polymerization-Induced Phase Separation. *Macromolecules* 2015, 48 (5), 1418-1428.
4. Young, W.-S.; Kuan, W.-F.; Epps, T. H., Block copolymer electrolytes for rechargeable lithium batteries. *Journal of Polymer Science Part B: Polymer Physics* 2014, 52 (1), 1-16.
5. Singh, M.; Odusanya, O.; Wilmes, G. M.; Eitouni, H. B.; Gomez, E. D.; Patel, A. J.; Chen, V. L.; Park, M. J.; Fragouli, P.; Iatrou, H.; Hadjichristidis, N.; Cookson, D.; Balsara, N. P., Effect of Molecular Weight on the Mechanical and Electrical Properties of Block Copolymer Electrolytes. *Macromolecules* 2007, 40 (13), 4578-4585.
6. Bouchet, R.; Phan, T. N. T.; Beaudoin, E.; Devaux, D.; Davidson, P.; Bertin, D.; Denoyel, R., Charge Transport in Nanostructured PS-PEO-PS Triblock Copolymer Electrolytes. *Macromolecules* 2014, 47 (8), 2659-2665.
7. Young, N. P.; Devaux, D.; Khurana, R.; Coates, G. W.; Balsara, N. P., Investigating polypropylene-poly(ethylene oxide)-polypropylene triblock copolymers as solid polymer electrolytes for lithium batteries. *Solid State Ionics* 2014, 263 (0), 87-94.
8. Trapa, P. E.; Won, Y.-Y.; Mui, S. C.; Olivetti, E. A.; Huang, B.; Sadoway, D. R.; Mayes, A. M.; Dallek, S., Rubbery Graft Copolymer Electrolytes for Solid-State, Thin-Film Lithium Batteries. *Journal of the Electrochemical Society* 2005, 152 (1), A1-A5.
9. Trapa, P. E.; Acar, M. H.; Sadoway, D. R.; Mayes, A. M., Synthesis and Characterization of Single-Ion Graft Copolymer Electrolytes. *Journal of the Electrochemical Society* 2005, 152 (12), A2281-A2284.
10. Gavelin, P.; Jannasch, P.; Wesslén, B., Amphiphilic polymer gel electrolytes. I. preparation of gels based on poly(ethylene oxide) graft copolymers containing different ionophobic groups. *Journal of Polymer Science Part A: Polymer Chemistry* 2001, 39 (13), 2223-2232.
11. Daigle, J.-C.; Vijh, A.; Hovington, P.; Gagnon, C.; Hamel-Pâquet, J.; Verreault, S.; Turcotte, N.; Clément, D.; Guerfi, A.; Zaghib, K., Lithium battery with solid polymer electrolyte based on comb-like copolymers. *Journal of Power Sources* 2015, 279 (0), 372-383.
12. Sun, J.; Stone, G. M.; Balsara, N. P.; Zuckermann, R. N., Structure-Conductivity Relationship for Peptoid-Based PEO-Mimetic Polymer Electrolytes. *Macromolecules* 2012, 45 (12), 5151-5156.
13. Niitani, T.; Shimada, M.; Kawamura, K.; Kanamura, K., Characteristics of new-type solid polymer electrolyte controlling nano-structure. *Journal of Power Sources* 2005, 146 (1-2), 386-390.
14. Wang, H.; Sakai, T.; Watanabe, O.; Hirahara, K.; Nakanishi, T., All Solid-State Lithium-Polymer Battery Using a Self-Cross-Linking Polymer Electrolyte. *Journal of the Electrochemical Society* 2003, 150 (9), A1166-A1170.
15. Kuan, W.-F.; Remy, R.; Mackay, M. E.; Epps, T. H., Controlled ionic conductivity via tapered block polymer electrolytes. *RSC Advances* 2015, 5 (17), 12597-12604.
16. Niitani, T.; Amaike, M.; Nakano, H.; Dokko, K.; Kanamura, K., Star-Shaped Polymer Electrolyte with Microphase Separation Structure for All-Solid-State Lithium Batteries. *Journal of the Electrochemical Society* 2009, 156 (7), A577-A583.
17. Xia, Y.; Kornfield, J. A.; Grubbs, R. H., Efficient Synthesis of Narrowly Dispersed Brush Polymers via Living Ring-Opening Metathesis Polymerization of Macromonomers. *Macromolecules* 2009, 42 (11), 3761-3766.
18. Fetters, L. J.; Lohse, D. J.; Richter, D.; Witten, T. A.; Zirkel, A., Connection between Polymer Molecular Weight, Density, Chain Dimensions, and Melt Viscoelastic Properties. *Macromolecules* 1994, 27 (17), 4639-47.
19. Young, W.-S.; Albert, J. N. L.; Schantz, A. B.; Epps, T. H., Mixed-Salt Effects on the Ionic Conductivity of Lithium-Doped PEO-Containing Block Copolymers. *Macromolecules* 2011, 44 (20), 8116-8123.
20. Cowie, J. M. G.; Sadaghianizadeh, K., Effect of side chain length and crosslinking on the ac conductivity of oligo (ethyleneoxide) comb-branch polymer-salt mixtures. *Solid State Ionics* 1990, 42 (3-4), 243-249.
21. Zhang, Y.; Costantini, N.; Mierzwa, M.; Pakula, T.; Neugebauer, D.; Matyjaszewski, K., Super soft elastomers as ionic conductors. *Polymer* 2004, 45 (18), 6333-6339.
22. Lascaud, S.; Perrier, M.; Vallee, A.; Besner, S.; Prud'homme, J.; Armand, M., Phase Diagrams and Conductivity Behavior of Poly(ethylene oxide)-Molten Salt Rubbery Electrolytes. *Macromolecules* 1994, 27 (25), 7469-7477.
23. Heimenz, P. C., Lodge, T. P., *Polymer Chemistry, 2nd Ed*. CRC Press: Boca Raton, Pl, 2007.
24. Zhao, C.; Wu, D.; Huang, N.; Zhao, H., Crystallization and thermal properties of PLLA comb polymer. *Journal of Polymer Science Part B: Polymer Physics* 2008, 46 (6), 589-598.
25. Teran, A. A.; Balsara, N. P., Thermodynamics of Block Copolymers with and without Salt. *The Journal of Physical Chemistry B* 2014, 118 (1), 4-17.
26. Meyer, W. H., Polymer Electrolytes for Lithium-Ion Batteries. *Advanced Materials* 1998, 10 (6), 439-448.
27. Panday, A.; Mullin, S.; Gomez, E. D.; Wanakule, N.; Chen, V. L.; Hexemer, A.; Pople, J.; Balsara, N. P., Effect of Molecular Weight and Salt Concentration on Conductivity of Block Copolymer Electrolytes. *Macromolecules* 2009, 42 (13), 4632-4637.
28. Hu, M.; Xia, Y.; McKenna, G. B.; Kornfield, J. A.; Grubbs, R. H., Linear Rheological Response of a Series of Densely Branched Brush Polymers. *Macromolecules* 2011, 44, 6935-6943.
29. Gomez, E. D.; Panday, A.; Feng, E. H.; Chen, V.; Stone, G. M.; Minor, A. M.; Kisielowski, C.; Downing, K. H.; Borodin, O.; Smith, G. D.; Balsara, N. P., Effect of Ion Distribution on Conductivity of Block Copolymer Electrolytes. *Nano Letters* 2009, 9 (3), 1212-1216.
30. Ganesan, V.; Pyramitsyn, V.; Bertoni, C.; Shah, M., Mechanisms Underlying Ion Transport in Lamellar Block Copolymer Membranes. *ACS Macro Letters* 2012, 1 (4), 513-518.
31. Hou, W.-H.; Chen, C.-Y.; Wang, C.-C.; Huang, Y.-H., The effect of different lithium salts on conductivity of comb-like polymer electrolyte with chelating functional group. *Electrochimica Acta* 2003, 48 (6), 679-690.

32. Chintapalli, M.; Chen, X. C.; Thelen, J. L.; Teran, A. A.; Wang, X.; Garetz, B. A.; Balsara, N. P., Effect of Grain Size on the Ionic Conductivity of a Block Copolymer Electrolyte. *Macromolecules* 2014, 47 (15), 5424-5431.
33. Hong, S. W.; Gu, W.; Huh, J.; Sveinbjornsson, B. R.; Jeong, G.; Grubbs, R. H.; Russell, T. P., On the Self-Assembly of Brush Block Copolymers in Thin Films. *ACS Nano* 2013, 7 (11), 9684-9692.
34. Yuan, R.; Teran, A. A.; Gurevitch, I.; Mullin, S. A.; Wanakule, N. S.; Balsara, N. P., Ionic Conductivity of Low Molecular Weight Block Copolymer Electrolytes. *Macromolecules* 2013, 46 (3), 914-921.
35. Teran, A. A.; Mullin, S. A.; Hallinan, D. T.; Balsara, N. P., Discontinuous Changes in Ionic Conductivity of a Block Copolymer Electrolyte through an Order-Disorder Transition. *ACS Macro Letters* 2012, 1 (2), 305-309.
36. van Gurp, M., Palmen, J., Time-Temperature Superposition For Polymer Blends. *Rheol. Bull.* 1998, 67, 5-8.
37. Pakula, T.; Zhang, Y.; Matyjaszewski, K.; Lee, H.-i.; Boerner, H.; Qin, S.; Berry, G. C., Molecular brushes as super-soft elastomers. *Polymer* 2006, 47 (20), 7198-7206.

Supporting Information: ABA Triblock Brush Polymers: Synthesis, Self-Assembly, Conductivity, and Rheological Properties General All reagents were used as received unless otherwise noted. Carbic anhydride was purchased from Acros Organics. Propargylamine, copper(I) bromide, 1-ethyl-3-(3-dimethylaminopropyl)carbodiimide (EDC), methyl α-bromoisobutyrate, N,N,N',N',N''-pentamethyldiethylenetriamine (PMDETA), sodium azide, triethylamine, 6-aminohexanoic acid, 4-dimethylaminopyridine, poly(ethylene glycol) methyl ether (Mn=2000 g/mol), and pyridine were purchased from Sigma Aldrich. Grubbs' second generation catalyst [(H2IMes)(PCy3)(Cl)2Ru=CHPh] was generously supplied by Materia. CDCl3 and C6D6 were purchased from Cambridge Isotopes Labs. Toluene, benzene, dichloromethane (DCM), dimethylformamide (DMF), methanol, tetrahydrofuran (THF), pentane, sodium sulfate, and magnesium sulfate were purchased from VWR.

Synthesis of Norbornene Exo-Anhydride (1)

Scheme S1: Synthesis of norbornene exo-anhydride.

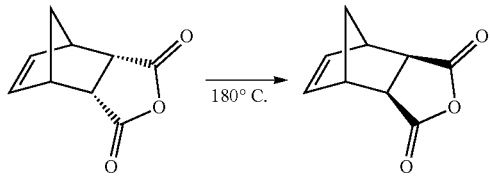

A 500 mL round bottom flask was half filled with commercially available norbornene endo-anhydride (carbic anhydride), fitted with a reflux condenser, and heated neat at 180° C. for 16 hours. The resulting molten yellow solid was slowly cooled to 75° C. and benzene was added before the entire volume crystallized to facilitate dissolution. The resulting mixture was heated to reflux and crystallized at room temperature. The recrystallization in benzene was repeated three additional times to yield a white or slightly off-white crystalline solid (ca. 30 g isolated mass). $^1$H NMR (CDCl3) δ (ppm): 6.31 (2H, t), 3.43 (2H, s), 2.99 (2H, s), 1.65 (1H, m), 1.42 (1H, m).

Synthesis of Norbornene Propargyl Imide (2)

Scheme S2: Synthesis of norbornene propargyl imide.

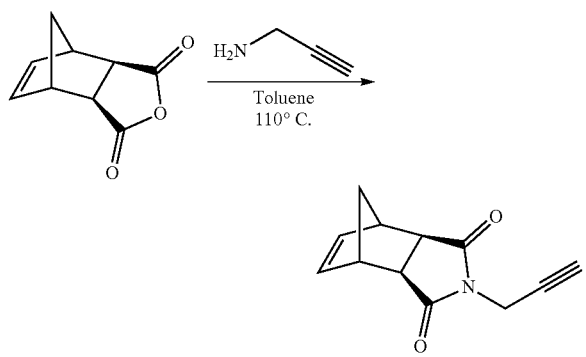

Norbornene exo-anhydride (1) (1.0 eq., 62.59 g, 381.2 mmol), propargylamine (1.0 eq., 21.00 g, 381.2 mmol), triethylamine (0.1 eq., 3.86 g, 38.1 mmol) and toluene (300 mL) were mixed in a round bottom flask equipped with a Dean-Stark trap. The mixture was heated to reflux for 15 hours. The resulting orange solution was cooled to room temperature, and the toluene was removed in vacuo. The crude solid was recrystallized in ethanol to yield light brown, plate-like crystals (56.25 g). $^1$H NMR (CDCl$_3$) δ (ppm): 6.28 (2H, m), 4.20 (2H, d), 3.30 (2H, m), 2.70 (2H, d), 2.17 (1H, t), 1.50 (1H, d), 1.25 (1H, d).

Synthesis of Polystyrene Macromonomer

Synthesis of Polystyrene (3) Using Atom Transfer Radical Polymerization

Scheme S3: Atom transfer radical polymerization of styrene.

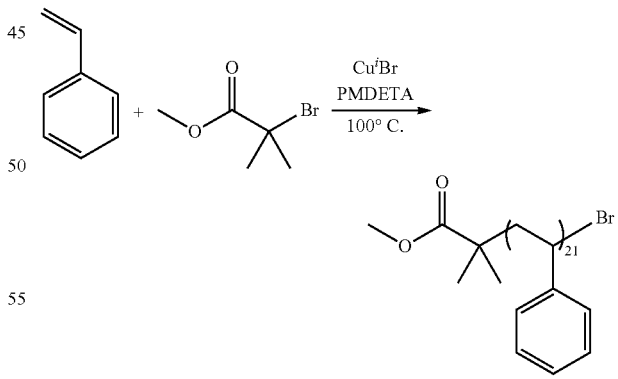

Styrene monomer (500 mL) was stirred with basic alumina for 30 min and filtered to yield a clear liquid. Styrene (50.0 eq., 350 mL, 3.054 mol) was added to a 500 mL Schlenk flask equipped with a stir bar and septum. The flask was charged with ligand N,N,N',N',N''-pentamethyldiethylenetriamine (0.3 eq., 3.83 mL, 0.018 mol) and subsequently freeze-pump-thawed three times to remove oxygen. The flask was frozen in liquid nitrogen, placed under an active flow of argon (while still frozen), and Cu¹Br (0.3 eq., 2.63 g, 0.018 mol) was quickly added upon removal of the septum. The septum was re-attached, the argon flow stopped, and the flask was evacuated. (Caution: argon condenses at liquid nitrogen temperatures and can cause an explosion upon expansion when thawed.) Three additional pump/purge (argon/vacuum) cycles were performed and the flask was left under dynamic vacuum for at least 5 min. The flask was thawed in warm water and placed under argon. Most, but not all, of the copper dissolved to yield a green solution. (A blue color indicates oxygen contamination; a yellow color indicates insufficient copper dissolution—both result in a failed polymerization.) In a separate flask, methyl α-bromoisobutyrate was freeze-pump-thawed three times. Methyl α-bromoisobutyrate (1.0 eq., 7.90 mL, 0.061 mol) was injected into the Schlenk flask containing styrene and the mixture was heated in an oil bath pre-set to 100° C. Aliquots were collected every ca. 30 min under a dynamic flow of argon. Conversion was monitored by $^1$H NMR. The polymerization was quenched in liquid nitrogen after 2 hr 35 min at approximately 38% conversion. The viscous solution was warmed to room temperature, diluted with tetrahydrofuran (100 mL), filtered through basic alumina to remove copper, and precipitated into methanol at −78° C. The polymer was redissolved in THF and reprecipitated five more times into methanol at −78° C. and dried in vacuo to yield a white powder.

Synthesis of polystyrene-azide (4)

Scheme S4: Synthesis of polystyrene-azide.

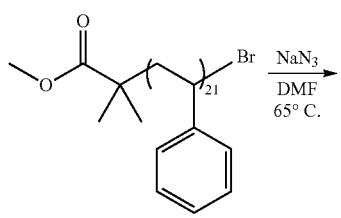

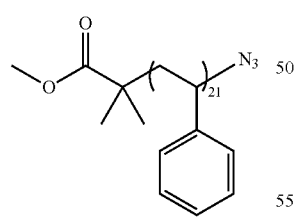

Polystyrene (3) (1.0 eq., 73 g, 37.0 mmol), sodium azide (3.0 eq., 7.12 g, 109.5 mmol), and dimethylformamide (350 mL) were mixed in a round bottom flask equipped with a stir bar and reflux condenser. The mixture was heated at 65° C. for 16 hr and then cooled to room temperature. The product was precipitated into methanol at −78° C., redissolved in THF, and the precipitation procedure was repeated 4 additional times. Quantitative conversion of the end group was observed by 1H NMR (CDCl3) δ(ppm): PS—Br 4.6-5.0 ppm, PS—N3 3.75-4.25.

Synthesis of Polystyrene Macromonomer (5)

Scheme S5: Synthesis of polystyrene macromonomer.

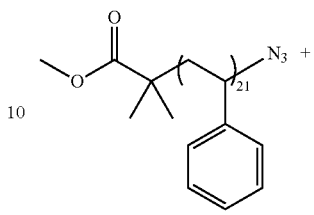

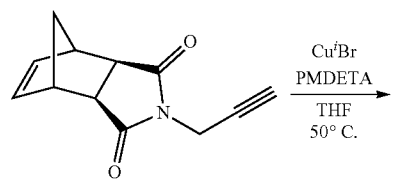

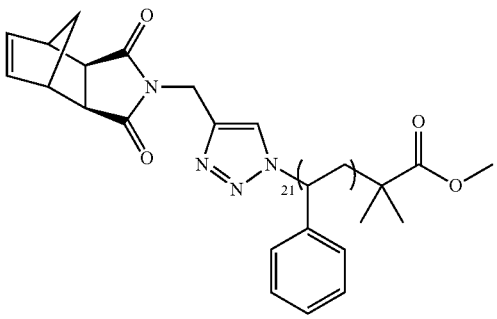

Polystyrene-azide (4) (1.0 eq., 64.30 g, 30.6 mmol), norbornene propargyl imide (2) (1.5 eq., 9.24 g, 45.9 mmol), and Cu$^I$Br (0.4 eq., 1.76 g, 12.3 mmol) were added to a 500 mL three-neck round bottom flask equipped with a stir bar, reflux condenser, and two septa. The flask was pump/purged with argon three times and placed under argon. Dry tetrahydrofuran (180 mL) was added via syringe, followed by N,N,N',N',N''-pentamethyldiethylenetriamine (0.4 eq., 2.56 mL, 12.3 mmol), upon which the solution turned light green and clear. The flask was heated at 50° C. for 16 hr and cooled to room temperature. The solution was diluted with tetrahydrofuran (100 mL), filtered through basic alumina to remove the copper, and precipitated into methanol at −78° C. The precipitation was repeated 5 additional times to yield a white powder. Quantitative conversion of the end group was observed by $^1$H NMR (CDCl3) δ(ppm): PS—N3 3.75-4.25, PS-norbornene 4.89-5.05.

Synthesis of Norbornene Carboxylic Acid Imide (6)

Scheme S6: Synthesis of norbornene carboxylic acid imide.

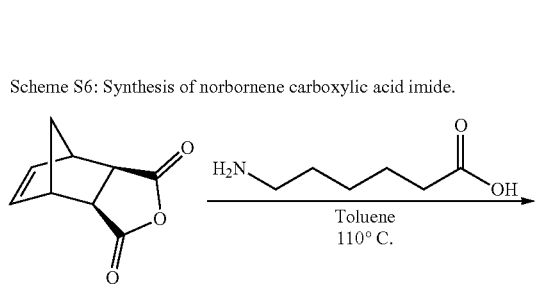

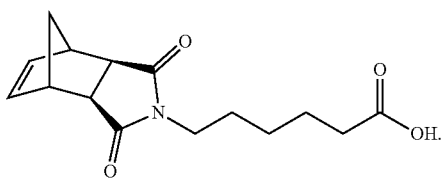

Norbornene exo-anhydride (1) (1.0 eq., 8 g, 48.7 mmol), 6-aminohexanoic acid (1.0 eq., 6.39 g, 48.7 mmol), triethylamine (0.1 eq., 0.679 mL, 4.87 mmol), and toluene (51 mL) were added to a round bottom flask equipped with a stir bar and reflux condenser. The mixture was heated at 110° C. for 19 hr, cooled to room temperature, and the solvent was removed in vacuo. The remaining solid was redissolved in dichloromethane, washed with water (×3), washed with brine (×3), and dried with magnesium sulfate. The solvent was removed in vacuo to yield a white or slightly off white solid. 1H NMR (CDCl3) δ(ppm): 6.28 (2H, m), 3.46 (2H, t), 3.27 (2H, m), 2.35 (2H, t), 1.72-1.18 (10H, m).

Synthesis of PEO Macromonomer (7)

Scheme S7: Synthesis of PEO macromonomer.

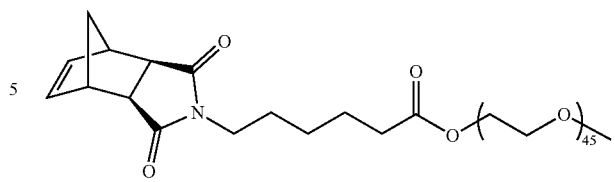

Norbornene carboxylic acid imide (6) (1.2 eq., 19.742 g, 71.2 mmol), polyethylene glycol) methyl ether (Mn=2000 g/mol, 1.0 eq., 118.641 g, 59.3 mmol), 1-Ethyl-3-(3-dimethylaminopropyl)carbodiimide (1.6 eq., 18.244 g, 117.5 mmol), 4-dimethylaminopyridine (0.1 eq., 0.725 g, 5.9 mmol), and dichloromethane (790 mL) were mixed in a 1 L round bottom flask equipped with a stir bar. The reaction was stirred for 24 hr and about half of the dichloromethane was removed in vacuo. The mixture was washed with 1 M HCl (×3), brine (×1), and dried with sodium sulfate. Most of the solvent was removed in vacuo and the remaining solution was precipitated into diethyl ether at −78° C. The off-white solid was filtered and dried in vacuo to yield 123.3 g (93%) of isolated material.

TABLE S1

Macromonomer molecular weight information.

| Macromonomer | Molecular Weight (kDa) | | | Đ | N |
| --- | --- | --- | --- | --- | --- |
| | $M_n$ (NMR) | $M_n$ (SEC) | $M_w$ (SEC) | | |
| PS | 2.54 | 2.43 | 2.50 | 1.03 | 21[#] |
| PEO | 2.46 | 2.58 | 2.68 | 1.04 | 45[*] |

[#]Determined by $^1$H NMR, excludes endgroups

[*]As reported by supplier

Synthesis of poly[(norbornene-graft-styrene)-block-(norbornene-graft-ethylene oxide)-block-(norbornene-graft-styrene)] (gPS-gPEO-gPS) (9)

Scheme S8: Synthesis of ABA triblock brush polymers.

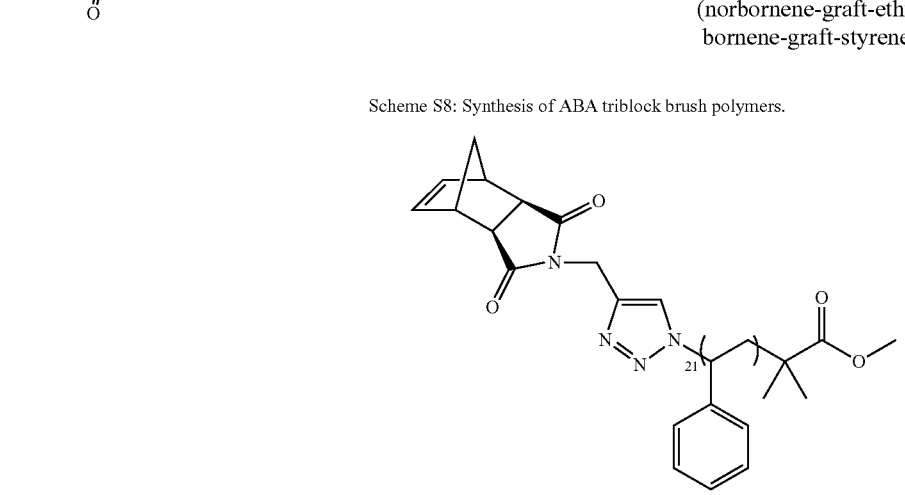

A1

-continued

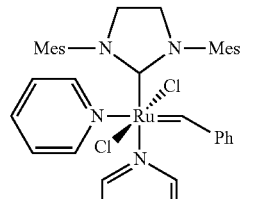

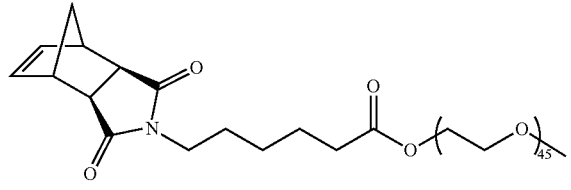

B

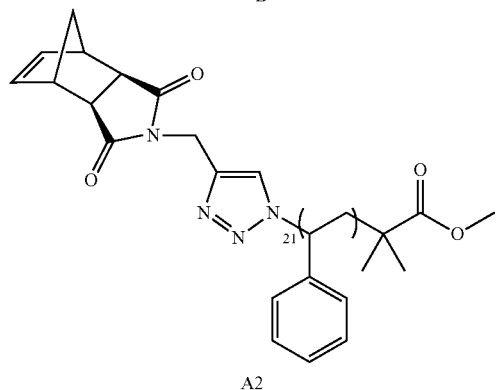

A2

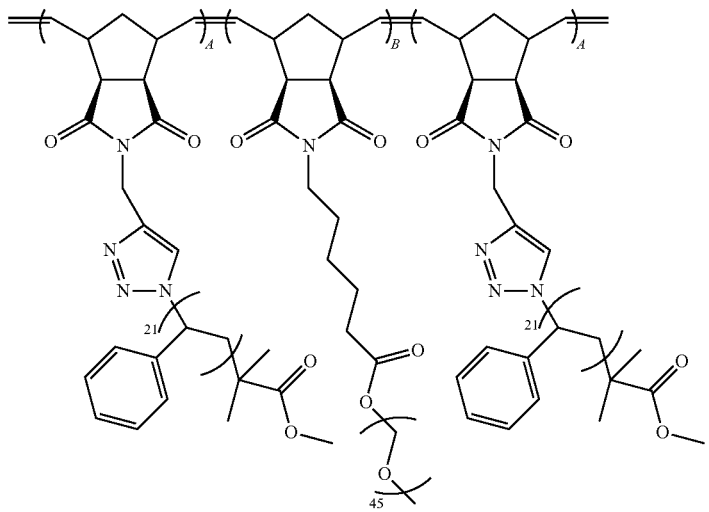

In a glove box, three separate vials were prepared containing solutions of macromonomers in dry dichloromethane. Vial A1: PS macromonomer (10.0 eq., 0.635 g), DCM (4.27 mL); Vial B: PEO macromonomer (80.0 eq., 4.554 g), DCM (40 mL); Vial A2: PS macromonomer (10.0 eq., 0.635 g), DCM (5 mL). A fourth vial was prepared with the ruthenium catalyst (31.1 mg, 0.025 mmol) in 1.244 mL DCM. The polymerization was initiated by injecting 0.726 mL of the catalyst solution into vial A1. After 40 minutes, a small aliquot was extracted, quenched with ethyl vinyl ether, and vial B was quickly added in full to vial A1. After 100 min, a small aliquot was extracted, quenched with ethyl vinyl ether, and vial A2 was added in full to vial A1. After 120 min, vial A1 was removed from the glove box, rapidly stirred, and quenched with 5 mL of ethyl vinyl ether. The ABA triblock brush polymer was precipitated into diethyl ether (600 mL) at −78° C., filtered, and dried in vacuo to yield an off white powder.

Size Exclusion Chromatography (SEC):

SEC data were collected using two MZ-Gel SDplus 300×8.0 mm columns with 10 μm beads, an Agilent 1100 series autosampler and pump, and a Wyatt ViscoStar viscometer, Optilab rEX differential refractive index detector, and three-angle miniDAWN TREOS light scattering detector. On-line determination of do/dc assumed 100% mass elution under the peak of interest. The mobile phase was THF with 1 vol % triethylamine, which eliminated artificial dragging effects in pure THF (presumably arising from PEO/column interactions).

TABLE S2

Summary of gPS11-gPEO78-gPS11 triblock brush polymer size exclusion chromatography molecular weight data. The dn/dc value of the diblock and triblock copolymers was arbitrarily set to 0.050.

| | | | SEC | | | |
|---|---|---|---|---|---|---|
| Sample | $N_{target}$ | $N_{calc}$ | $M_n$ (kDa) | $M_w$ (kDa) | Đ | dn/dc (mL/g) |
| gPS$_{11}$ | 10 | 11^ | 28.8 | 29.3 | 1.02 | 0.165* |
| gPS$_{11}$-gPEO$_{78}$ | 10-80 | 11^-78# | 459.7 | 518.3 | 1.13 | 0.050 |
| gPS$_{11}$-gPEO$_{78}$-gPS$_{11}$ | 10-80-10 | 11^-78#-11# | 656.5 | 764.8 | 1.17 | 0.050 |

Calculated by $^1$H NMR
^Calculated by SEC
*Measured by SEC

TABLE S3

Summary of gPS15-gPEO119-gPS15 triblock brush polymer size exclusion chromatography molecular weight data. The dn/dc value of the diblock and triblock copolymers was arbitrarily set to 0.050.

| | | | SEC | | | |
|---|---|---|---|---|---|---|
| Sample | $N_{target}$ | $N_{calc}$ | $M_n$ (kDa) | $M_w$ (kDa) | Đ | dn/dc (mL/g) |
| gPS$_{15}$ | 15 | 15^ | 38.41 | 38.55 | 1.00 | 0.165* |
| gPS$_{15}$-gPEO$_{119}$ | 15-120 | 15^-119# | 562.6 | 604.2 | 1.07 | 0.050 |
| gPS$_{15}$-gPEO$_{119}$-gPS$_{15}$ | 15-120-15 | 15^-119#-15# | 710.0 | 769.3 | 1.08 | 0.050 |

Calculated by $^1$H NMR
^Calculated by SEC
*Measured by SEC

The high molecular weight shoulder in the light scattering SEC signal (FIGS. 7-8) is exacerbated at high PEO NB values (data not shown). We have evidence that this shoulder is related to an impurity in the commercially available (Sigma Aldrich) mono-functional 2000 g/mol PEO. Since the LS signal~M*c (where M is molecular weight and c is polymer concentration) while the dRI signal~c, the concentration of species giving rise to the shoulder for gPS11-gPEO78-gPS11 and gPS15-gPEO119-gPS15 is relatively small at this N. The orders of magnitude price difference between small quantities of extensively purified PEO (e.g. from Jenkem) and large quantities of readily available PEO may warrant using the latter if a process is capable of tolerating the behavior observed in FIGS. 7-8.

TABLE S4

Figure 9:
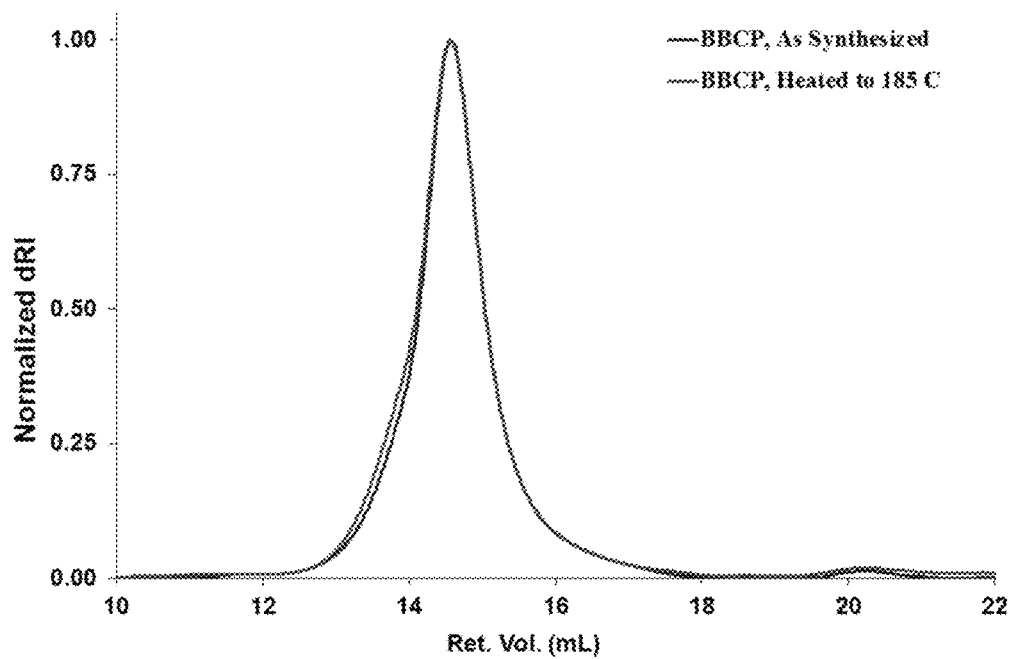
FIG. 9: Thermal stability of gPS$_{11}$-gPEO$_{78}$-gPS$_{11}$ as measured by SEC. Blue curve: as synthesized. Red curve: sample characterized by rheology (maximum heating temperature 185° C., under N$_2$).

SEC molecular weight characterization corresponding to FIG. 9.

| Sample | $M_n$ (kDa) | $M_w$ (kDa) | Đ |
|---|---|---|---|
| As Synthesized | 656.5 | 764.8 | 1.17 |
| Heated to 185° C. | 730.4 | 882.8 | 1.21 |

TABLE S5 gPEO SEC molecular weight characterization corresponding to FIG. 10.

| Sample | $N_{calc}$ | $M_n$ (kDa) | $M_w$ (kDa) | Đ | dn/dc (mL/g) |
|---|---|---|---|---|---|
| gPEO$_{104}$ | 104 | 237.2 | 253.2 | 1.07 | 0.0566 |
| gPEO$_{167}$ | 167 | 381.2 | 418.4 | 1.10 | 0.0566 |

SAXS Data:

SAXS data were collected at Argonne National Laboratory APS Beamline 12-ID-B on the same blend samples that were subjected to DSC analysis (i.e., all samples were prepared in a dry room and hermetically sealed to avoid moisture contamination). The neat BBCP samples were fabricated as follows: 1) BBCP powder (ca. 20 mg) was placed between two sheets of Kapton film, 2) the Kapton film was sandwiched between thick glass slides, 3) the glass slides were compressed with medium-sized binder clips, 4) the films were annealed under vacuum at 120° C. for 2 hrs and subsequently slowly cooled to room temperature under vacuum. The neat BBCP samples clearly flowed during annealing and produced a transparent and slightly light brown film. The Kapton film was cut with scissors to yield approximate dimensions 2×15×0.07 mm (height×width×thickness). SAXS data were collected parallel to the Kapton film plane through the sample dimension approximately 2 mm thick.

TABLE S6

Summary of gPS11-gPEO78-gPS11 SAXS data.

| Sample | q* (1/Å) | D* (nm) | 2nd peak | 2nd Peak/q* | 3rd Peak | 3rd Peak/q* |
|---|---|---|---|---|---|---|
| BBCP | 0.023997 | 26.2 | 0.041995 | 1.75 | 0.062993 | 2.63 |
| 20:1 | 0.017998 | 34.9 | 0.031496 | 1.75 | ≈0.035496 | 1.97 |
| 15:1 | 0.017998 | 34.9 | 0.030996 | 1.72 | 0.035996 | 2.00 |
| 10:1 | 0.017998 | 34.9 | 0.031496 | 1.75 | 0.036496 | 2.03 |
| 5:1 | 0.020998 | 29.9 | — | — | — | — |
| 2:1 | 0.018998 | 33.1 | — | — | — | — |

TABLE S7

Summary of gPS15-gPEO119-gPS15 SAXS data.

| Sample | q* (1/Å) | D* (nm) | 2nd peak | 2nd Peak/q* | 3rd Peak | 3rd Peak/q* |
|---|---|---|---|---|---|---|
| BBCP | 0.021997 | 28.6 | 0.037496 | 1.70 | 0.057993 | 2.64 |
| 20:1 | 0.017498 | 35.9 | 0.029997 | 1.71 | 0.035496 | 2.03 |
| 15:1 | 0.016998 | 37.0 | 0.028997 | 1.71 | 0.034996 | 2.03 |
| 10:1 | 0.016998 | 37.0 | 0.029497 | 1.74 | 0.034996 | 2.06 |
| 5:1 | 0.015498 | 40.5 | 0.026997 | 1.74 | 0.031996 | 2.06 |
| 2:1 | 0.017998 | 34.9 | — | — | — | — |

Conductivity Measurements:
General Information:

All sample preparation was performed in a dry room (dew point <−45° C.) to prevent water contamination. The linear PEO homopolymer (300 kDa) utilized in normalized conductivity experiments was purchased from Sigma Aldrich and dried in vacuo at 100° C. before use. gPEO homopolymer was dried in vacuo at room temperature before use. The following coin cell parts were purchased from Pred Materials (part# CR2032): coin cell kit (Al-clad case, cap, and gasket), coin cell wave spring (15.0 mm diameter, 1.4 mm height), and coin cell spacer disk (16.0 mm diameter, 1.0 mm thickness). A Princeton Applied Research/Ametek VersaSTAT MC was used for AC impedance measurements. Potentiostatic AC impedance spectra were obtained between 1 MHz and 100 mHz using a 10 mV RMS AC signal. Bulk ionic conductivity (σ) was calculated according to the equation σ=L/(AR), where R is the impedance value corresponding to the high frequency plateau of the Bode Re(Z) plot, L is the thickness of the sample and A is the surface area of the polymer electrolyte (taken as the surface area of the disk upon which it was cast, or as 71.48 mm2 for gPEO homopolymers). Variable temperature experiments were performed using a Tenney TUJR thermal test chamber, allowing at least 30 minutes for sample equilibration at each temperature before measurement.

Polymer Thin Film Preparation:

Polymer and LiTFSI were dissolved in cyclopentanone (4:1 wt ratio solvent:polymer), stirred for ca. 1.5 hr, and drop cast onto 1 mm thick circular stainless steel discs (area=1.86 cm2). Most of the cyclopentanone was slowly evaporated in a fume hood over the course of 18 hr, which yielded relatively smooth and mostly homogenous films. The samples were placed in a vacuum oven, heated at 120° C. for 21 hr, and slowly cooled to room temperature under vacuum. Separate 1H NMR experiments (data not shown) confirmed this sample preparation is sufficient to remove all traces of cyclopentanone within the resolution limits of the analytical technique. The gPEO samples were surrounded by a Teflon shell (inner punched diameter: ⅜", outer diameter: ⅝", thickness 0.15 mm) to prevent cell shorting during annealing. A second stainless steel spacer was placed on top of the polymer film and the sandwich was pressed into a coin cell using a coin cell wave spring to ensure good electrical contact. The coin cells were annealed under vacuum at 120° C. for 2 hours, cooled to room temperature under vacuum, and then studied by AC impedance spectroscopy. Film thicknesses used in the conductivity calculations were determined after conductivity experiments by removing the spacer+polymer+spacer sandwich from the coin cell, measuring the stack thickness using calipers, and calculating the polymer thickness by difference (typical polymer thickness values were 50-150 μm). Most BBCP polymer films were within 10-20% of their initial (pre-conductivity experiment) thickness. The thickness of the PEO homopolymer films shrank significantly due to their rubbery physical state (T>>Tg). The final thickness of the gPEO samples was 0.15 mm as expected from the Teflon shell thickness.

Rheology:

Rheology data were collected on a Rheometric Scientific ARES-M using 25 mm diameter parallel plates under constant flow of nitrogen gas. Bulk BBCP was heated under compression in a 1 mm thick circular mold (25 mm diameter) under vacuum for ca. 16 hr. The sample was loaded into the rheometer, heated to 125° C., and the gap was reduced to ca. 0.75 mm. The sample was equilibrated for 1 hr and subsequently cooled to 50° C. under a dynamic N2 purge to visually ensure uniform coverage between the plates. Any polymer overflowing from the edges was removed and the sample was again heated to 125° C. Each temperature was equilibrated for at least 1.5 hr before data collection began. Strain sweeps were performed at each temperature after equilibration to ensure linear viscoelastic response (G' and G" independent of applied strain). Frequency sweep data for temperatures 45-125° C. were collected on cooling; temperatures 145-185° C. were collected on heating. Frequency was scanned in the range 0.01-100 rad/sec at each temperature.

Example 3: ABC Brush Triblock Terpolymers

Compared to AB diblock copolymers, ABC triblock terpolymers vastly expand the parameter space for block copolymer self-assembly.

Figure 16:
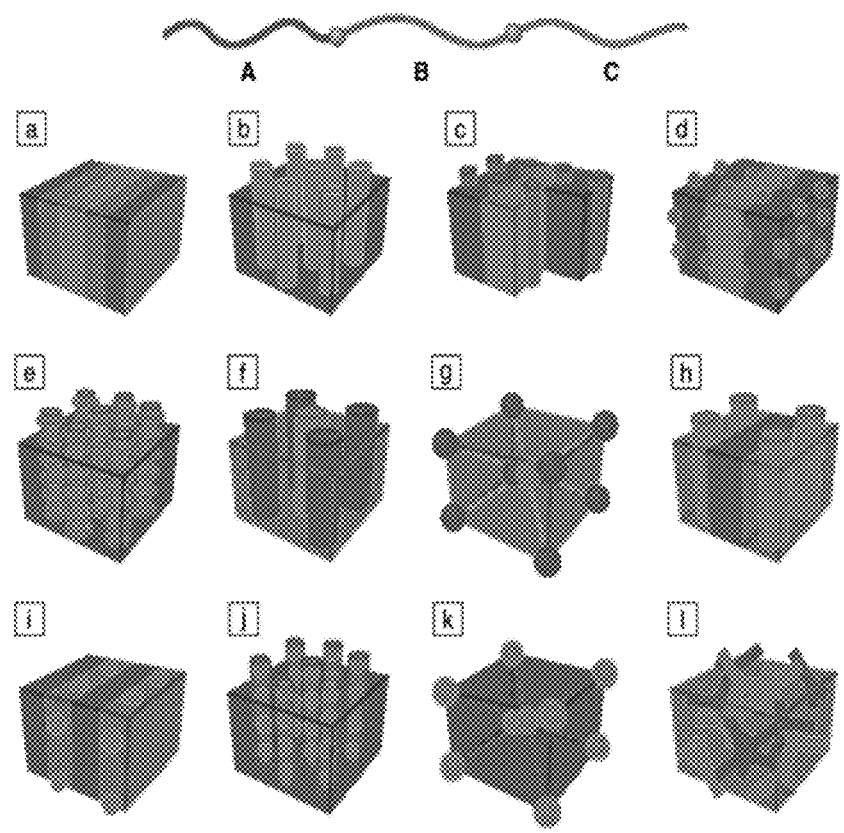
FIG. 16: (a)-(l) Morphologies for linear ABC triblock terpolymers. Blue, red, and green domains correspond to blocks A, B, and C, respectively.

Whereas eight equilibrium morphologies are known for linear AB diblock copolymers, over thirty morphologies have been identified for linear ABC triblock terpolymers (FIG. 16).[1-2] Although the self-assembly of linear ABC triblock terpolymers has been studied by both experiment and theory, the self-assembly of brush ABC triblocks is relatively unexplored. Our work has closed this gap. It represents the first systematic study of ABC brush triblock terpolymer synthesis and self-assembly.

Figure 17:
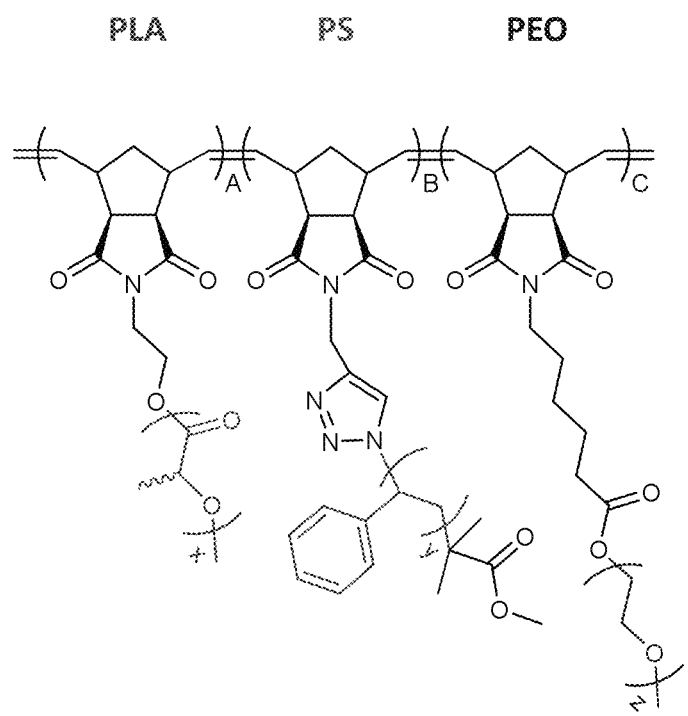
FIG. 17: Structure of ABC brush triblock terpolymers. The grafted side chains are PLA (A), PS (B), and PEO (C).
Figure 18:
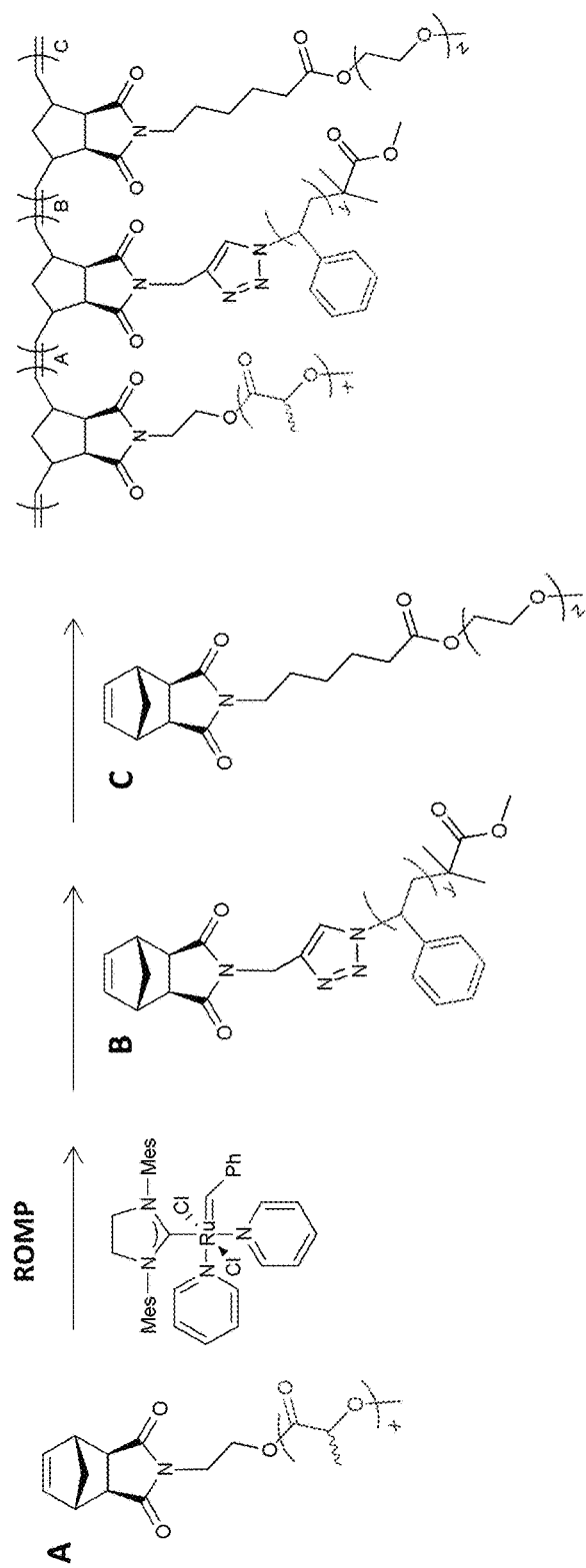
FIG. 18: Synthesis of ABC brush triblock terpolymers by grafting-through ROMP.

We synthesized a series of ABC triblock terpolymers having grafted polylactide (PLA), polystyrene (PS), and poly(ethylene oxide) (PEO) side chains of similar molecular weights ($M_n$=2.62, 2.65, 2.27 kg/mol, respectively) (FIG. 17). These ABC triblocks were synthesized by the grafting-through ring-opening metathesis polymerization (ROMP) of norbornene-functionalized macromonomers (FIG. 18). As described in earlier documents related to our patent strategy, these brush block copolymers (BBCPs) are unique compared to previously reported graft polymers. The BBCPs have the following advantages a) complete grafting in all blocks (not only one block);
b) 100% side chain grafting density on the backbone;
c) excellent control over molecular weight;
d) narrow dispersity (Đ<1.2); and
e) no required post-polymerization modifications.

Our system incorporates blocks with advantageous physical and chemical properties: (i) chemically etchable, biorenewable PLA; (ii) thermoplastic PS; and (iii) water-soluble, biocompatible PEO. Other polymers with desired physical or chemical properties can be incorporated in the ABC architecture, creating new platforms for polymer materials.

The structure can be varied in many ways. There are two approaches to introducing asymmetry: (1) Varying the backbone degrees of polymerization (A, B, C) and (2) varying side chain degrees of polymerization (x, y, z). Both approaches to introducing asymmetry vary the effective volume fractions of blocks, and therefore potentially affect the self-assembly and properties of the triblocks.

Figure 19:
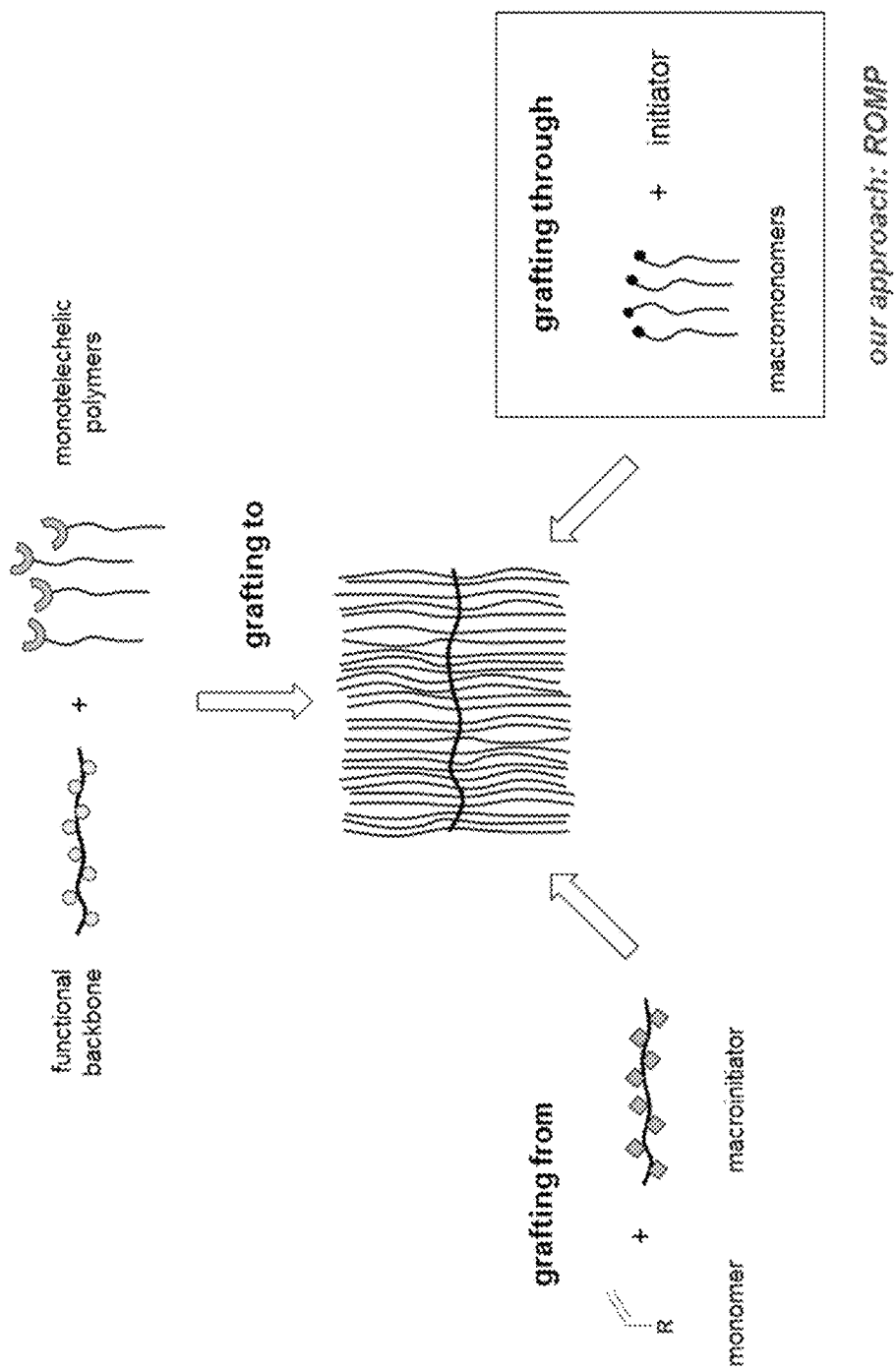
FIG. 19: Approaches to synthesizing bottlebrush polymers.

ROMP enables independent variation of all structural parameters as synthesis of ABC bottlebrush polymers by other strategies is challenging. There are three general approaches to synthesizing bottlebrush polymers: grafting to, grafting from, and grafting through (FIG. 19). Grafting-to and grafting-from approaches to synthesizing brush block copolymers typically result in incomplete grafting of the backbone and/or broad distributions in the lengths of side chains. In addition, they often involve complicated protection/deprotection steps. For these reasons, the grafting-to and grafting-from approaches are not synthetically tractable for generating a library of polymers for systematic study of ABC brush triblock self-assembly.

The Rzayev group recently reported a system of interest. Rzayev and coworkers synthesized an ABC brush triblock terpolymer by grafting from a poly(methyl methacrylate) backbone.[3] The side chains were polystyrene (PS), poly(methyl methacrylate) (PMMA), and polylactide (PLA). Because the synthesis required multiple grafting from steps from a pre-formed backbone, only one composition was synthesized and characterized. Size-exclusion chromatography (SEC) indicated a broad distribution of molecular weights, and small-angle X-ray scattering (SAXS) of a thermally annealed sample suggested minimal long-range order. The PS-PMMA-PLA triblock self-assembles to two-phase lamellae with domain spacing 79 nm.

Figure 20:
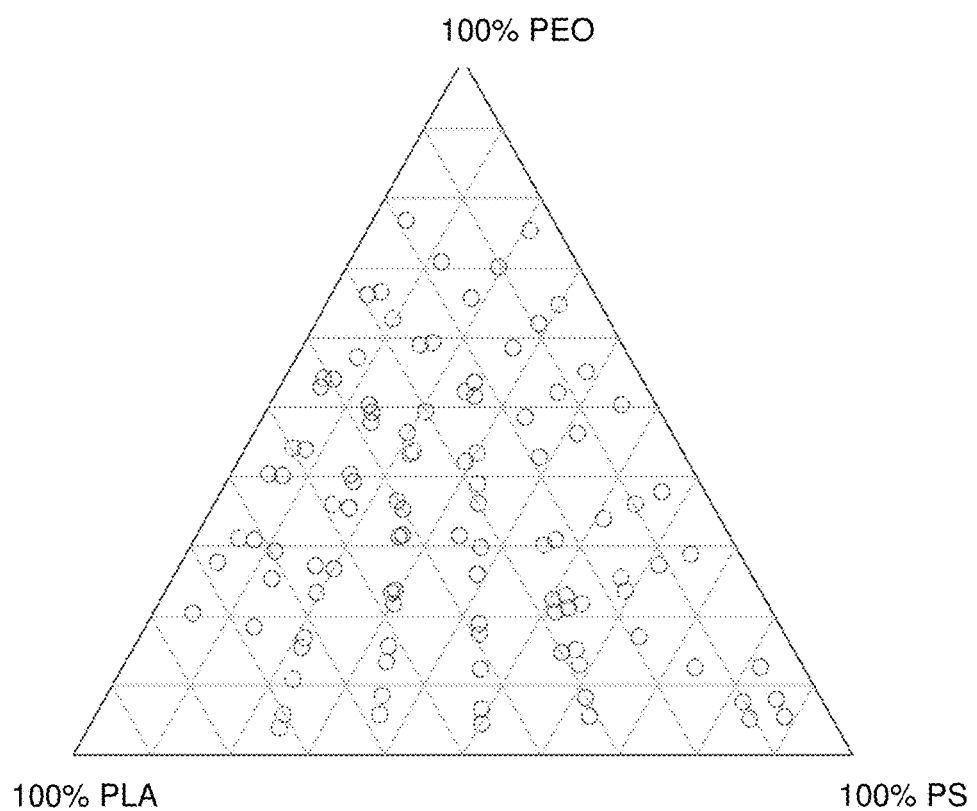
FIG. 20: Blank ternary diagram showing the compositions of all the ABC brush triblock terpolymers synthesized.

Using ROMP, we were able to synthesize many ABC brush triblock terpolymers rapidly and with excellent control over the polymer architecture. FIG. 20 shows >100 ABC triblocks we were able to synthesize in under 1 week. The samples spanned various variations in backbone degree of polymerization and side chain molecular weight. This blank ternary diagram shows that the samples cover the entire composition space.

Figure 21:
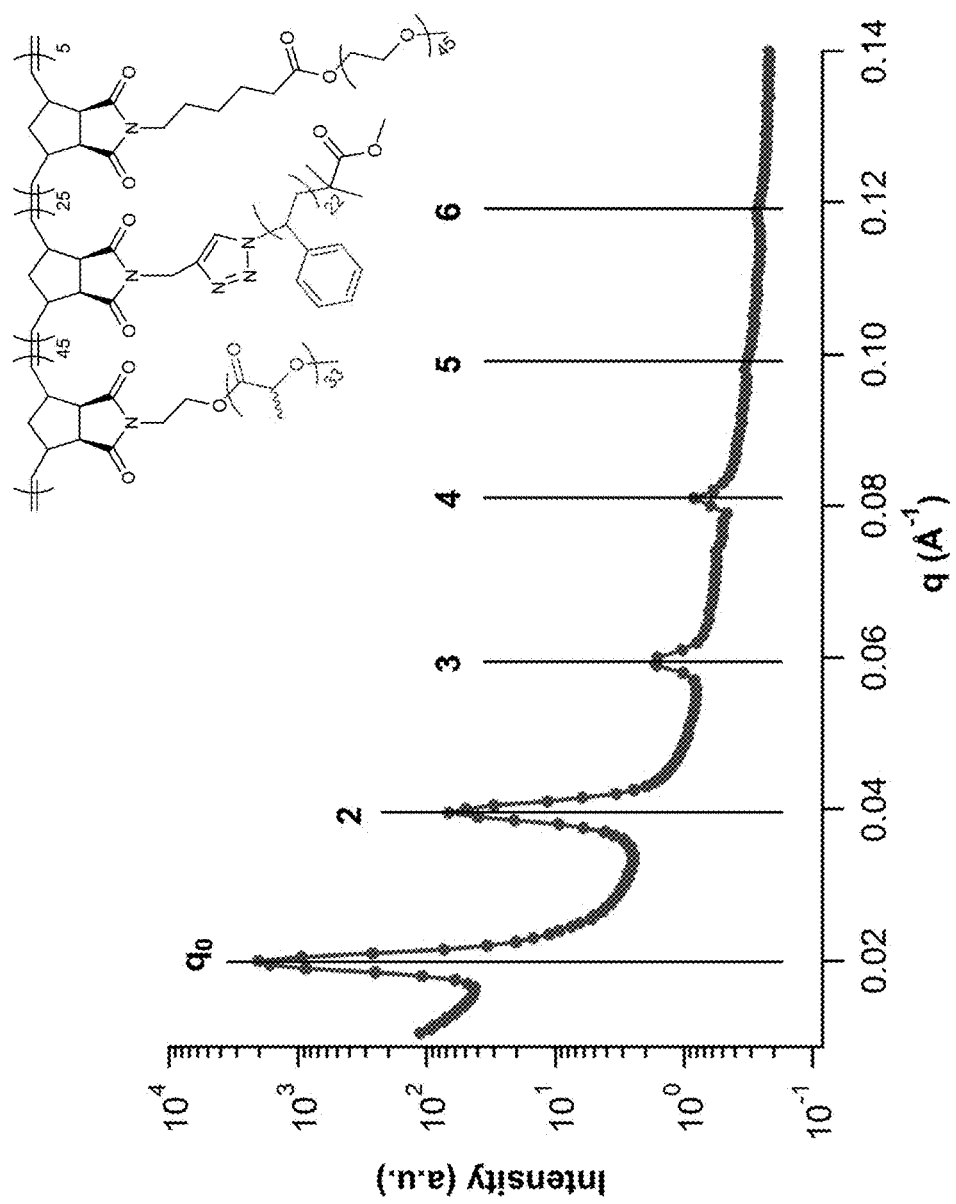
FIG. 21: SAXS profile for PLA-PS-PEO brush triblock terpolymer. Volume fractions of side chains: $f_{PLA}$=0.58, $f_{PS}$=0.36, $f_{PEO}$=0.06.

The polymers were thermally annealed at 140° C. and characterized by synchrotron-source SAXS. FIG. 21 provides an example of an ABC brush triblock that self-assembles to well-ordered lamellae. Sharp diffraction peaks present at relative positions $q/q_o$=1, 2, 3, 4, 5, 6 are consistent with lamellar symmetry. The lowest-order reflection at $q_o$=0.020 Å indicates that the lamellar period is 31.4 nm.

Figure 22:
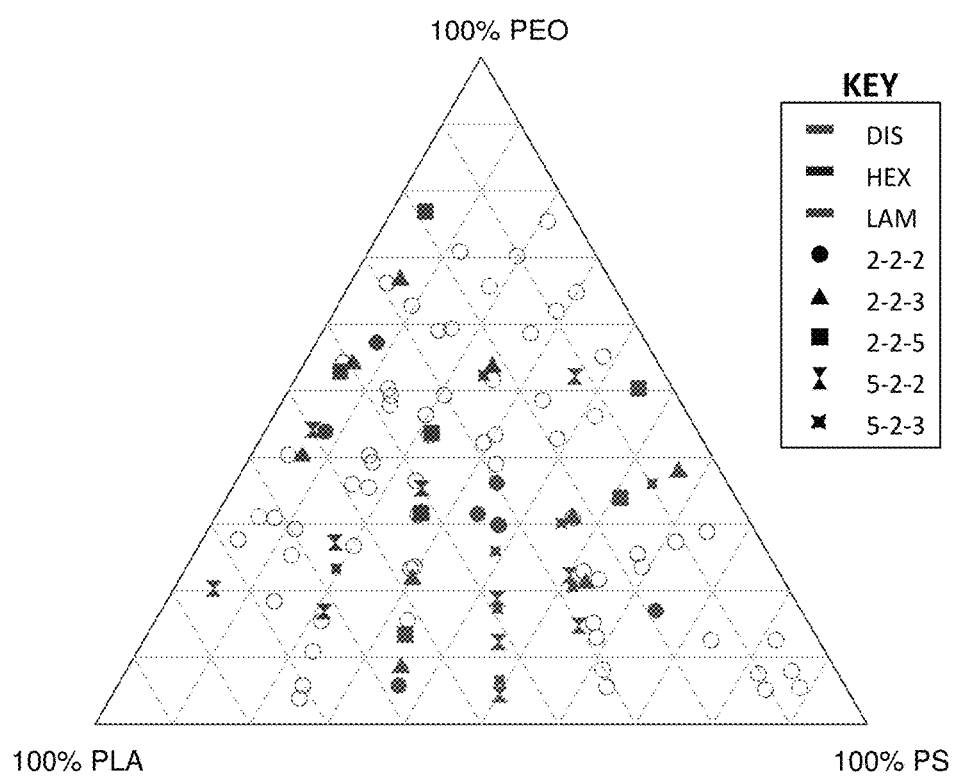
FIG. 22: Ternary phase diagram with structures as identified by SAXS.

SAXS analysis for all synthesized samples enables assignments for the self-assembled morphologies. In this way, we developed a comprehensive understanding of ABC brush triblock copolymer self-assembly. Compare FIGS. 20 and 22. The structures that can be unambiguously assigned by SAXS appear in color in FIG. 22. There is a large region of lamellar (LAM, green) morphologies, a narrow band of stable hexagonally packed cylinder structures (HEX, blue), and at low midblock content, a disordered region. The different shapes represent different variations in side chain asymmetry.

Figure 23:
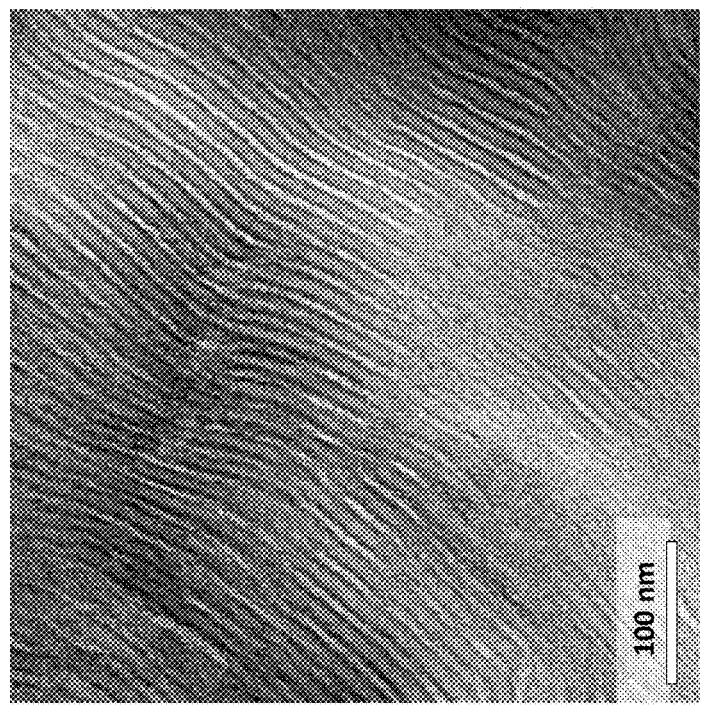
FIG. 23: TEM image of PLA-PS-PEO brush triblock terpolymer. The polymer was stained with RuO$_4$ vapors prior to sectioning.
Figure 23:
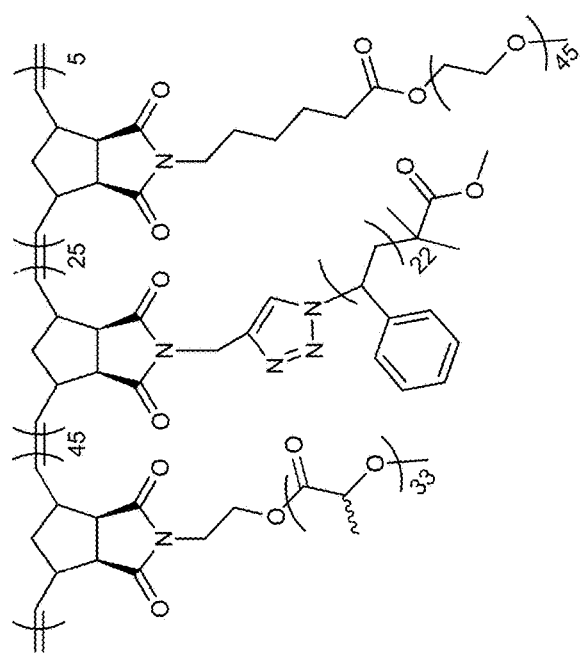

Real-space observation by transmission electron microscopy (TEM) complements structural assignments by SAXS. For the ABC brush triblock that afforded the scattering pattern in FIG. 21. TEM (FIG. 23) shows three-phase contrast (dark-medium-dark-light). Remarkably, the observed domain connectivity for these materials is not consistent with widely accepted knowledge in the field of block copolymer self-assembly.

REFERENCES

1. Zheng, W.; Wang, Z.-G. Morphology of ABC triblock copolymers. Macromolecules 1995, 28, 7215-7223.
2. Bates, F. S.; Fredrickson, G. H. Block Copolymers—Designer Soft Materials. Phys. Today 1999, 52, 32-38.
3. Rzayev, J. Synthesis of Polystyrene-Polylactide Bottlebrush Block Copolymers and Their Melt Self-Assembly into Large Domain Nanostructures. Macromolecules 2009, 42, 2135-2141.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A brush block copolymer comprising:
   a first polymer block and a third polymer block each independently comprising at least 3 first repeating units, wherein each of said first repeating units of said first and third polymer blocks comprises a first polymer backbone group directly or indirectly covalently linked to an ionophobic polymer side chain group;
   a second polymer block comprising at least 3 second repeating units; wherein each of said second repeating units of said second polymer block comprises a second polymer backbone group directly or indirectly covalently linked to an ionophilic polymer side chain group;
   wherein said second polymer block is directly or indirectly covalently linked to both said first polymer block and said third polymer block along a backbone and said second polymer block is positioned between said first polymer block and said third polymer block.

2. The brush block copolymer of claim 1, wherein said brush block copolymer is a triblock brush copolymer.

3. The brush block copolymer of claim 2, wherein said triblock brush copolymer is defined by the formula A'-B-A", wherein A' is said first polymer block, B is said second polymer block, and A" is said third polymer block.

4. The brush block copolymer of claim 1 having a number average molecular weight selected from the range of 500 Daltons to 2,000,000 Daltons.

5. The brush block copolymer of claim 1 comprising 3 to 1000 of said first repeating units in said first polymer block, 3 to 1000 of said second repeating units, and 3 to 1000 of said first repeating units in said third polymer block.

6. The brush block copolymer of claim 1, wherein each of said ionophobic polymer side chains independently has 3 to 100 repeating units and each of said ionophilic polymer side chains has 3 to 100 repeating units.

7. The brush block copolymer of claim 1 defined by the formula (FX1a), (FX1b), (FX1c), (FX1d), (FX1e), (FX1f), (FX1g) or (FX1h):

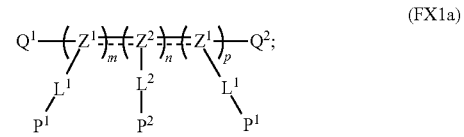
(FX1a)

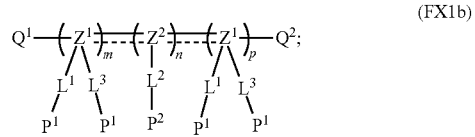
(FX1b)

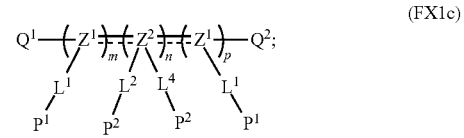
(FX1c)

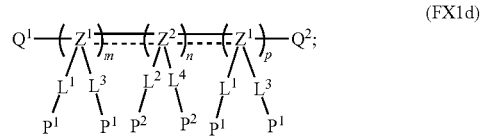
(FX1d)

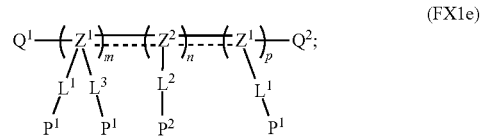
(FX1e)

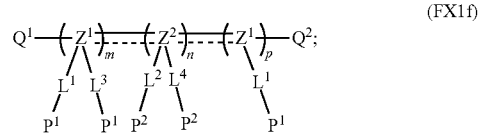
(FX1f)

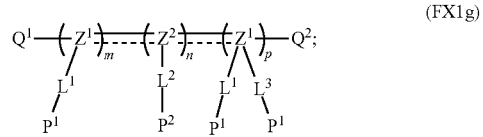
(FX1g)

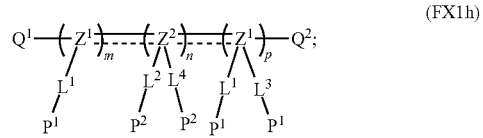
(FX1h)

wherein each $Z^1$ is independently a first polymer backbone group and each $Z^2$ is independently a second polymer backbone group;

wherein $Q^1$ is a first backbone terminating group and $Q^2$ is a second backbone terminating group;

wherein each $L^1$ is independently a first linking group, each $L^2$ is independently a second linking group, each $L^3$ is independently a third linking group, and each $L^4$ is independently a fourth linking group;

wherein each $P^1$ is independently said ionophobic polymer side chain group and each $P^2$ is independently said ionophilic polymer side chain group; and wherein m, n and p are each independently an integer selected from the range of 3 to 1000.

8. The brush block copolymer of claim 7, wherein each $Z^1$ connected to $L^1$, $L^3$, $P^1$ or a combination thereof is independently defined by the formula (FX2a), (FX2b), (FX2c), (FX2d), (FX2e) or (FX2f):

9. The brush block copolymer of claim 7, wherein each $Z^2$ connected to $L^1$, $L^3$, $P^1$ or a combination thereof is independently defined by the formula (FX3a), (FX3b), (FX3c), (FX3d), (FX3e) or (FX3f):

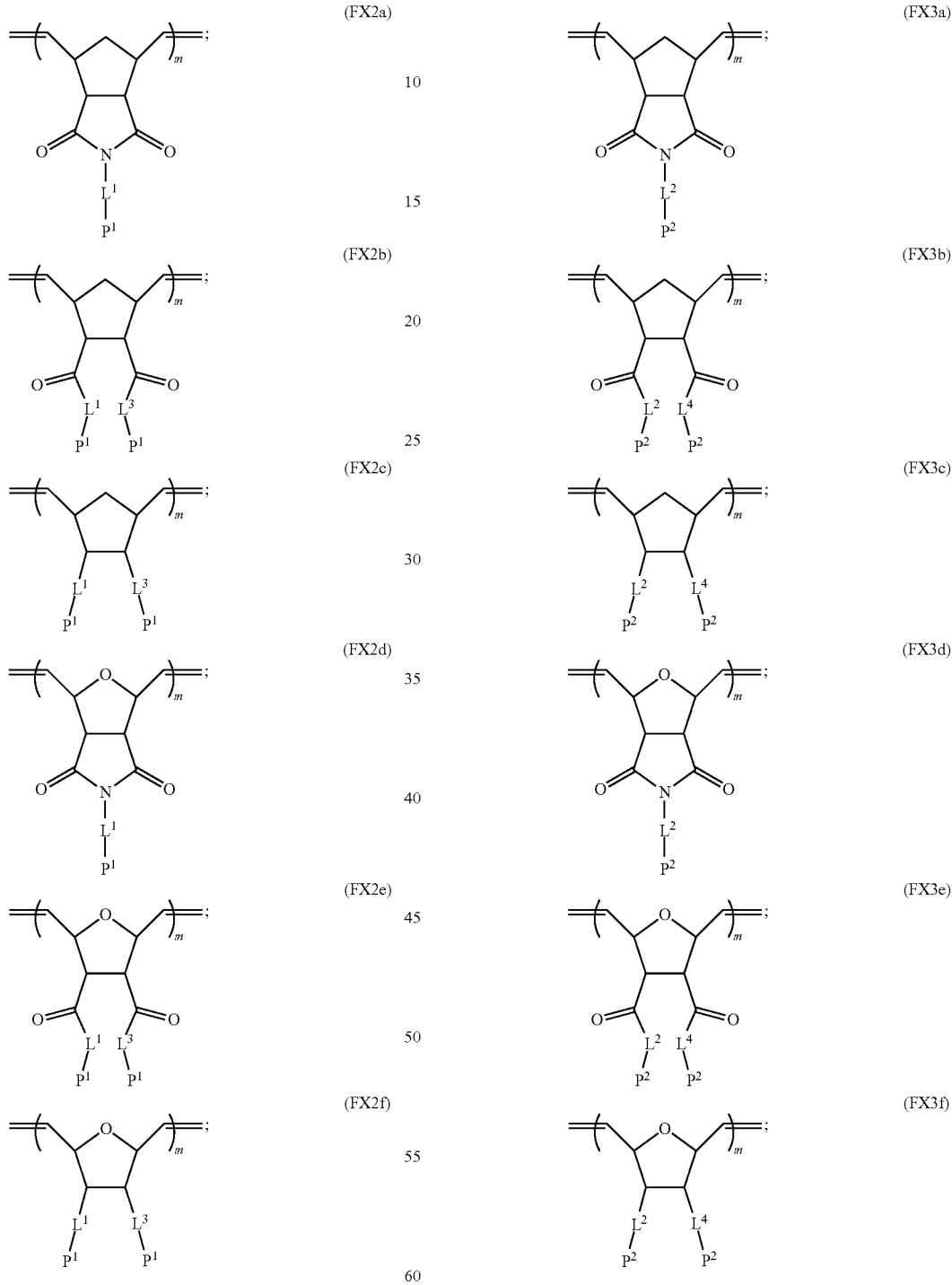

wherein each $L^1$ is independently a first linking group and each $L^3$ is independently a third linking group;

wherein each $P^1$ is independently an ionophobic polymer side chain; and m is an integer selected from the range of 3 to 1000.

wherein each $L^2$ is independently a second linking group and each $L^4$ is independently a fourth linking group;

wherein each $P^2$ is independently an ionophilic polymer side chain; and n is an integer selected from the range of 3 to 1000.

10. The brush block copolymer of claim 7, wherein each $L^1$, $L^2$, $L^3$ and $L^4$ is independently defined by the formula (FX5a), (FX5b) or (FX5c):

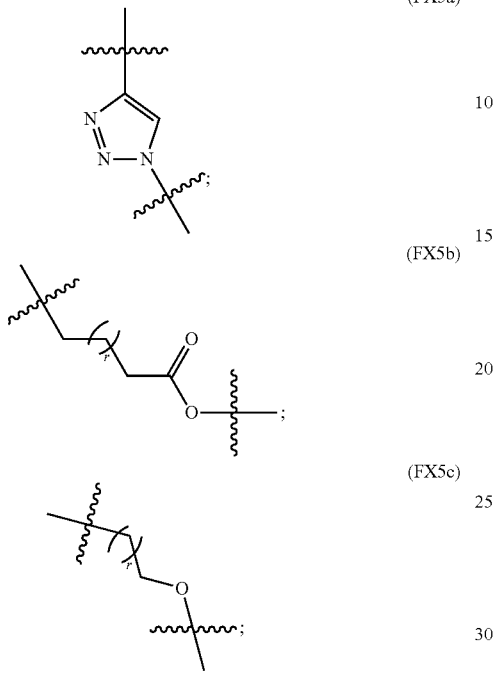

(FX5a)

(FX5b)

(FX5c)

wherein r is an integer selected from the range of 1 to 5.

11. The brush block copolymer of claim 7, wherein each ionophobic polymer side chain is independently defined by the formula (FX5a) or (FX5b):

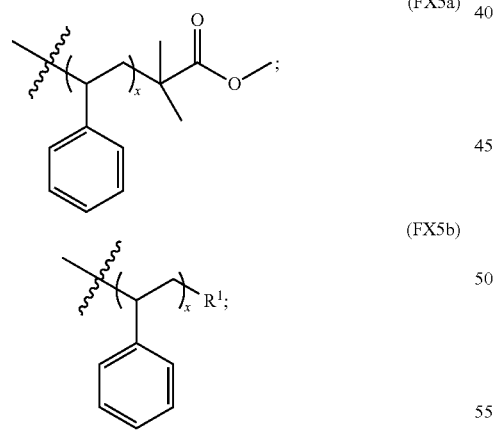

(FX5a)

(FX5b)

wherein x is an integer selected from the range of 3 to 100;
wherein $R^1$ is a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

12. The brush block copolymer of claim 7, wherein each ionophilic polymer side chain is independently defined by the formula (FX6a), (FX6b), (FX6c) or (FX6d):

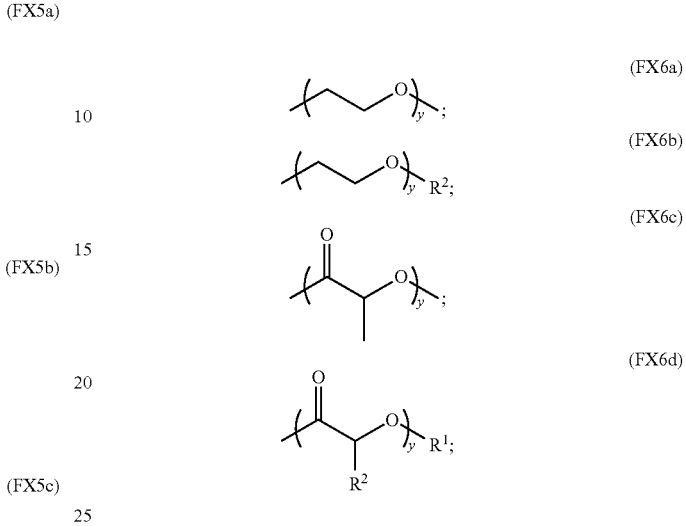

(FX6a)

(FX6b)

(FX6c)

(FX6d)

wherein y is an integer selected from the range of 3 to 100;
wherein each $R^1$ and $R^2$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

13. The brush block copolymer of claim 7 defined by the formula (FX7):

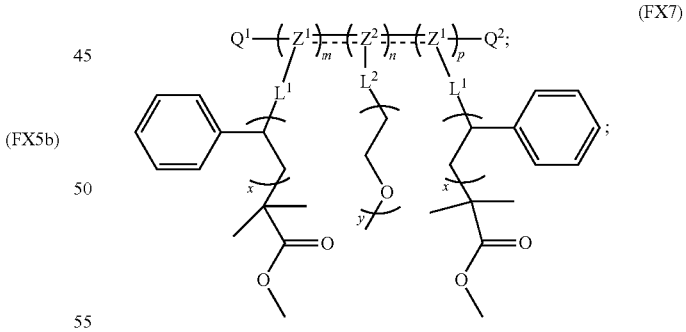

(FX7)

wherein each $Z^1$ is independently a first polymer backbone group and each $Z^2$ is independently a second polymer backbone group;
wherein $Q^1$ is said first backbone terminating group and $Q^2$ is said second backbone terminating group;
wherein each $L^1$ is independently a first linking group and each $L^2$ is independently a second linking group;
wherein m, n and p are each independently an integer selected from the range of 3 to 1000; and
wherein x is an integer selected from the range of 3 to 100 and y is an integer selected from the range of 3 to 100.

14. The brush block copolymer of claim 7 defined by the formula (FX8):

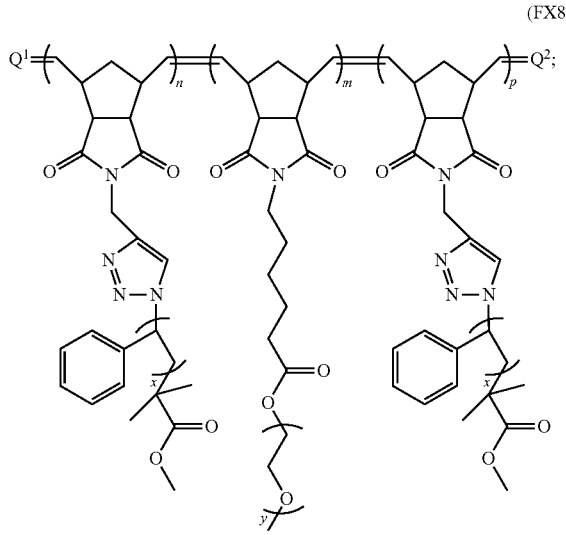

(FX8)

wherein $Q^1$ is said first backbone terminating group and $Q^2$ is said second backbone terminating group;
wherein m, n and p are each independently an integer selected from the range of 3 to 1000; and
wherein x is an integer selected from the range of 3 to 100 and y is an integer selected from the range of 3 to 100.

15. The brush block copolymer of claim 1 further comprising a fourth polymer block comprising at least 3 second repeating units, wherein each of said second repeating units of said fourth polymer block comprises a second polymer backbone group directly or indirectly covalently linked to a ionophilic polymer side chain group, wherein said fourth polymer block is directly or indirectly covalently linked to said first polymer block or said third polymer block along a backbone and said fourth polymer block is not adjacent to said second polymer block.

16. The brush block copolymer of claim 15, wherein said brush block copolymer is defined by the formula A'-B'-A"-B", wherein A' is said first polymer block, B' is said second polymer block, A" is said third polymer block and B" is said fourth polymer block.

17. The brush block copolymer of claim 15 further comprising a fifth polymer block comprising at least 3 first repeating units, wherein each of said first units of said fifth polymer block comprises a first polymer backbone group directly or indirectly covalently linked to a ionophobic polymer side chain group, wherein said fifth polymer block is directly or indirectly covalently linked to said fourth polymer block along a backbone and said fifth polymer block is not adjacent to said first polymer block or said third polymer block.

18. The brush block copolymer of claim 17, wherein said brush block copolymer is defined by the formula A'-B'-A"-B"-A''', wherein A' is said first polymer block, B' is said second polymer block, A" is said third polymer block, B" is said fourth polymer block and A''' is said fifth polymer block.

19. The brush block copolymer of claim 1, wherein said brush block copolymer is synthesized via a grafting through approach.

20. A plurality of said brush block copolymers of claim 1, wherein said brush block copolymers undergo self-assembly to form a physically cross-linked network.

21. A brush block copolymer comprising:
a first polymer block comprising at least 3 first repeating units, wherein each of said first repeating units of said first polymer block comprises a first polymer backbone group directly or indirectly covalently linked to a first polymer side chain group;
a second polymer block comprising at least 3 second repeating units; wherein each of said second repeating units of said second polymer block comprises a second polymer backbone group directly or indirectly covalently linked to a second polymer side chain group; and
a third polymer block comprising at least 3 third repeating units; wherein each of said third repeating units of said third polymer block comprises a third polymer backbone group directly or indirectly covalently linked to a third polymer side chain group;
wherein said second polymer block is directly or indirectly covalently linked to both said first polymer block and said third polymer block along a backbone and said second polymer block is positioned between said first polymer block and said third polymer block;
wherein said first polymer block, said second polymer block and said third polymer block are characterized by a chain grafting density equal to 100%; and
wherein said brush block copolymer is defined by the formula (FX11):

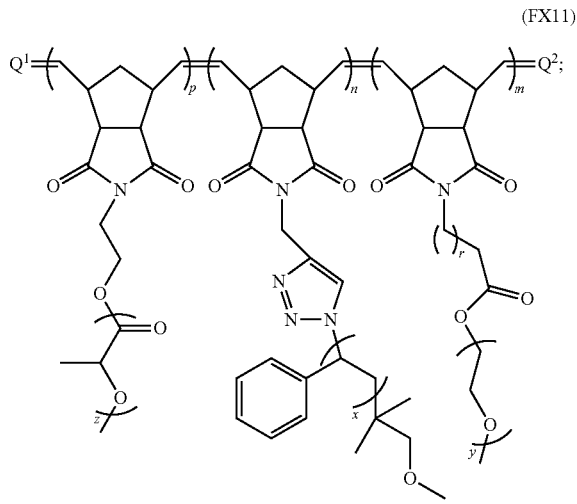

(FX11)

wherein $Q^1$ is said first backbone terminating group and $Q^2$ is said second backbone terminating group;
r is an integer selected from the range of 1 to 5;
wherein m, n and p are each independently an integer selected from the range of 3 to 1000;
wherein x, y and z are each independently an integer selected from the range of 3 to 100.

* * * * *